(12) United States Patent
Hadani et al.

(10) Patent No.: US 11,742,909 B2
(45) Date of Patent: Aug. 29, 2023

(54) RECIPROCAL GEOMETRIC PRECODING

(71) Applicant: Cohere Technologies, Inc., Santa Clara, CA (US)

(72) Inventors: Ronny Hadani, Santa Clara, CA (US); Shachar Kons, Santa Clara, CA (US)

(73) Assignee: Cohere Technologies, Inc., San Jose, CA (US)

( * ) Notice: Subject to any disclaimer, the term of this patent is extended or adjusted under 35 U.S.C. 154(b) by 0 days.

(21) Appl. No.: 17/596,233

(22) PCT Filed: Jun. 5, 2020

(86) PCT No.: PCT/US2020/036349
§ 371 (c)(1),
(2) Date: Dec. 6, 2021

(87) PCT Pub. No.: WO2020/247768
PCT Pub. Date: Dec. 10, 2020

(65) Prior Publication Data
US 2022/0321181 A1    Oct. 6, 2022

Related U.S. Application Data

(60) Provisional application No. 62/857,757, filed on Jun. 5, 2019.

(51) Int. Cl.
*H04B 7/0456*   (2017.01)
*H04B 7/024*   (2017.01)
(Continued)

(52) U.S. Cl.
CPC ........... *H04B 7/0456* (2013.01); *H04B 7/024* (2013.01); *H04B 7/0452* (2013.01); *H04W 52/143* (2013.01)

(58) Field of Classification Search
CPC .... H04B 7/0456; H04B 7/024; H04B 7/0452; H04W 52/143; H04W 52/346
See application file for complete search history.

(56) References Cited

U.S. PATENT DOCUMENTS

2014/0177519 A1    6/2014  Bhattad et al.
2016/0013838 A1*   1/2016  Zhu ..................... H04B 7/0639
                                                 375/267
(Continued)

FOREIGN PATENT DOCUMENTS

EP         3270522 A1    1/2018
WO    2018/074828 A1    4/2018

OTHER PUBLICATIONS

International Search Report for PCT /2020/36349,pp. 1-3 (Year: 2020).*

(Continued)

*Primary Examiner* — Vineeta S Panwalkar
(74) *Attorney, Agent, or Firm* — Perkins Coie LLP

(57) ABSTRACT

Methods, systems and devices for reciprocal geometric precoding are described. One example method includes determining, by a network device, an uplink channel state using reference signal transmissions received from multiple user devices, and generating a precoded transmission waveform for transmission to one or more of the multiple user devices by applying a precoding scheme that is based on the uplink channel state, wherein the uplink channel state completely defines the precoding scheme. In some embodiments, the reference signal transmissions and the precoded transmission waveform are multiplexed using either time-domain multiplexing or frequency-domain multiplexing.

20 Claims, 55 Drawing Sheets

(51) Int. Cl.
  *H04B 7/0452* (2017.01)
  *H04W 52/14* (2009.01)

(56) References Cited

U.S. PATENT DOCUMENTS

| | | |
|---|---|---|
| 2016/0241323 A1 | 8/2016 | Ko et al. |
| 2016/0381583 A1 | 12/2016 | Sawahashi et al. |
| 2017/0078054 A1 | 3/2017 | Hadani et al. |
| 2018/0123657 A1 | 5/2018 | Kundargi et al. |
| 2018/0131418 A1 | 5/2018 | Wang et al. |
| 2019/0082435 A1 | 3/2019 | Noh et al. |
| 2019/0260459 A1 | 8/2019 | Jeon et al. |

OTHER PUBLICATIONS

Written Opinion for PCT/2020/36349, pp. 1-7 (Year: 2020).*
EPO, European Search Report for European Application No. 20817812.9, dated Jun. 14, 2022. 11 pages.

* cited by examiner

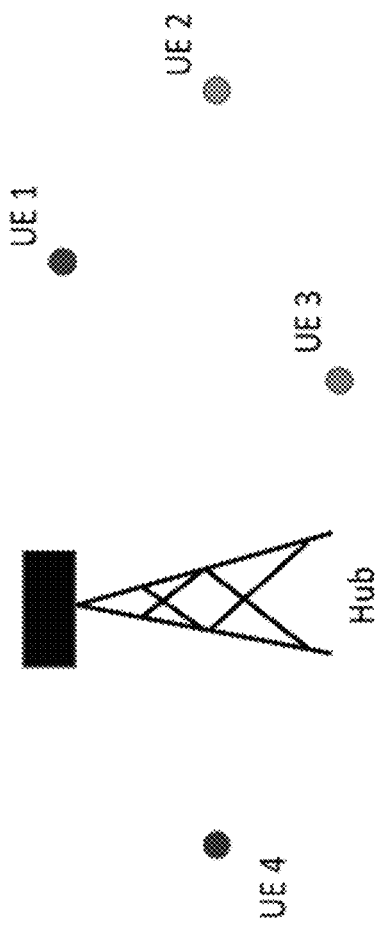
FIG. 15
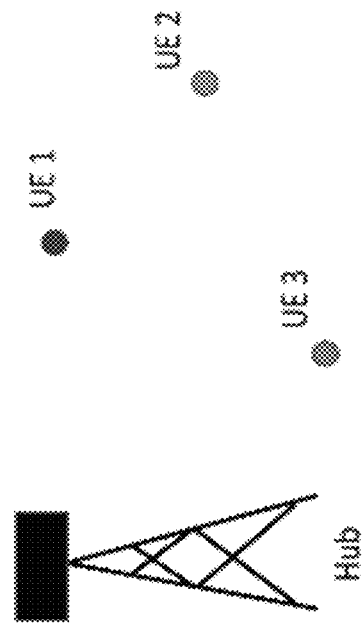
FIG. 16
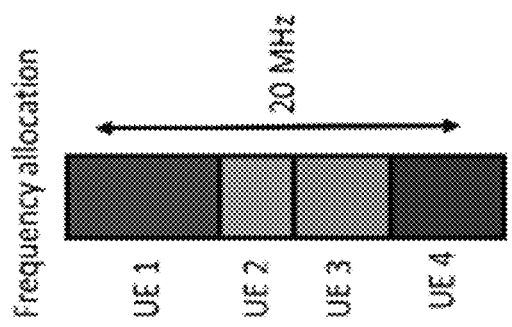

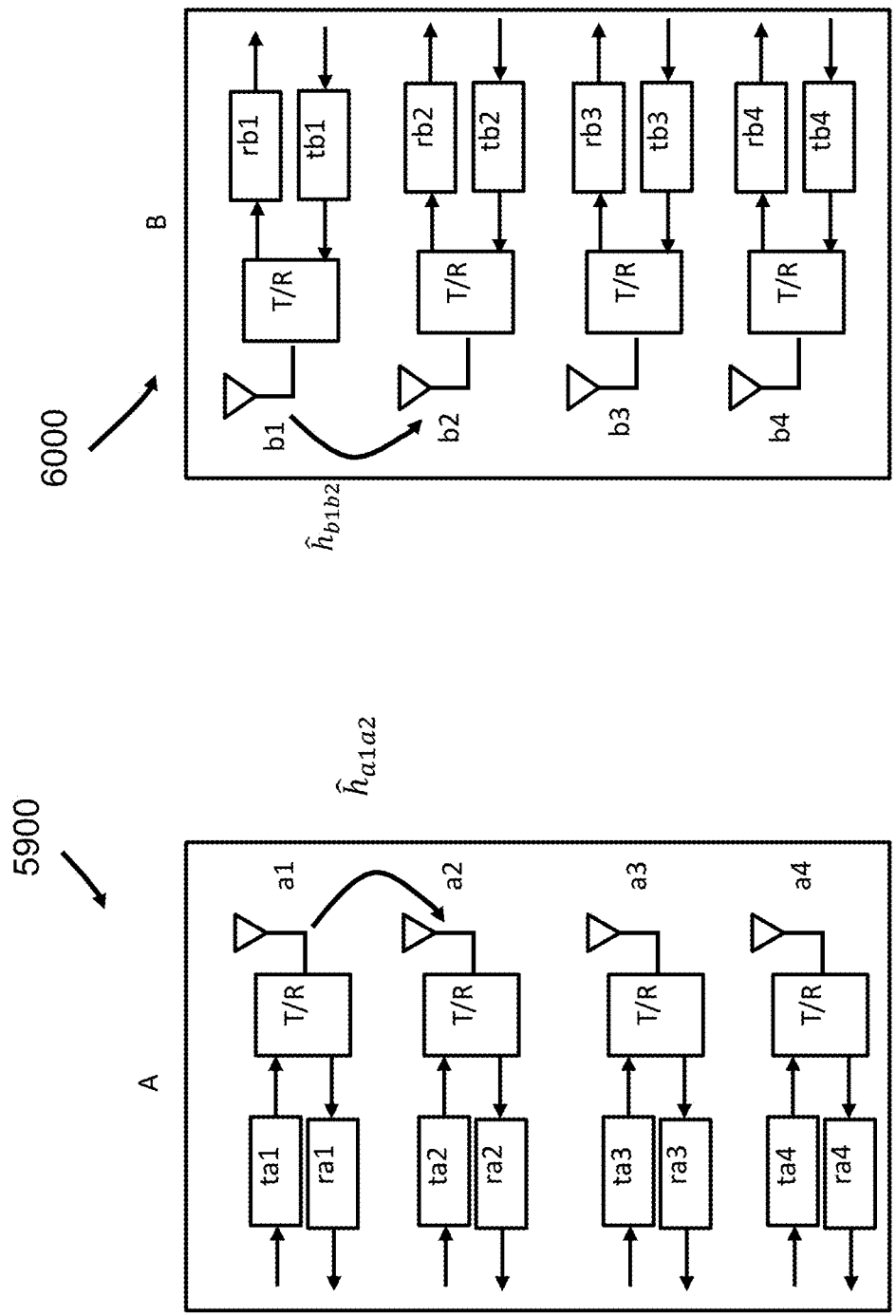

RECIPROCAL GEOMETRIC PRECODING

CROSS-REFERENCE TO RELATED APPLICATIONS

The present document is a 371 National Phase Application of PCT Application No. PCT/US2020/036349 entitled "RECIPROCAL GEOMETRIC PRECODING" filed on Jun. 5, 2020, which claims priority to and benefits of U.S. Provisional Application 62/857,757 filed on Jun. 5, 2019. The entire contents of the aforementioned patent application is incorporated by reference as part of the disclosure of this patent document.

TECHNICAL FIELD

The present document relates to mobile wireless communication, and more particularly, to distributed cooperative operation of wireless cells based on sparse channel representations.

BACKGROUND

Due to an explosive growth in the number of wireless user devices and the amount of wireless data that these devices can generate or consume, current wireless communication networks are fast running out of bandwidth to accommodate such a high growth in data traffic and provide high quality of service to users.

Various efforts are underway in the telecommunication industry to come up with next generation of wireless technologies that can keep up with the demand on performance of wireless devices and networks. Many of those activities involve situations in which a large number of user devices may be served by a network.

SUMMARY

This document discloses techniques useful for embodiments of wireless technologies which perform precoding of signal transmissions in one direction in a wireless network solely based on a channel state determined for the reverse direction of transmissions in the wireless network.

In one example aspect, a method of wireless communication is disclosed. The method includes determining, by a network device, an uplink channel state using reference signal transmissions received from multiple user devices, and generating a precoded transmission waveform for transmission to one or more of the multiple user devices by applying a precoding scheme that is based on the uplink channel state, wherein the uplink channel state completely defines the precoding scheme.

In another example aspect, a wireless communication apparatus that implements the above-described methods is disclosed.

In yet another example aspect, the methods may be embodied as processor-executable code and may be stored on a computer-readable program medium.

These, and other, features are described in this document.

DESCRIPTION OF THE DRAWINGS

Drawings described herein are used to provide a further understanding and constitute a part of this application. Example embodiments and illustrations thereof are used to explain the technology rather than limiting its scope.

FIG. 15 depicts an example network configuration in which a hub services for user equipment (UE).
FIG. 16 depicts an example embodiment in which an orthogonal frequency division multiplexing access (OFDMA) scheme is used for communication.

FIG. 59 shows an example antenna configuration in which four transmit and four receive antennas are used at a network-side apparatus.

FIG. 60 shows an example antenna configuration in a user-side communications apparatus.

DETAILED DESCRIPTION

Figure 1A:
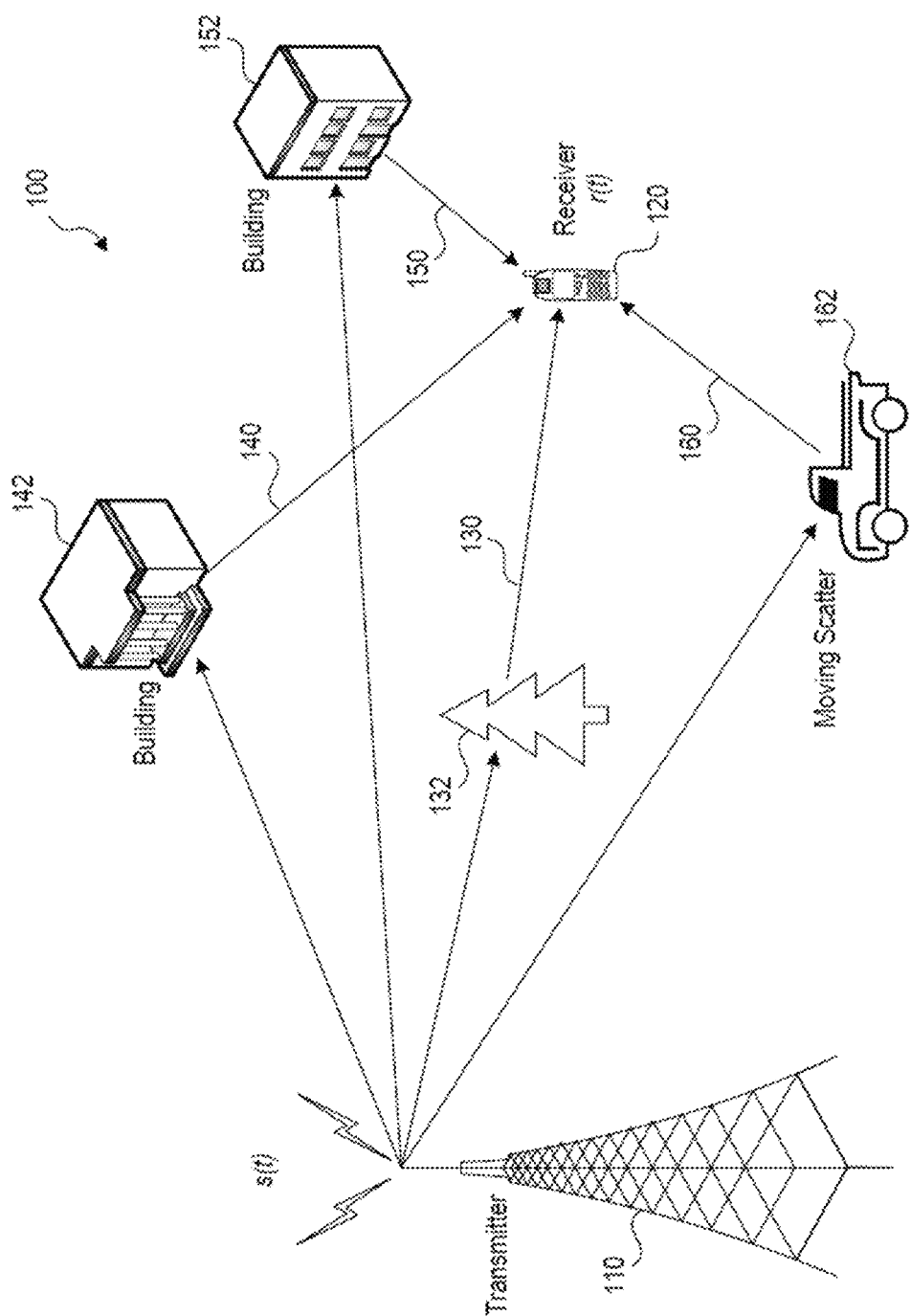
FIG. 1A shows an example of a mobile wireless network.

To make the purposes, technical solutions and advantages of this disclosure more apparent, various embodiments are described in detail below with reference to the drawings. Unless otherwise noted, embodiments and features in embodiments of the present document may be combined with each other.

Section headings are used in the present document, including the appendices, to improve readability of the description and do not in any way limit the discussion to the respective sections only. The terms "hub" and user equipment/device are used to refer to the transmitting side apparatus and the receiving side apparatus of a transmission, and each may take the form of a base station, a relay node, an access point, a small-cell access point, user equipment, and so on.

In the description, the example of a fixed wireless access (FWA) system is used only for illustrative purpose and the disclosed techniques can apply to other wireless networks.

While some descriptions here refer to FWA systems with orthogonal time frequency space (OTFS) as modulation/multiple access format, the techniques developed are suitable for other modulation/multiple access formats as well, in particular orthogonal frequency division multiplexing (OFDM) or OFDM-Access (OFDMA).

1. Brief Introduction

Cellular wireless service providers have begun planning and deployment of next generation networks to support deployment of denser deployments of higher bandwidth user devices. Furthermore, the ever-increasing reliance on wireless connectivity has raised users' expectations of Quality of Service and seamless availability of wireless connectivity everywhere.

Cloud Radio Access Network (C-RAN) is one example of a network architecture in which a centralized cloud-based access network provides wireless connectivity to wireless terminals. However, C-RAN deployments rely on expensive deployments of fiber optic infrastructure to connect base stations with each other and with a central network controller. Furthermore, such an architecture requires planning, and deployments can be relatively slow due to the labor and resources required to lay down fiber. As a result, C-RAN and similar solutions are expensive, and cannot be quickly deployed (or taken down) to meet short term increase in demand of wireless services. Furthermore, when such an deployment reaches its maximum capacity, incremental deployment is often not possible without having to significantly alter the existing infrastructure.

The techniques described in the present document can be used in wireless network embodiments to overcome such problems. In one example aspect, network nodes may be deployed using short range, high speed mmwave links. Such installations have minimal footprint and power requirements and can be deployed and taken down to quickly meet time and geography-specific demand for wireless services.

In another beneficial aspect, the present technology may be used to deploy networks that provide short links between base stations, or network nodes, thereby providing reduced latency, jitter and fronthaul traffic loading in wireless networks.

In another beneficial aspect, the disclosed techniques may be used to manage a soft handover whereby a user equipment (UE) and N neighboring Base stations (typically N=3) constitute a cooperative multi-point (COMP) service zone.

In another beneficial aspect, embodiments may benefit from increased network performance without any change or replacement of existing antennas on towers, e.g., does require setting new mmwave links or computing platforms. The inventor's rough calculations have shown that it may be possible for embodiments to increase network capacity by at least a factor of two and at least 5 db Signal to Interference and Noise Ratio (SINR) improvement.

Some embodiments of the disclosed distributed COMP technology may be used to address both intra-cell and inter-cell interference, or alternatively inter-sector interference and cell edge poor coverage, using a computer platform that processes jointly all three sectors of all towers in a cluster. One advantage is that the physical front end, e.g., antennas on tower, may not have to be changed, and yet the techniques may be embodied for boosting performance.

As further described in the present document, in some embodiments, distributed COMP may include groups of cell towers in which all cell towers carry the functionality of a Remote Radio Head (RRH) while one of them carry the computation for the cluster and is connected to the network for TCP/IP traffic. In other words, there is no need for a fronthaul to the network. Cluster formation may be performed using one of the techniques described in the present document. A cluster takes advantage of shared resource management and load balancing.

Figure 1B:
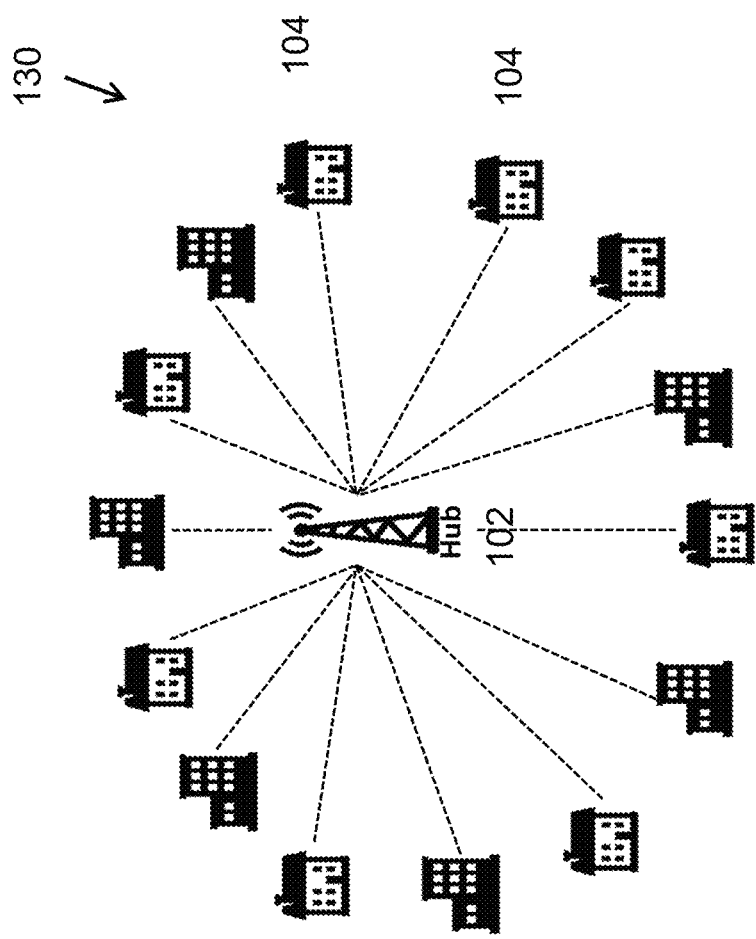
FIG. 1B shows an example of a fixed wireless access network.
Figure 1C:
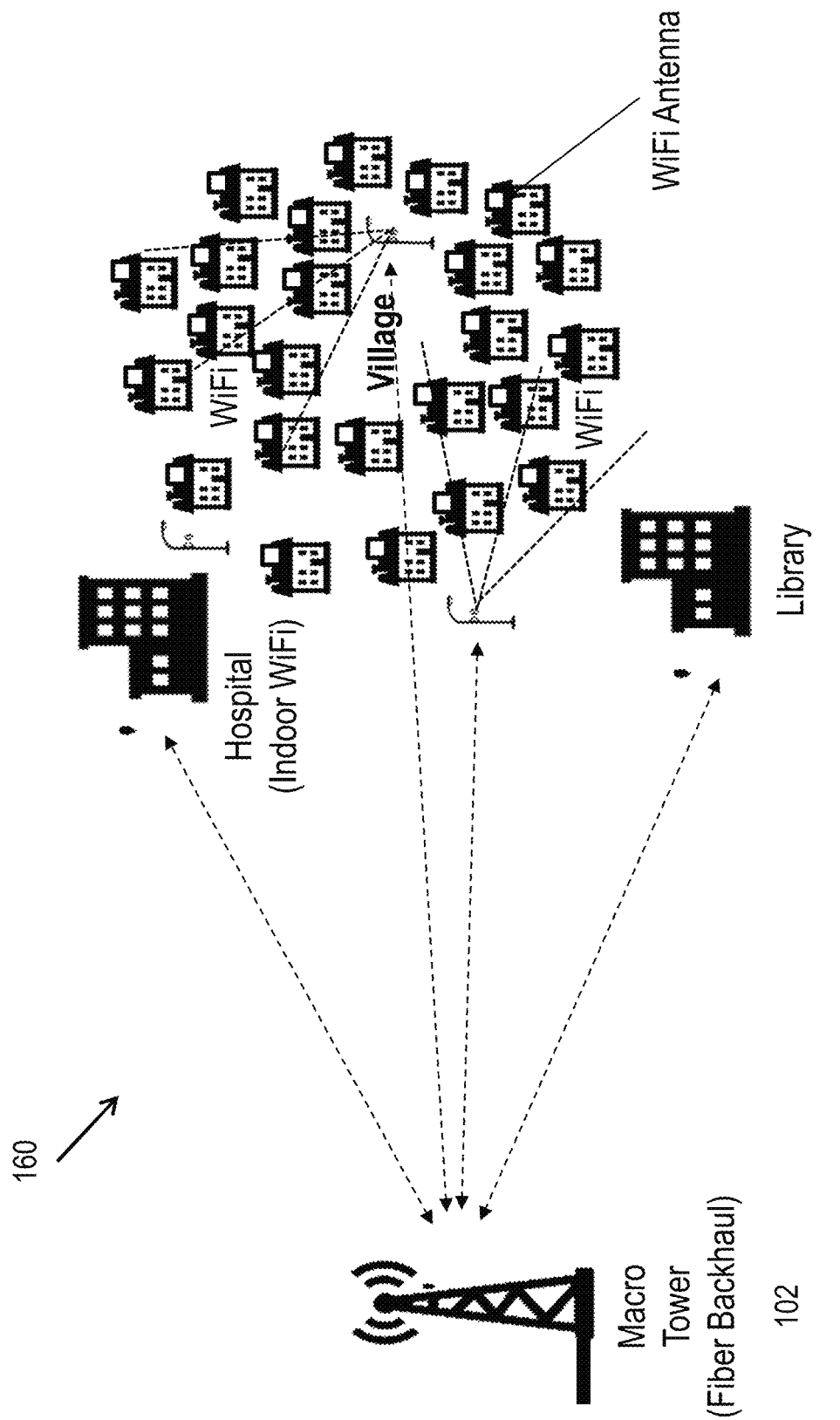
FIG. 1C shows another example of a fixed wireless access network.

Embodiments of the disclosed technology can be implemented in example systems, as shown in FIGS. 1A, 1B and 1C.

FIG. 1A shows an example of a mobile wireless network 100. In this simplified drawing, a wireless terminal 102 is provided wireless connectivity by a network-side node 104. The wireless terminal 102 may be, for example, a smartphone, a tablet, an Internet of Things (IoT) device, a smartwatch, etc. The network node 104 may be a base station that establishes and operates a cell of wireless communication. The communication channel between the wireless terminal 102 and the node 104 may include reflectors such as buildings, trees, moving objects such as vehicles that tend to distort signal transmissions to and from the wireless terminal 102. During operation, the wireless terminal 102 may move away from the node 104 and may have to be handed over to or share connectivity with another network node (not explicitly shown in the drawing). In some cases, the network node 104 may cooperatively operate with other nodes to provide a multi-point transmission/reception to the wireless terminal 102 such that the mobility of the wireless terminal 102 does not hamper connectivity with the wireless services.

FIG. 1B shows an example of a fixed wireless access system 130. A hub 102, that includes a transmission facility such as a cell tower, is configured to send and receive transmissions to/from multiple locations 104. For example, the locations could be user premises or business buildings.

As described throughout this document, the disclosed embodiments can achieve very high cell capacity fixed wireless access, when compared to traditional fixed access technology. Some techniques disclosed herein can be embodied in implementations at the hub 102 or at transceiver apparatus located at the locations 104.

FIG. 1C shows yet another configuration of a fixed access wireless communication system 160 in which hops are used to reach users. For example, one cell tower may transmit/receive from another cell tower, which would then relay the transmissions between the principle cell tower and the users, thus extending range of the fixed wireless access system. A backhaul may connect the transmission tower 102 with an aggregation router. For example, in one configuration, a 10 Gbps fiber connection may be used to feed data between a base station at a hub and a fiber hub aggregation router. In one advantageous aspect, deployment of this technology can be achieved without having to change any network bandwidth characteristics for harder to reach areas by using the hub/home access point (AP) configuration as a launch point. Some techniques disclosed herein can be embodied in implementations at the macro tower 102 or at transceiver apparatus located at the other locations.

Embodiments of the disclosed technology provide various improvements to the operation of wireless networks and equipment, including:

1) Accurate geometry extraction and multipath attributes acquisition, based on instantaneous measurements over a limited band and over a short period of time. For example, the sparse channel representation technique, as described in Section 3, provides a computationally efficient was of modeling and predicting channels. The computations can be performed by a network device on behalf of multiple base stations and thus the network device can control transmissions from/to the multiple base stations so that wireless devices can move freely between coverage areas of the base stations without any interference from transmissions from/to other base stations in the distributed cooperative zone of base stations.

2) Accurate channel prediction on same band or on a different adjacent band based on instantaneous measurements over a limited band and over a short period of time, as described in Sections 2-5. The sparse channel measurement may be performed using very few reference signal transmissions and thus channel conditions in multiple neighboring cells can be quickly acquired and used at a network-side server that controls operation of distributed base stations in a cooperative manner.

3) Use of predicted channel state information for centralized & distributed MU-MIMO precoding. For example, Sections 2, 4 and 5 describe certain techniques for predicting channels at different time instances, frequencies and spatial positions.

4) Use of predicted channel state information to determine Modulation and Coding Scheme (MCS) attributes (Resource block bit loading-modulation order and forward error correction codes).

5) Use of predicted channel State information to determine retransmission to meet delivery reliability criteria. For example, the network server may obtain accurate channel estimates at future times or other frequencies and, without waiting for ACK feedbacks, is able to decide retransmission strategy based on the channel conditions. For example, channel condition may be compared with a threshold and retransmission may be used when channel condition falls below the threshold.

6) Base Station clustering & front haul network organization for defining CoMP regions & Soft handoff between CoMP regions, as described in Section 2.

7) Pilot arrangement to minimize pilot contamination, as described in Section 6. The central awareness of channels for all base stations in a zone or a cluster allows the cluster controller on the network side to arrange pilots from different base stations to be non-overlapping in terms of their transmission resources.

8) Signal processing to separate pilot mixtures and contamination mitigation.

2. Distributed COMP Architecture

Accordingly, the present document describes a distributed COMP architecture in which a separation of a base station's functionality of transmission and reception of radio frequency (RF) signals between UEs and functionality of channel estimation, prediction, precoding and retransmission management. Furthermore, mmwave links may be established between the RF functionality sites and the remove or network-side computing server for exchanging information related to ongoing operation of the cellular network.

Figure 2:
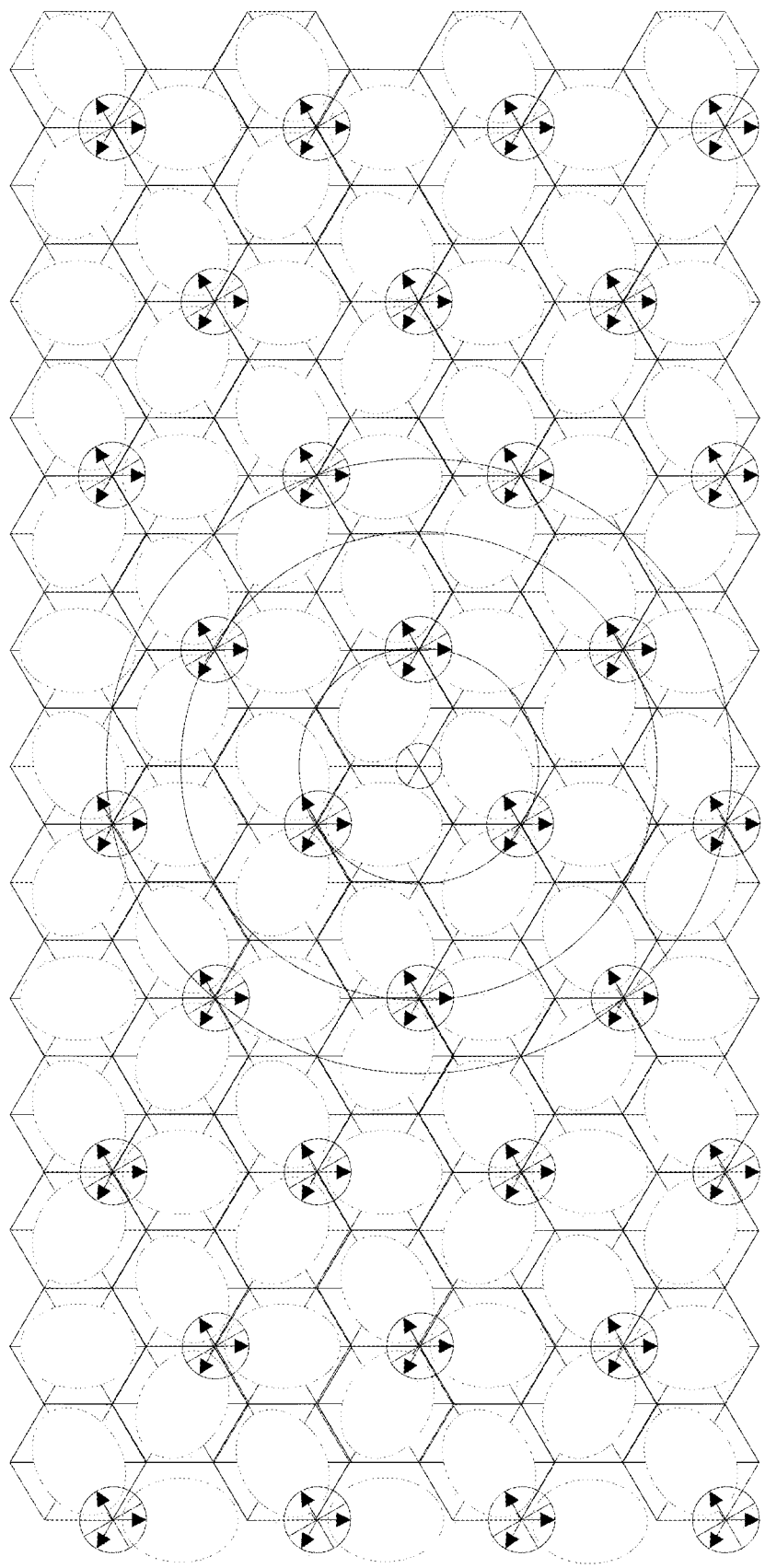
FIG. 2 shows an example of a cellular 3-sector hexagonal model.

FIG. 2 shows an example of a cellular 3-sector hexagonal model. In this model, a base station transceiver may be operated at center of each small circle and may provide wireless connectivity using three spatial sectors/beams that span 120 degrees surrounding the base station. The larger concentric circles show the neighboring cells in which a transition of a UE operating in a sector at the center may occur due to mobility. The concentric circles also show interference circumferences where neighboring sectors may affect signal quality in each other.

Figure 3:
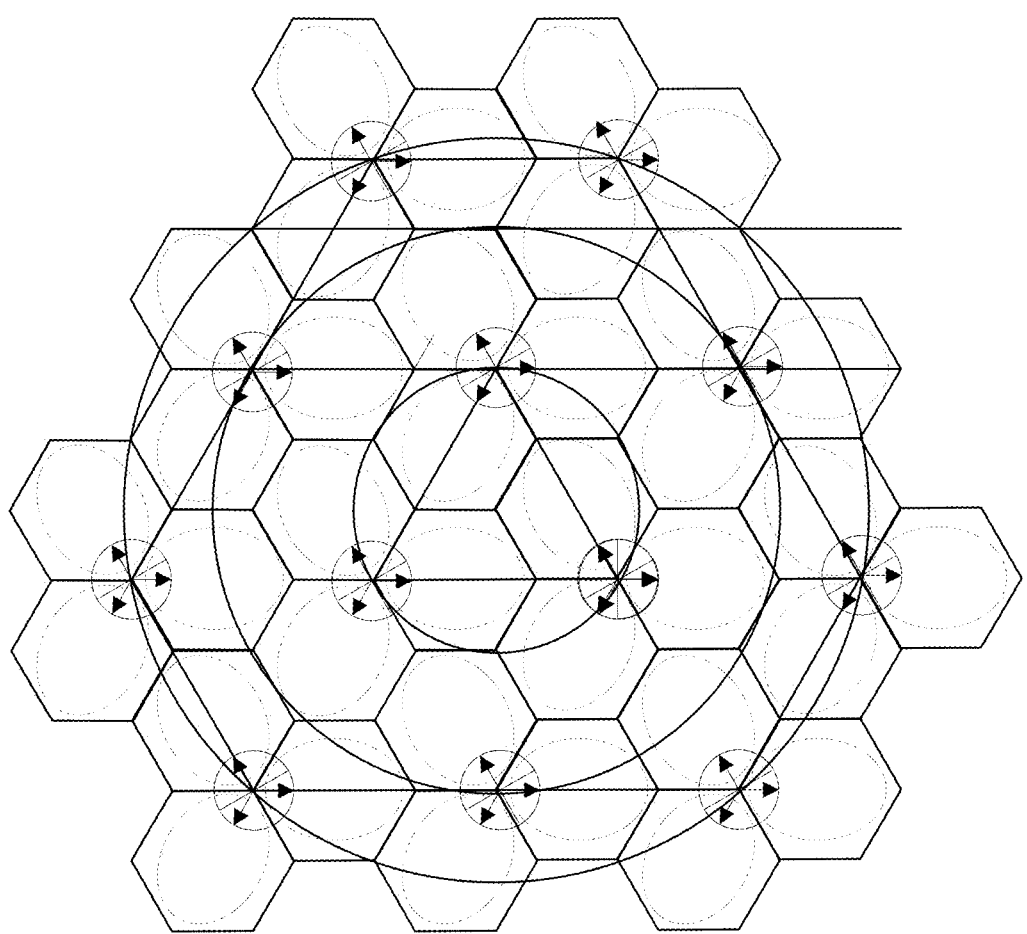
FIG. 3 shows examples of interference circumferences in wireless networks.

FIG. 3 shows an enlarged view of interference circumferences in the wireless network depicted in FIG. 2.

Figure 4:
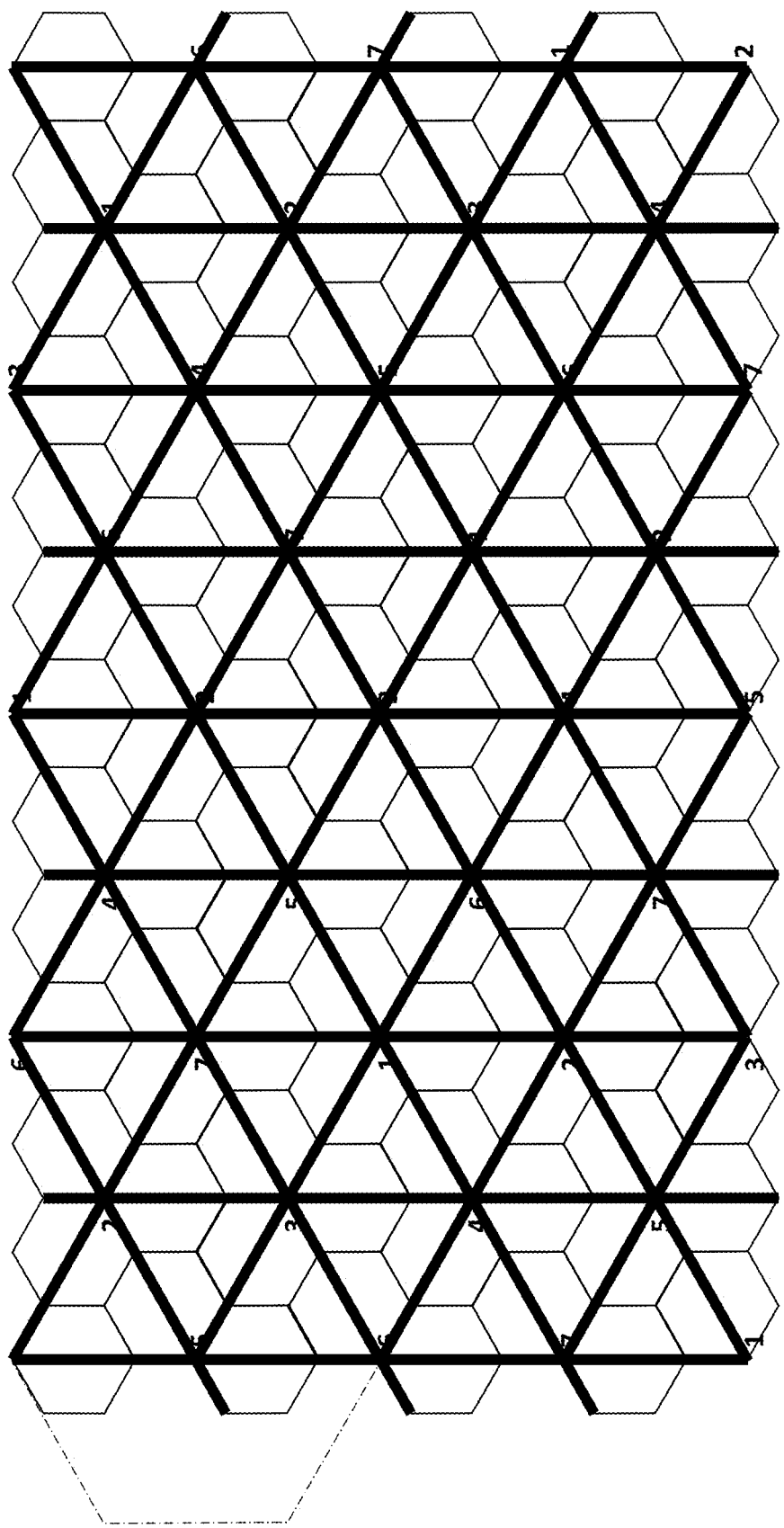
FIG. 4 shows an example of distributed cooperative multipoint (COMP) clusters.

FIG. 4 shows an example of distributed cooperative multipoint (COMP) clusters. In this example, each cluster includes base stations 1 to 7, where one base station is at a center and the other base station are vertices of a hexagonal around the center station. The base stations may offer 3-sector coverage as described with respect to FIG. 2. The base stations may be connected with a wireless connection (possibly with a Line of Sight), that is depicted as the straight lines joining each base station, or node, 1 to 7 to neighboring base stations.

Figure 5:
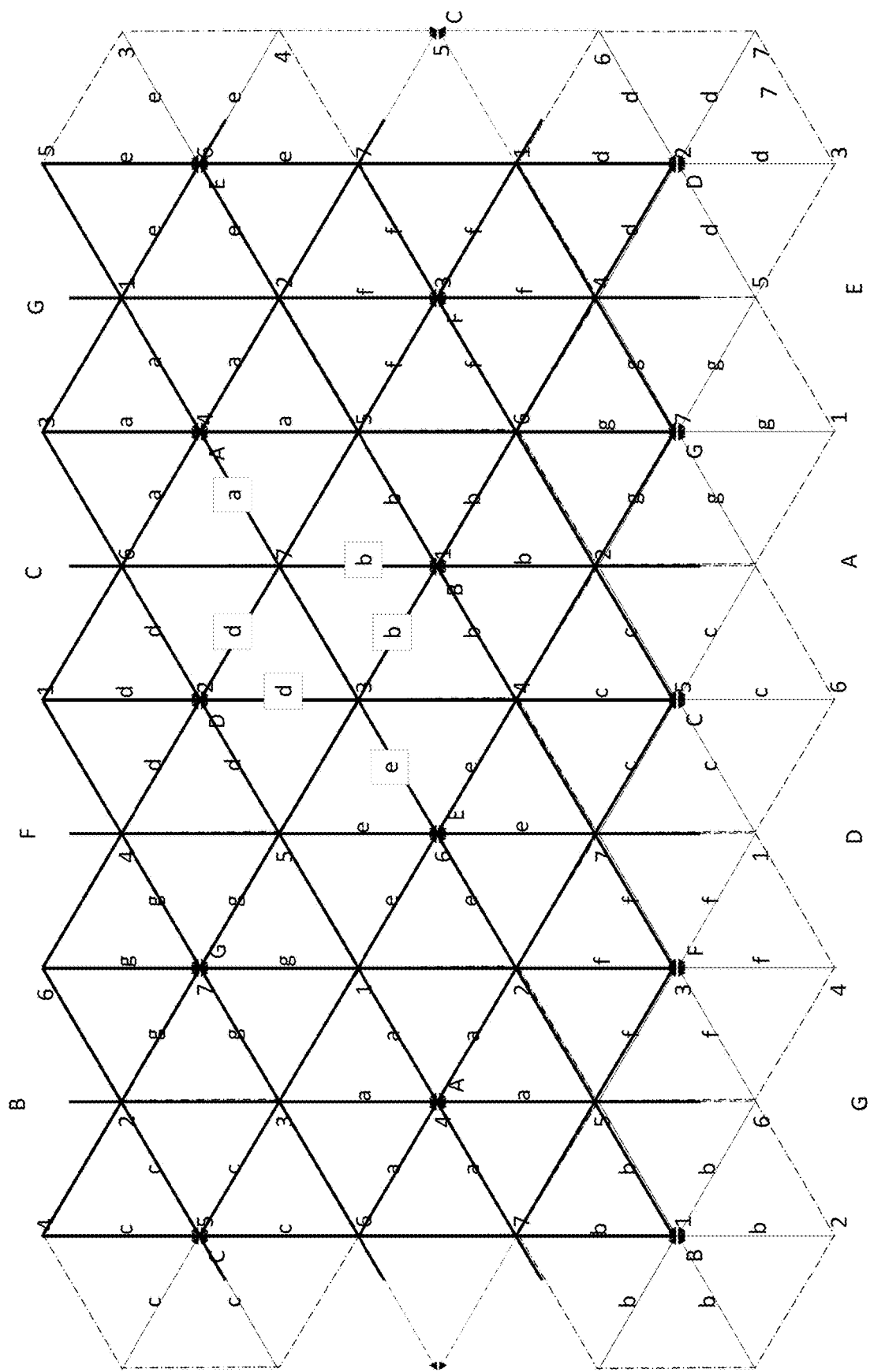
FIG. 5 shows examples of links, nodes and clusters in a wireless network.

FIG. 5 shows examples of links, nodes and clusters in a wireless network. Links are labeled using lower case letters a, b, c . . . etc. Nodes are labeled using numbers. Clusters are labeled using upper case letters A, B, . . . etc.

Figure 6:
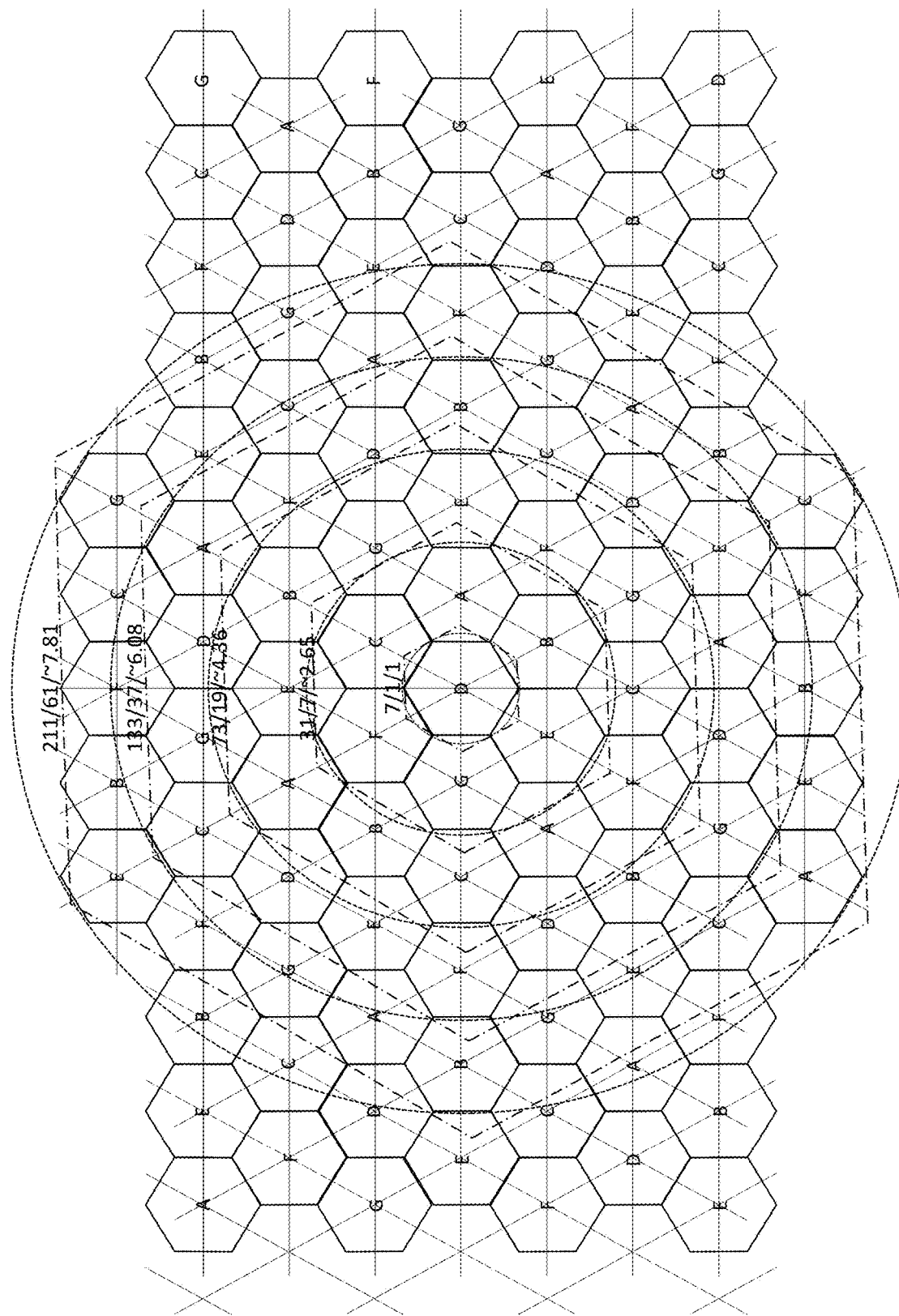
FIG. 6 shows examples of sizing of COMP clusters.

FIG. 6 shows examples of sizing of COMP clusters. For example, a single network-side resource may handle the channel determination and prediction tasks for all sectors within a given cluster.

The following calculations may be used for resource planning in the network.

Nodes=$9n^2-3n+1$

Clusters=$3n^2-3n+1$

Links=$6(3n^2-3n+1)$ $3n(n-1)+1=(R/D)^2$

Table 1 below shows example values which may be used in some embodiments.

| n | cells | Clusters | R/D |
|---|---|---|---|
| 10 | 871 | 271 | 16.46 |
| 20 | 3541 | 1141 | 33.78 |
| 30 | 8011 | 2611 | 51.10 |

Figure 7:
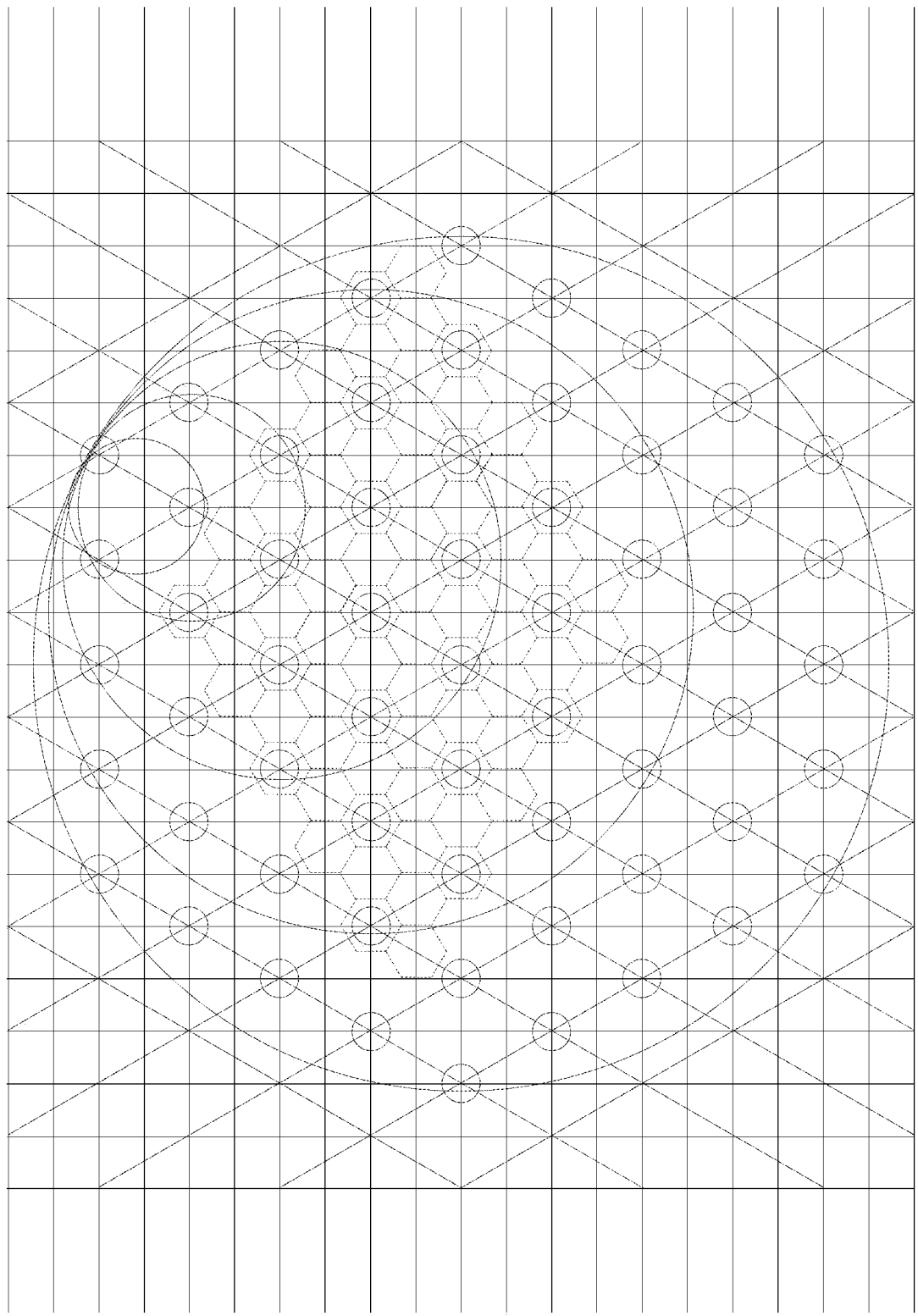
FIG. 7 shows an example of staged COMP clustering.

FIG. 7 shows an example of staged COMP clustering. As depicted in FIG. 7, COMP zones may start from the top left side of an area, and may be gradually staged to become larger and larger in terms of their cooperative operation.

Figure 8:
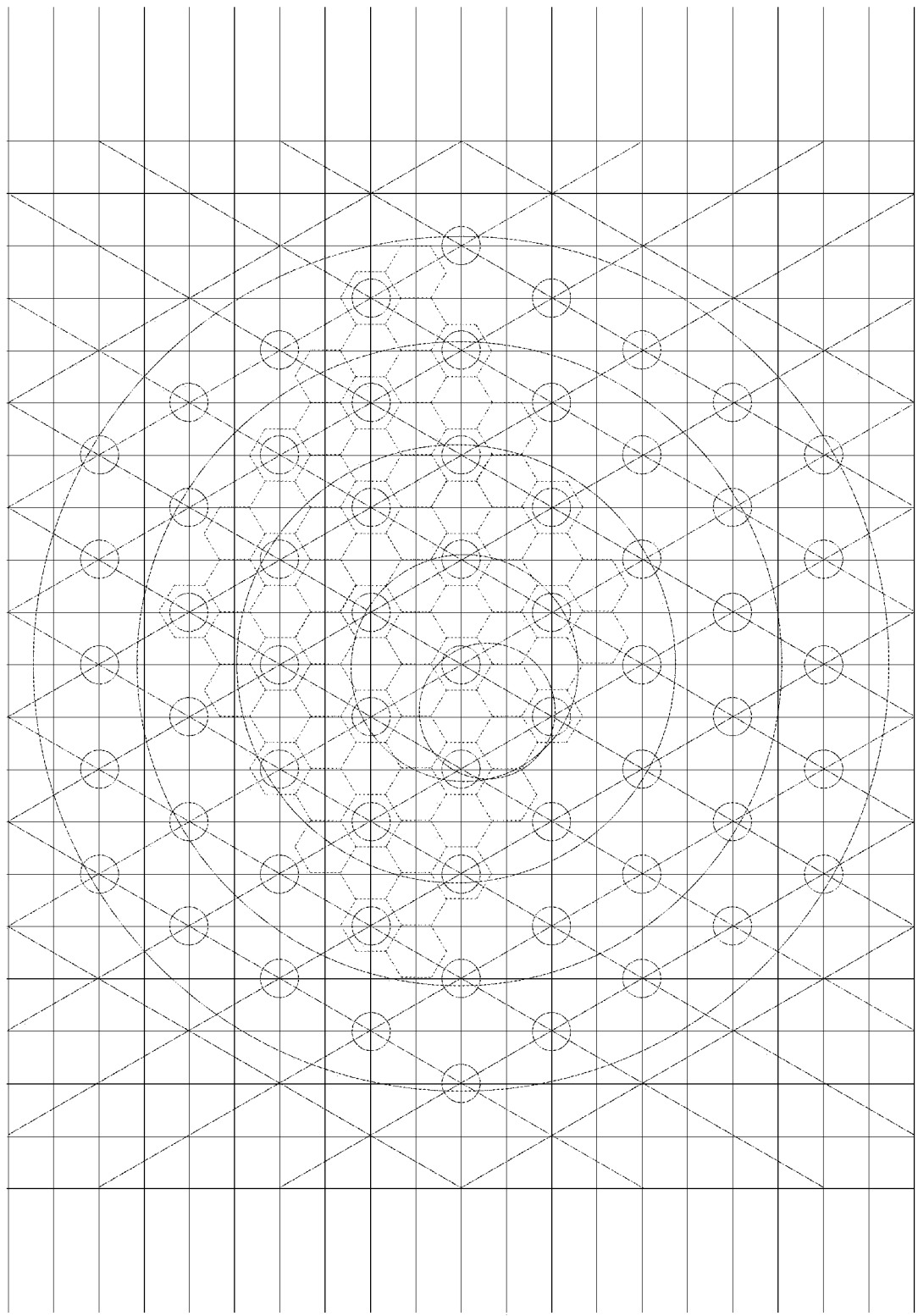
FIG. 8 shows another example of staged COMP clustering.

FIG. 8 shows another example of staged COMP clustering that starts from center of the area and progressively grows in an outward direction.

Figure 9:
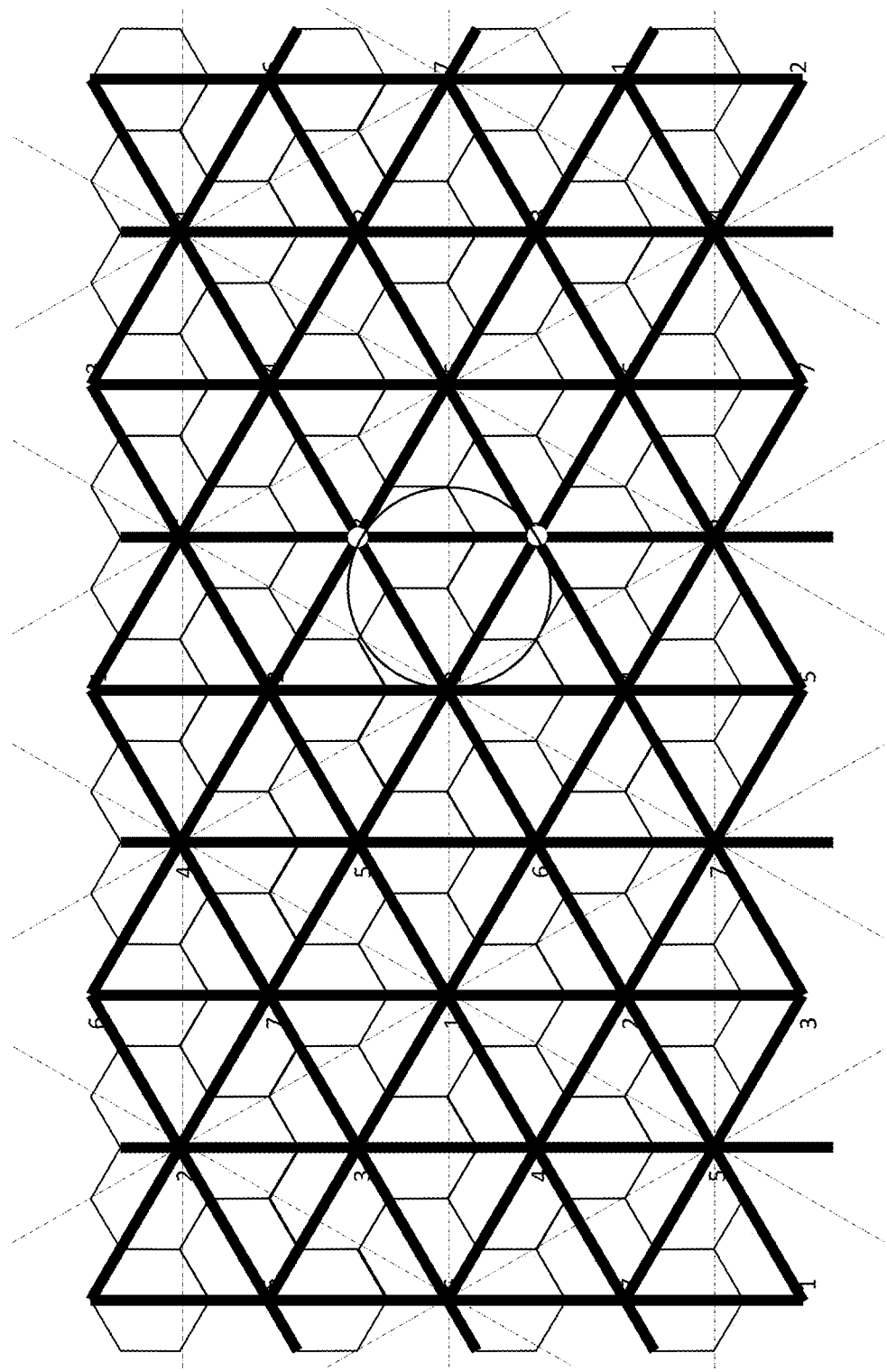
FIG. 9 shows an example in which one cluster with three nodes are depicted.

FIG. 9 shows an example in which one cluster with three nodes (base stations) are depicted. The three nodes may be communicating with each other using a RF link such as a mmwave link that operates in a low latency manner.

Figure 10:
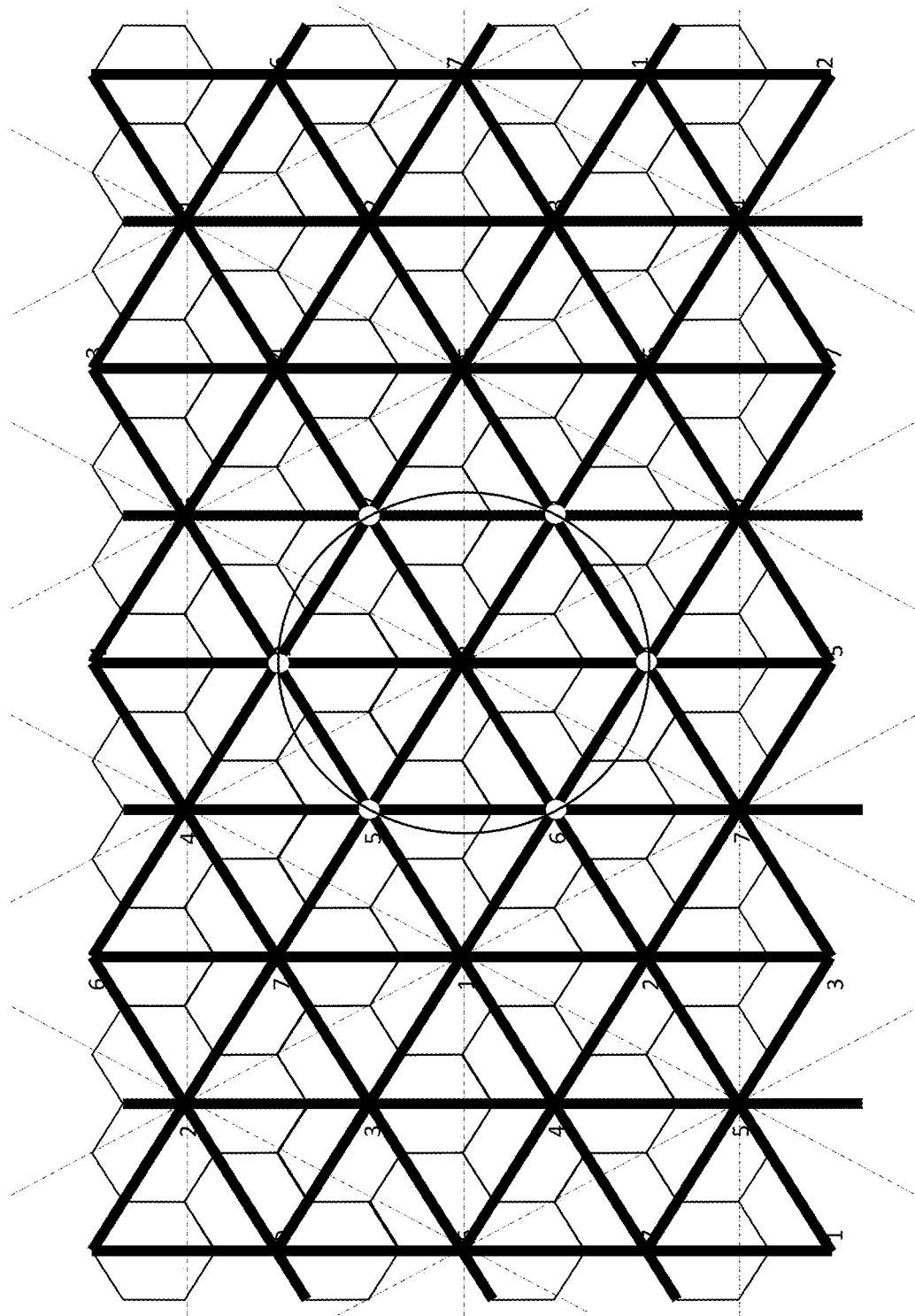
FIG. 10 shows an example of a wireless network depicting one cluster and 7 nodes.

FIG. 10 shows an example of a wireless network depicting one cluster and 7 nodes.

Figure 11:
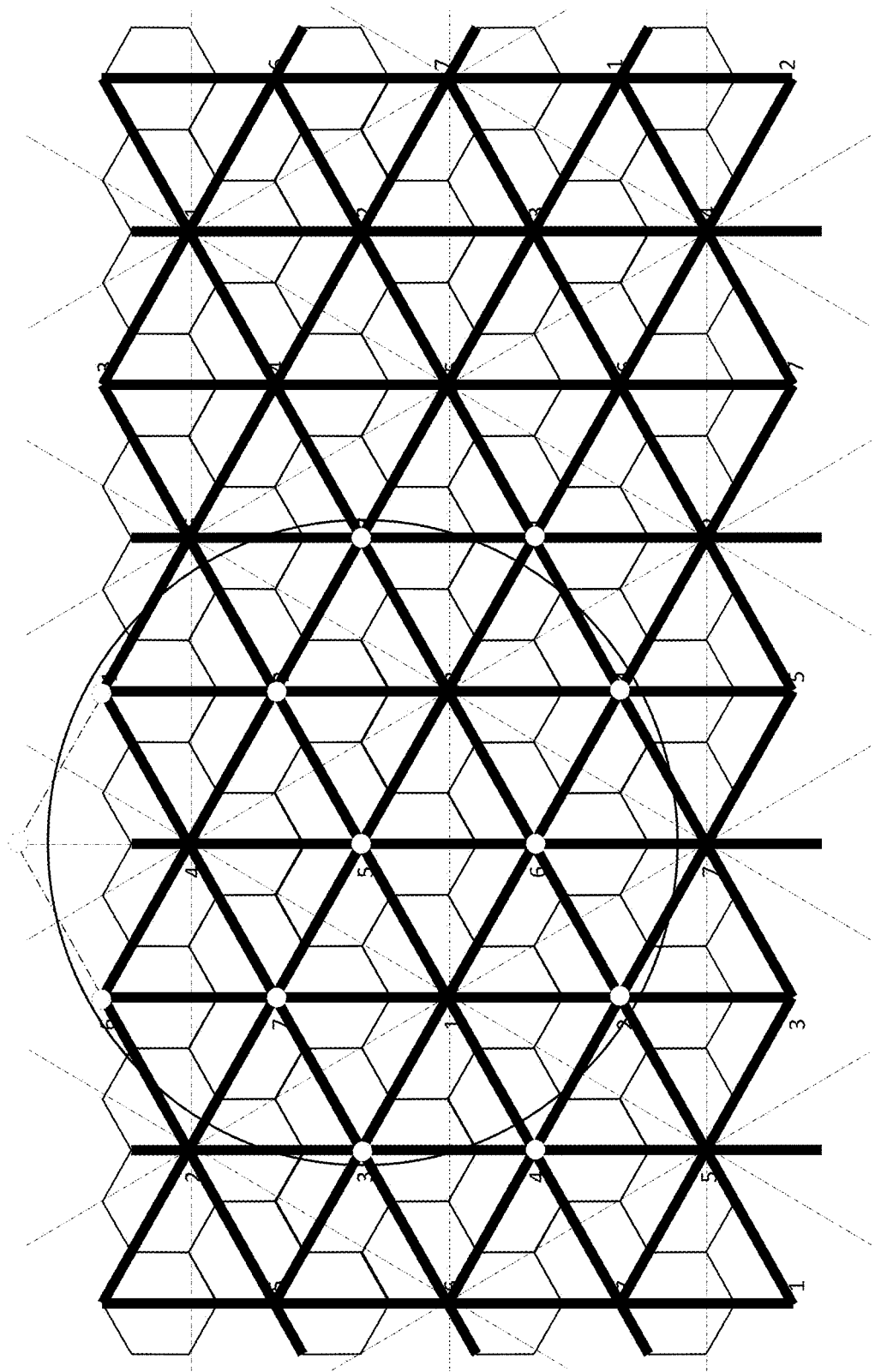
FIG. 11 shows an example of a wireless network depicting 3 clusters and 16 nodes.

FIG. 11 shows an example of a wireless network depicting 3 clusters and 16 nodes.

Figure 12:
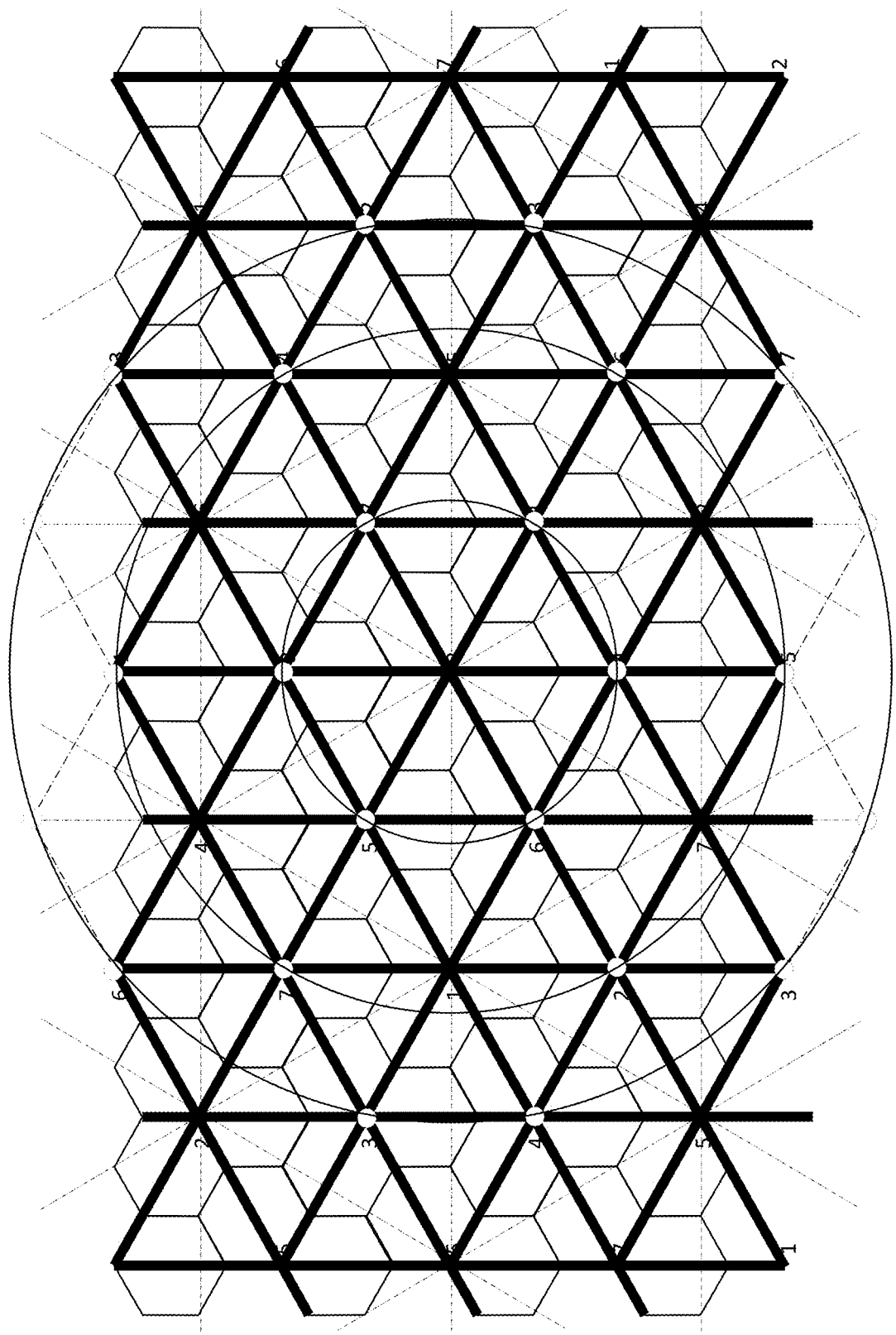
FIG. 12 shows an example of a wireless network depicting 7 clusters and 31 nodes.

FIG. 12 shows an example of a wireless network depicting 7 clusters and 31 nodes.

The following section (Section 3) describes techniques that can be used for determining and modeling channel geometry as a sparse representation based on reflectors. Techniques of predicting channel behavior at another frequency or another time or another spatial position using the sparse representation and a prediction filter are also described. In one advantageous aspect, channel knowledge may be used to perform predictive retransmission. For example, in case that a predicted channel is determined to have a sufficiently high quality, then retransmissions and/or acknowledgement transmissions may be correspondingly reduced or simply eliminated in case that the predicted channel has very good quality.

In some embodiments, the tasks of receiving reference signal transmissions and computations of predictive channels and use of the predicted channel characteristics for transmissions (e.g., precoding transmission signals) could be performed by computing resources located at different places—e.g., a base station, UE or another network-side resource that may not always be co-located with a base station.

3. Sparse Channel Representation

Figure 13:
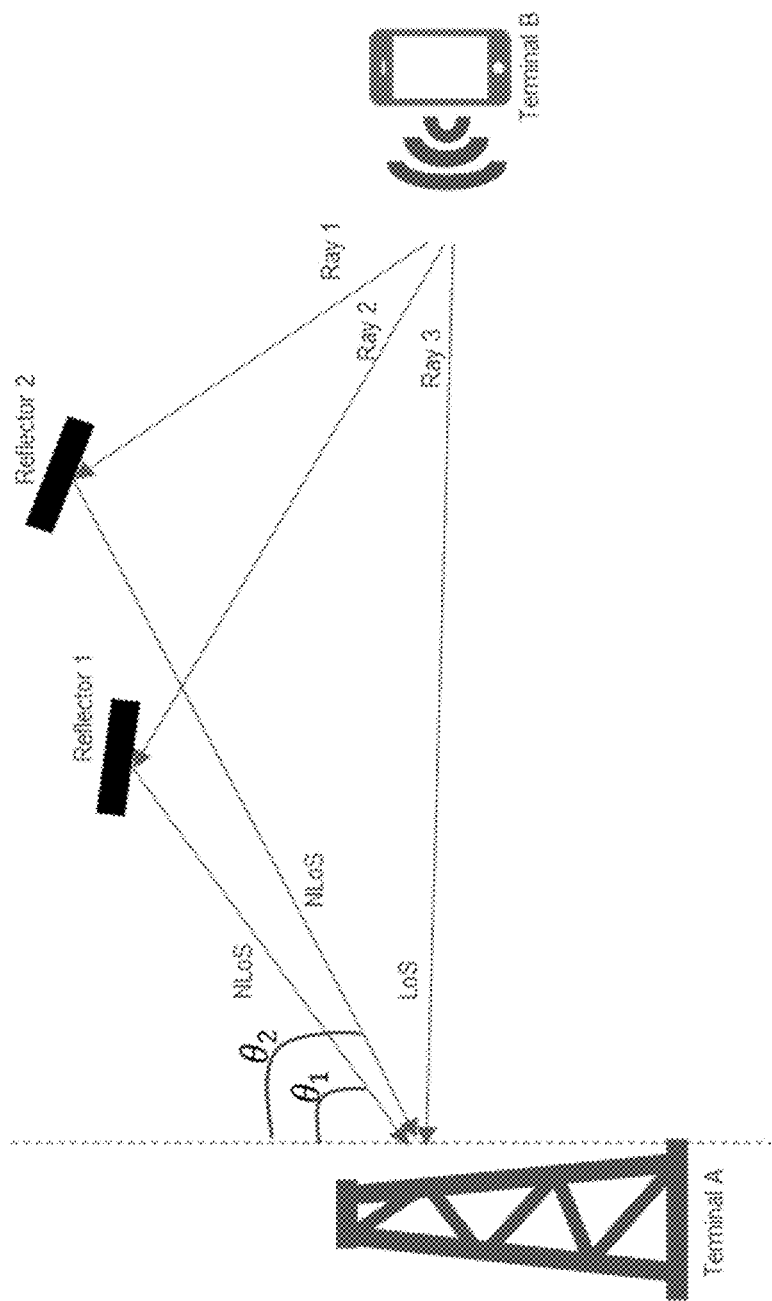
FIG. 13 shows an example of wireless channels between a first wireless terminal (terminal A) and a second wireless terminal (Terminal B).

A wireless channel, between a transmitting antenna of a device to a receiving antenna of another device, may be described by a geometric model of rays originating from the transmitting device, as shown in FIG. 13. Some of these rays may be directly received by the antenna of the other device, when there is a Line-of-Sight (LoS) between the antennas, and some may be reflected from objects and only then received in a Non-Line-of-Sight (NLoS) trace between the antennas. Each ray may be associated with a certain propagation delay, complex gain and angle of arrival (AoA) with respect to the receiving antenna. The two antennas and/or the reflecting objects may not be stationary, resulting in the well-known Doppler effect. The receiving device may use multiple antennas (antenna array) to receive the transmitted signal.

More formally, let $\alpha_i$, $\tau_i$, $\theta_i$ and $\upsilon_i$ represent the complex gain, delay, AoA and Doppler of ray i, respectively. Then, for $N_r$ rays (or reflectors), the wireless channel response at time t, space s and frequency f is $$H(t, s, f) = \sum_{i=1}^{N_r} \alpha_i \cdot e^{2\pi j f \tau_i} \cdot e^{2\pi j s \cdot \sin(\theta_i)} \cdot e^{2\pi j t v_i} \quad (0)$$

where, the space dimension is used for multiple receive antennas.

The channel response, H, may be considered to be a super-position of all received rays. This patent document describes a method for extracting the values $\alpha_i$, $\tau_i$, $\theta_i$ and $v_i$ from H(t, s, f), under the assumptions that $N_r$ is small (for example, typical situations may have between zero to 10 reflectors). Obtaining these values, gives a sparse and compact channel representation of equation (0)), regardless of how large the frequency, time and space dimensions are.

For example, a channel with 3 NLoS reflectors, received over 16 antennas, 512 frequency tones and 4 time samples, will be described by 3×4=12 values (gain, delay, angle and Doppler for 3 reflectors) instead of 16×512×4=32768 values.

Furthermore, with the knowledge of the values of $\alpha_i$, $\tau_i$, $\theta_i$ and $v_i$, a covariance matrix for the channel, $R_{HH}$, can be constructed for any desired frequency, time and space instances. This can be applied for predicting the channel response in any one of these dimensions.

This section describes two methods for constructing the covariance matrix under the sparse channel assumptions. Both methods use convex optimization techniques. Variations of these methods, or alternative methods may be used as well.

It is assumed that the channel response, H, is given for $N_t$, $N_s$ and $N_f$ time, space and frequency grid points, respectively. This channel response may be obtained from known reference signals transmitted from one device to the other.

3.1 Method 1—Rays (Reflectors) Detection

The following algorithm solves the optimization problem of finding the complex values of vectors in delay, angular and Doppler dimensions, which after transformation to frequency, time and space, will give a channel response, which is the closest to the empirical measurement of the channel response H, under the assumption that the number of elements with non-negligible energy in these vectors is small (sparse).

More specifically, let's define grids of $M_\tau$, $M_\theta$ and $M_v$ points over the delay, angular and Doppler dimensions, respectively. These grids represent the desired detection resolution of these dimensions. Let $\lambda_\tau$, $\lambda_\theta$ and $\lambda_v$ be vectors of complex values over these grids. The constructed channel response is $$\hat{H}(t, s, f) = \sum_{m_\tau=0}^{M_\tau-1} \sum_{m_\theta=0}^{M_\theta-1} \sum_{m_v=0}^{M_v-1} \lambda_\tau(m_\tau) \cdot e^{2\pi j f \cdot m_\tau/M_\tau} \cdot \lambda_\theta(m_\theta) \cdot e^{2\pi j s \cdot m_\theta/M_\theta} \cdot \lambda_v(m_v) \cdot e^{2\pi j t \cdot m_v/M_v}$$

The general optimization problem minimizes $\|\lambda_\tau\|_1$, $\|\lambda_\theta\|_1$ and $\|\lambda_v\|_1$, subject to $$\frac{1}{N_t \cdot N_s \cdot N_f} \sum_{t=0}^{N_t-1} \sum_{s=0}^{N_s-1} \sum_{f=0}^{N_f-1} \frac{\|H(t, s, f) - \hat{H}(t, s, f)\|_2}{\|H(t, s, f)\|_2} \leq \varepsilon$$

where $\|\cdot\|_1$ is the L1 norm and $\varepsilon$ represents a small value (which may correspond to the SNR of the channel).

The above optimization problem may be too complex to solve directly. To reduce the complexity, one possible alternative is to solve the problem sequentially for the different dimensions. Any order of the dimensions may be applied.

For example, embodiments may start with the delay dimension and solve the optimization problem of minimizing $\|\lambda_\tau\|_1$, subject to $$\frac{1}{N_t \cdot N_s \cdot N_f} \sum_{t=0}^{N_t-1} \sum_{s=0}^{N_s-1} \sum_{f=0}^{N_f-1} \frac{\|H(t, s, f) - \hat{H}(f)\|_2}{\|H(t, s, f)\|_2} \leq \varepsilon$$

where $$\hat{H}(f) = \sum_{m_\tau=0}^{M_\tau-1} \lambda_\tau(m_\tau) \cdot e^{2\pi j f \cdot m_\tau/M_\tau}$$

For the solution, we detect the delay indexes with non-negligible energy, $m_\tau \in T$, such that $|\lambda_\tau(m_\tau)|^2 \geq \varepsilon_\lambda$, where $\varepsilon_\lambda$ represents an energy detection threshold (which may correspond to the SNR of the channel). Then, embodiments may continue to solve for the next dimension, for example, the angular dimension. For the next optimization problem, we reduce the delay dimension from $M_\tau$ indexes, to the set of indexes, T. Thus, we solve the optimization problem of minimizing $\|\lambda_{\tau,\theta}\|_1$, subject to $$\frac{1}{N_t \cdot N_s \cdot N_f} \sum_{t=0}^{N_t-1} \sum_{s=0}^{N_s-1} \sum_{f=0}^{N_f-1} \frac{\|H(t, s, f) - \hat{H}(s, f)\|_2}{\|H(t, s, f)\|_2} \leq \varepsilon$$

where $$\hat{H}(s, f) = \sum_{m_\tau \in T} \sum_{m_\theta=0}^{M_\theta-1} \lambda_{\tau,\theta}(m_{\tau,\theta}) \cdot e^{2\pi j f \cdot m_\tau/M_\tau} \cdot e^{2\pi j s \cdot m_\theta/M_\theta}$$

Note, that the size of the optimization vector is now $T \cdot M_\theta$ and $m_{\tau,\theta}$ is an index to this vector, corresponding to delay indexes in T and angular indexes in $M_\theta$. For this solution, some embodiments may detect the delay-angular indexes with non-negligible energy, $m_{\tau,\theta} \in T\Theta$, such that $|\lambda_{\tau,\theta}(m_{\tau,\theta})|^2 \geq \varepsilon_\lambda$ and continue to the final dimension, Doppler. Here, embodiments may solve the optimization problem of minimizing $\|\lambda_{\tau,\theta,v}\|_1$, subject to $$\frac{1}{N_t \cdot N_s \cdot N_f} \sum_{t=0}^{N_t-1} \sum_{s=0}^{N_s-1} \sum_{f=0}^{N_f-1} \frac{\|H(t, s, f) - \hat{H}(t, s, f)\|_2}{\|H(t, s, f)\|_2} \leq \varepsilon$$

where $$\hat{H}(t, s, f) = \sum_{m_{\tau,\theta} \in T\Theta} \sum_{m_v=0}^{M_v-1} \lambda_{\tau,\theta,v}(m_{\tau,\theta,v}) \left( \cdot e^{2\pi j f \cdot m_\tau/M_\tau} \cdot e^{2\pi j s \cdot m_\theta/M_\theta} \cdot e^{2\pi j t \cdot m_v/M_v} \right)$$

The size of the optimization vector is now $T\Theta \cdot M_v$ and $m_{\tau,\theta,v}$ is an index to this vector, corresponding to delay indexes in T, angular indexes in $\Theta$ and Doppler indexes in $M_v$. Finally, embodiments may detect the Doppler indexes with non-negligible energy, $m_{\tau,\theta,v} \in T\Theta Y$, such that $|\lambda_{\tau,\theta,v}(m_{\tau,\theta,v})|^2 \geq \varepsilon_\lambda$. The final information, representing the sparse channel, is now a small set of $|T\Theta Y|$ values.

Now, for any selection of time, space and frequency grids, denoted by the indexes t', s' and f', we can use this representation to construct a covariance for the channel as $$\hat{H}(t', s', f') = \sum_{m_\tau \in T} \sum_{m_\theta \in \Theta} \sum_{m_\upsilon \in Y} \lambda_{\tau,\theta,\upsilon}(m_{\tau,\theta,\upsilon}) \cdot e^{2\pi j f' \cdot m_\tau / M_\tau} \cdot e^{2\pi j s' \cdot m_\theta / M_\theta} \cdot e^{2\pi j t' \cdot m_\upsilon / M_\upsilon}$$

$$R_{HH} = \hat{H}(t', s', f') \cdot \hat{H}^*(t', s', f')$$

3.2 Method 2—Maximum Likelihood

The following algorithm solves the optimization problem of finding the most likelihood covariance matrix, for an empirical channel measurement. Let's consider the function r(•), which translates a covariance from the delay, angular or Doppler dimensions, to frequency, space or time dimensions $$r(\alpha, \kappa, x) = \text{sinc}(\kappa \cdot x) \cdot e^{j2\pi \alpha x}$$

The covariance of the channel is a Toeplitz matrix generated by the function:

$$R = \sum_{\tau=0}^{M_\tau-1} \sum_{\theta=0}^{M_\theta-1} \sum_{\upsilon=0}^{M_\upsilon-1} \lambda_\tau(\tau) \cdot r(\tau, \kappa_\tau, f) \cdot \lambda_\theta(\theta) \cdot r(\theta, \kappa_\theta, s) \cdot \lambda_\upsilon(\upsilon) \cdot r(\upsilon, \kappa_\upsilon, t).$$

In the above equation, $M_\tau$, $M_\theta$ and $M_\upsilon$ are the desired resolutions in delay, angular and Doppler dimensions, $\kappa_\tau$, $\kappa_\theta$ and $\kappa_\upsilon$ are constants and f, s and t are indexes in the frequency, space and time grids. The variables $\lambda_\tau$, $\lambda_\theta$ and $\lambda_\upsilon$ are the unknown non-negative weights that needs to be determined for each element in these three dimensions. To find them, some embodiments may solve the optimization problem of finding the covariance R that maximizes the probability of getting the empirical channel response H. More formally, find $$R^* = \underset{R}{\text{argmax}} P(H \mid R)$$

where $$P(H \mid R) = \frac{1}{\sqrt{\pi \mid R \mid}} \cdot e^{-\frac{1}{2} H^H R^{-1} H}$$

One possible method for solving this, is to use convex optimization techniques for an equivalent minimization problem. The assumption of a sparse channel representation is not used explicitly to formalize the optimization problem. However, the geometric physical model of the channel in delay, angular and Doppler dimensions, implicitly implies of a sparse channel representation.

To reduce the complexity of solving such an optimization problem, it is possible to perform the optimization sequentially over the dimensions (in any order), in a similar way to the one described for method 1. First, we solve for one of the dimensions, for example delay. We find the delay covariance $$R_\tau(f) = \sum_{\tau=0}^{M_\tau-1} \lambda_\tau(\tau) \cdot r(\tau, \kappa_\tau, f)$$

that maximizes the probability $$P(H \mid R_\tau) = \frac{1}{\sqrt{\pi \mid R_\tau \mid}} \cdot e^{-\frac{1}{2} H^H R_\tau^{-1} H}$$

Then, some embodiments may detect the delay indexes with non-negligible energy, $\tau \in T$, such that $|\lambda_\tau(\tau)|^2 \geq \varepsilon_\lambda$, where $\varepsilon_\lambda$ represents an energy detection threshold (which may correspond to the SNR of the channel). Then, some embodiments may continue to solve for the next dimension, for example, the angular dimension. Some embodiments may find the delay-angular covariance matrix as follows:

$$R_{\tau\theta}(f, s) = \sum_{\tau \in T} \sum_{\theta=0}^{M_\theta-1} \lambda_{\tau\theta}(\tau, \theta) \cdot r(\tau, \kappa_\tau, f) \cdot r(\theta, \kappa_\theta, s)$$

that maximizes the probability $$P(H \mid R_{\tau\theta}) = \frac{1}{\sqrt{\pi \mid R_{\tau\theta} \mid}} \cdot e^{-\frac{1}{2} H^H R_{\tau\theta}^{-1} H}$$

Again, some embodiments may detect the delay-angular indexes with non-negligible energy, $\tau, \theta \in T\Theta$, such that $|\lambda_{\tau\theta}(\tau,\theta)|^2 \geq \varepsilon_\lambda$ and continue to solve for the final dimension, Doppler. Some embodiments may find the delay-angular-Doppler covariance matrix $$R_{\tau\theta\upsilon}(f, s, t) = \sum_{\tau,\theta \in T\Theta} \sum_{\upsilon=0}^{M_\upsilon-1} \lambda_{\tau\theta\upsilon}(\tau, \theta, \upsilon) \cdot r(\tau, \kappa_\tau, f) \cdot r(\theta, \kappa_\theta, s) \cdot r(\upsilon, \kappa_\upsilon, t)$$

that maximizes the probability $$P(H \mid R_{\tau\theta\upsilon}) = \frac{1}{\sqrt{\pi \mid R_{\tau\theta\upsilon} \mid}} \cdot e^{-\frac{1}{2} H^H R_{\tau\theta\upsilon}^{-1} H}$$

Finally, some embodiments may detect the delay-angular-Doppler indexes with non-negligible energy, $\tau, \theta, \upsilon \in T\Theta Y$, such that $|\lambda_{\tau\theta\upsilon}(\tau,\theta,\upsilon)|^2 \geq \varepsilon_\lambda$ and use them to construct a covariance for the channel for any selection of frequency, space and time grids, denoted by the indexes f', s' and t'

$$R(f', s', t') = \sum_{\tau,\theta,\upsilon \in T\Theta Y} \lambda_{\tau\theta\upsilon}(\tau, \theta, \upsilon) \cdot r(\tau, \kappa_\tau, f') \cdot r(\theta, \kappa_\theta, s') \cdot r(\upsilon, \kappa_\upsilon, t').$$

3.3 Detection Tree for Reduced Complexity

Figure 14:
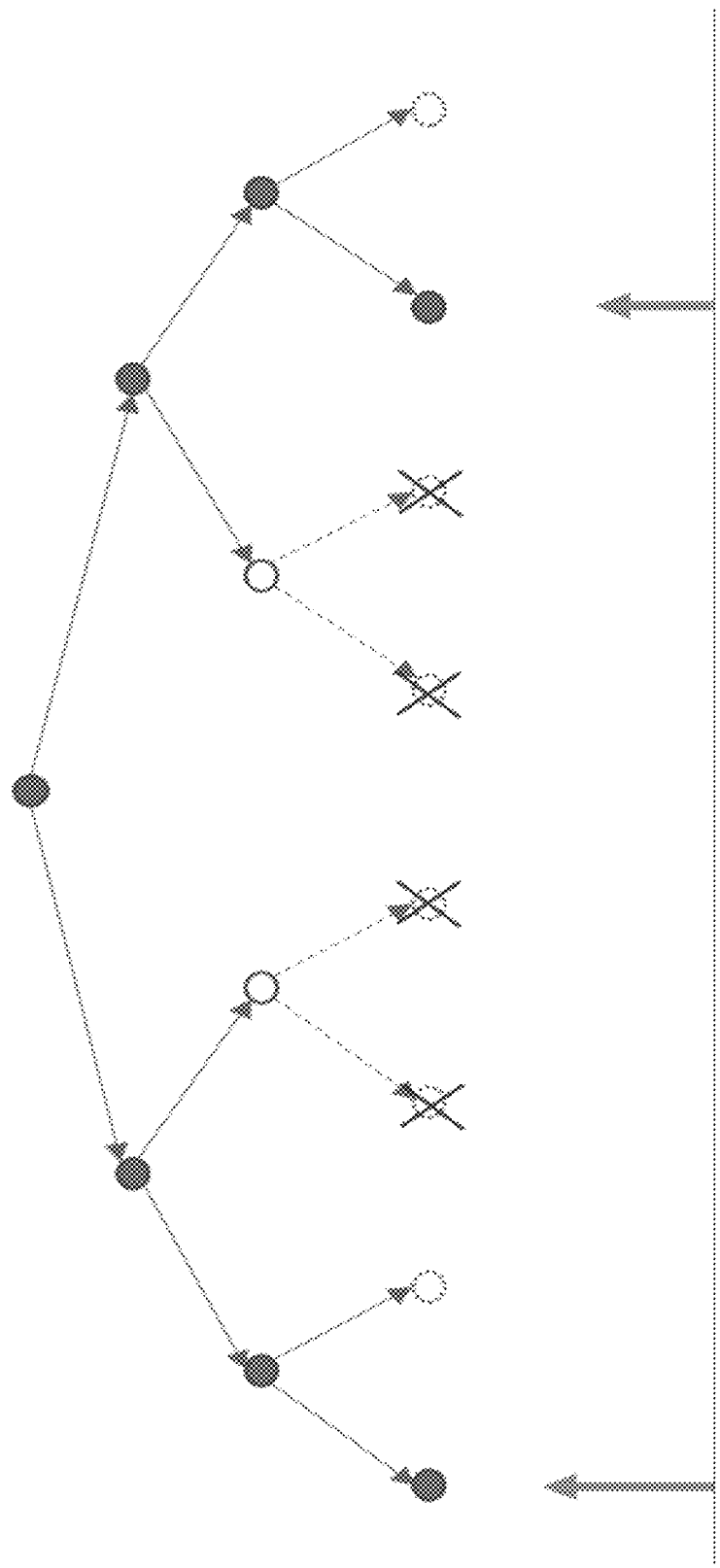
FIG. 14 is an illustrative example of a detection tree.

The optimization problems, solved for a grid size of M points in one of the dimensions can be iteratively solved by constructing the M points in a tree structure. For example, M=8 can be constructed as a tree of 3 levels, as shown in FIG. 14. For each tree level, l, some embodiments may solve the optimization problem for $m_l \leq M$. Then, some embodiments detect branches in the tree, where the total energy of the optimized vector is smaller than a threshold and eliminate them. The next level, will have a new $m_l$ value, that does not include the removed branches. In this way, when an execution gets to the bottom levels of the tree, the size of $m_l$ becomes smaller and smaller relative to M. Overall, this technique reduces the complexity significantly, especially when the number of detected elements (reflectors) is much smaller compare to the detection resolution M.

FIG. 14 shows a detection tree example for M=8. In each tree level, for every valid node, the detected energy is compared to a threshold. If it is above it, the descendant tree branches survive (solid nodes). If it is below it, the descendant tree branches are eliminated (dashed-lines nodes) and their descendant nodes are not processed anymore (marked with a cross). The first tree level processes two nodes and keeps them. The second tree level, processes 4 nodes and keep only two of them. The third tree level, processes 4 nodes and keeps two of them, corresponding to the location of the reflectors (arrows).

It will be appreciated by practitioners of the art that it is possible to use the detection tree for both method 1 and 2, described above.

3.4 Prediction Filter Examples

Once the reflectors are detected (method 1), or the covariance weights are determined (method 2), a covariance matrix can be constructed for any frequency, space and time grids. If we denote these grids as a set of elements, Y, and denote X as a subset of Y, and representing the grid elements for an instantaneous measurement of the channel as $H_X$, then the prediction filter may be computed as $$C = R_{YX'}(R_{XX})^{-1}$$

and the predicted channel is computed as $$\hat{H}_Y = C \cdot H_X$$

The matrices $R_{YX'}$ and $R_{XX}$ are a column decimated, and a row-column decimated, versions of the channel constructed covariance matrix. These matrices are decimated to the grid resources represented by X.

3.5 Channel Prediction in a Wireless System

The described techniques may be used for predicting the wireless channels in a Time Division Duplex (TDD) or a Frequency Division Duplex (FDD) system. Such a system may include base stations (BS) and multiple user equipment (UE). This technique is suitable for both stationary and mobile UE. Generally, these techniques are used to compute a correct covariance matrix representing the wireless channels, based on a sparse multi-dimensional geometric model, from a relatively small number of observations (in frequency, time and space). From this covariance matrix, a prediction filter is computed and applied to some channel measurements, to predict the channels in some or all the frequency, space and time dimensions. The predicted channels for the UE, along with other predicted channels for other UE, may be used to generate a precoded downlink transmission from one BS to multiple UE (Multi-User MIMO, Mu-MIMO), or from several BS to multiple UE (also known as CoMP—Coordinated Multi-Point or distributed Mu-MIMO).

Note, that although most of the computational load, described in the following paragraphs, is attributed to the BS (or some other network-side processing unit), some of it may be performed, in alternative implementations, in the UE.

3.5.1 TDD Systems

In this scenario, the BS predicts the wireless channels from its antennas to the UE in a future time instance. This may be useful for generating a precoded downlink transmission. The UE may transmit at certain time instances reference signals to the BS, from which the BS will estimate the wireless channels response. Note, that typically, a small number of time instances should be sufficient, which makes it a method, suitable for mobile systems. Then, the estimated channel responses (whole or partial), are used with one of the described methods, to determine the covariance matrix of the channels and compute a prediction filter. This processing may take place in the base station itself, or at a remote or a network-side processing unit (also known as "cloud" processing). The prediction filter may be applied to some of the channel responses already received, or to some other estimated channel responses, to generate a prediction of the wireless channels, at a future time instance and over the desired frequency and space grids.

3.5.2 FDD Systems

In this scenario too, the BS predicts the wireless channels from its antennas to the UE in a future time instance. However, the UE to BS uplink transmissions and the BS to UE downlink transmissions are over different frequency bands. The generation of the of prediction filter is similar to TDD systems. The UE may transmit at certain time instances reference signals to the BS, from which the BS will estimate the wireless channels response. Then, the estimated channel responses (whole or partial), are used with one of the described methods, to determine the covariance matrix of the channels and compute a prediction filter. In parallel, at any time instance, the BS may transmit reference signals to the UE. The UE will feedback to the BS through its uplink, some the received reference signals (all or partial), as raw or processed information (implicit/explicit feedback). The BS will generate, if needed, an estimated channel response for the downlink channel, from the information received from the UE and apply the prediction filter to it. The result is a predicted channel at the downlink frequency band and at a future time instance.

3.5.3 Self-Prediction for MCS Estimation

It is useful for the BS to know the quality of the prediction of the channels in order to determine correctly which modulation and coding (MCS) to use for its precoded transmission. The more accurate the channels are represented by the computed covariance matrix; the higher prediction quality is achieved, and the UE will have a higher received SNR.

4. Multiple Access and Precoding in OTFS

This section covers multiple access and precoding protocols that are used in typical OTFS systems. FIG. 15 depicts a typical example scenario in wireless communication is a hub transmitting data over a fixed time and bandwidth to several user devices (UEs). For example: a tower transmitting data to several cell phones, or a Wi-Fi router transmitting data to several devices. Such scenarios are called multiple access scenarios.

Orthogonal Multiple Access

Currently the common technique used for multiple access is orthogonal multiple access. This means that the hub breaks it's time and frequency resources into disjoint pieces and assigns them to the UEs. An example is shown in FIG. 16, where four UEs (UE1, UE2, UE3 and UE4) get four different frequency allocations and therefore signals are orthogonal to each other.

The advantage of orthogonal multiple access is that each UE experience its own private channel with no interference. The disadvantage is that each UE is only assigned a fraction of the available resource and so typically has a low data rate compared to non-orthogonal cases.

Precoding Multiple Access

Figure 17:
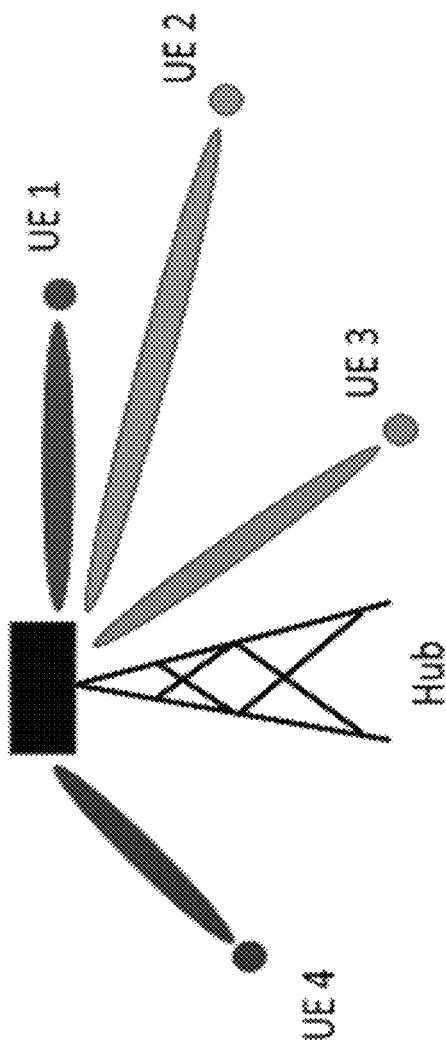
FIG. 17 illustrates the concept of precoding in an example network configuration.

Recently, a more advanced technique, precoding, has been proposed for multiple access. In precoding, the hub is equipped with multiple antennas. The hub uses the multiple antennas to create separate beams which it then uses to transmit data over the entire bandwidth to the UEs. An example is depicted in FIG. 17, which shows that the hub is able to form individual beams of directed RF energy to UEs based on their positions.

The advantage of precoding it that each UE receives data over the entire bandwidth, thus giving high data rates. The disadvantage of precoding is the complexity of implementation. Also, due to power constraints and noisy channel estimates the hub cannot create perfectly disjoint beams, so the UEs will experience some level of residual interference.

Introduction to Precoding

Precoding may be implemented in four steps: channel acquisition, channel extrapolation, filter construction, filter application.

Channel acquisition: To perform precoding, the hub determines how wireless signals are distorted as they travel from the hub to the UEs. The distortion can be represented mathematically as a matrix: taking as input the signal transmitted from the hubs antennas and giving as output the signal received by the UEs, this matrix is called the wireless channel.

Channel prediction: In practice, the hub first acquires the channel at fixed times denoted by $s_1, s_2, \ldots, s_n$. Based on these values, the hub then predicts what the channel will be at some future times when the pre-coded data will be transmitted, we denote these times denoted by $t_1, t_2, \ldots, t_m$.

Filter construction: The hub uses the channel predicted at $t_1, t_2, \ldots, t_m$ to construct precoding filters which minimize the energy of interference and noise the UEs receive.

Filter application: The hub applies the precoding filters to the data it wants the UEs to receive.

Channel Acquisition

This section gives a brief overview of the precise mathematical model and notation used to describe the channel.

Time and frequency bins: the hub transmits data to the UEs on a fixed allocation of time and frequency. This document denotes the number of frequency bins in the allocation by $N_f$ and the number of time bins in the allocation by $N_t$.

Number of antennas: the number of antennas at the hub is denoted by $L_h$, the total number of UE antennas is denoted by $L_u$.

Transmit signal: for each time and frequency bin the hub transmits a signal which we denote by $\varphi(f, t) \in \mathbb{C}^{L_h}$ for $f=1, \ldots N_f$ and $t=1, \ldots, N_t$.

Receive signal: for each time and frequency bin the UEs receive a signal which we denote by $y(f, t) \in \mathbb{C}^{L_u}$ for $f=1, \ldots, N_f$ and $t=1, \ldots, N_t$.

White noise: for each time and frequency bin white noise is modeled as a vector of iid Gaussian random variables with mean zero and variance $N_0$. This document denotes the noise by $w(f, t) \in \mathbb{C}^{L_u}$ for $f=1, \ldots, N_f$ and $t=1, \ldots, N_t$.

Channel matrix: for each time and frequency bin the wireless channel is represented as a matrix and is denoted by $H(f, t) \in \mathbb{C}^{L_u \times L_h}$ for $f=1, \ldots, N_f$ and $t=1, \ldots, N_t$.

Figure 18:
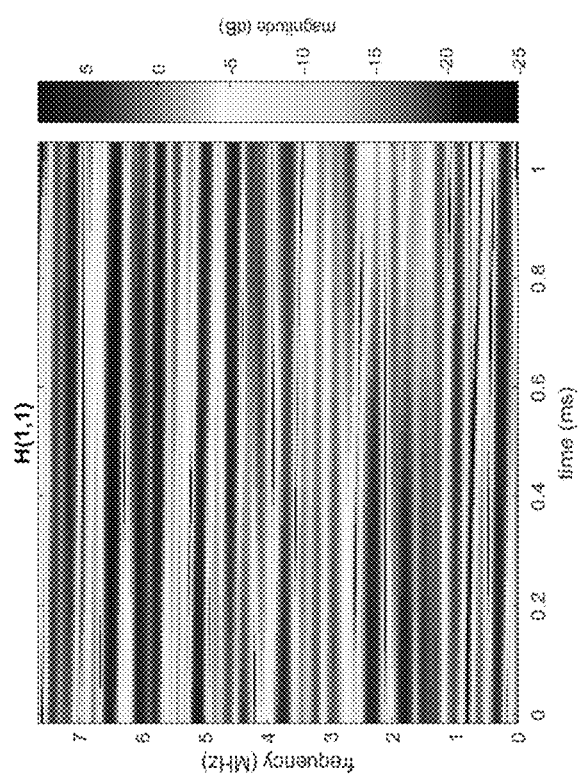
FIG. 18 is a spectral chart of an example of a wireless communication channel.

The wireless channel can be represented as a matrix which relates the transmit and receive signals through a simple linear equation:

$$y(f,t)=H(f,t)\varphi(f,t)+w(f,t) \qquad (1)$$

for $f=1, \ldots, N_f$ and $t=1, \ldots, N_t$. FIG. 18 shows an example spectrogram of a wireless channel between a single hub antenna and a single UE antenna. The graph is plotted with time as the horizontal axis and frequency along the vertical axis. The regions are shaded to indicate where the channel is strong or weak, as denoted by the dB magnitude scale shown in FIG. 18.

Two common ways are typically used to acquire knowledge of the channel at the hub: explicit feedback and implicit feedback.

Explicit Feedback

In explicit feedback, the UEs measure the channel and then transmit the measured channel back to the hub in a packet of data. The explicit feedback may be done in three steps.

Pilot transmission: for each time and frequency bin the hub transmits a pilot signal denoted by $p(f, t) \in \mathbb{C}^{L_h}$ for $f=1, \ldots, N_f$ and $t=1, \ldots, N_t$. Unlike data, the pilot signal is known at both the hub and the UEs.

Channel acquisition: for each time and frequency bin the UEs receive the pilot signal distorted by the channel and white noise:

$$H(f,t)p(f,t)+w(f,t), \qquad (2)$$

for $f=N_f$ and $t=1, \ldots, N_t$. Because the pilot signal is known by the UEs, they can use signal processing to compute an estimate of the channel, denoted by $\hat{H}(f, t)$.

Feedback: the UEs quantize the channel estimates $\hat{H}(f, t)$ into a packet of data. The packet is then transmitted to the hub.

The advantage of explicit feedback is that it is relatively easy to implement. The disadvantage is the large overhead of transmitting the channel estimates from the UEs to the hub.

Implicit Feedback

Figure 19:
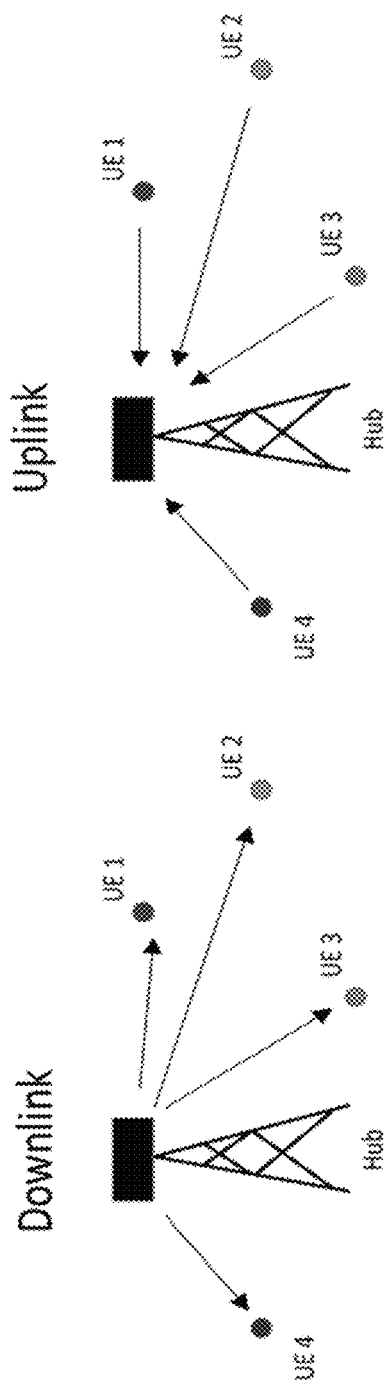
FIG. 19 illustrates examples of downlink and uplink transmission directions.

Implicit feedback is based on the principle of reciprocity which relates the uplink channel (UEs transmitting to the hub) to the downlink channel (hub transmitting to the UEs). FIG. 19 shows an example configuration of uplink and downlink channels between a hub and multiple UEs.

Specifically, denote the uplink and downlink channels by $H_{up}$ and H respectively, then:

$$H(f,t)=AH_{up}^T(f,t)B, \qquad (3)$$

for $f=1, \ldots, N_f$ and $t=1, \ldots, N_t$. Where $H_{up}^T(f, t)$ denotes the matrix transpose of the uplink channel. The matrices A $\in \mathbb{C}^{L_u \times L_u}$ and $B \in \mathbb{C}^{L_h \times L_h}$ represent hardware non-idealities. By performing a procedure called reciprocity calibration, the effect of the hardware non-idealities can be removed, thus giving a simple relationship between the uplink and downlink channels:

$$H(f,t)=H_{up}^T(f,t) \qquad (4)$$

The principle of reciprocity can be used to acquire channel knowledge at the hub. The procedure is called implicit feedback and consists of three steps.

Reciprocity calibration: the hub and UEs calibrate their hardware so that equation (4) holds.

Pilot transmission: for each time and frequency bin the UEs transmits a pilot signal denoted by $p(f, t) \in \mathbb{C}^{L_u}$ for $f=1, \ldots, N_f$ and $t=1, \ldots, N_t$. Unlike data, the pilot signal is known at both the hub and the UEs.

Channel acquisition: for each time and frequency bin the hub receives the pilot signal distorted by the uplink channel and white noise:

$$H_{up}(f,t)p(f,t)+w(f,t) \qquad (5)$$

for $f=1, \ldots, N_f$ and $t=1, \ldots, N_t$. Because the pilot signal is known by the hub, it can use signal processing to compute an estimate of the uplink channel, denoted by $\hat{H}_{up}(f, t)$. Because reciprocity calibration has been performed the hub can take the transpose to get an estimate of the downlink channel, denoted by $\hat{H}(f, t)$.

The advantage of implicit feedback is that it allows the hub to acquire channel knowledge with very little overhead; the disadvantage is that reciprocity calibration is difficult to implement.

Channel Prediction

Figure 20:
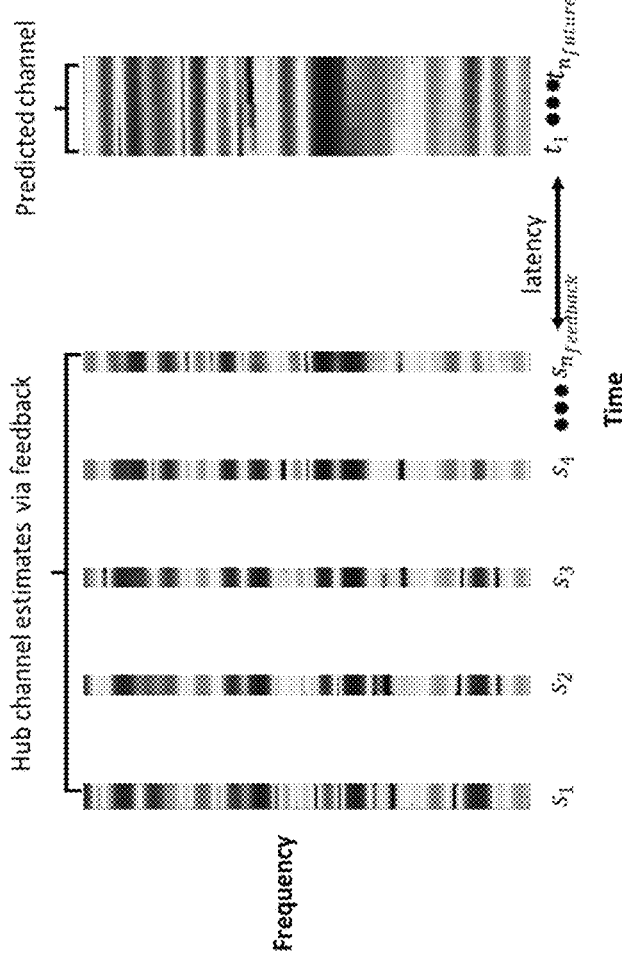
FIG. 20 illustrates spectral effects of an example of a channel prediction operation.

Using either explicit or implicit feedback, the hub acquires estimates of the downlink wireless channel at certain times denoted by $s_1, s_2, \ldots, s_n$ using these estimates it must then predict what the channel will be at future times when the precoding will be performed, denoted by $t_1, t_2, \ldots, t_m$. FIG. 20 shows this setup in which "snapshots" of channel are estimated, and based on the estimated snapshots, a prediction is made regarding the channel at a time in the future. As depicted in FIG. 20, channel estimates may be available across the frequency band at a fixed time slots, and based on these estimates, a predicated channel is calculated.

There are tradeoffs when choosing the feedback times $s_1, s_2, \ldots, s_n$.

Latency of extrapolation: Refers to the temporal distance between the last feedback time, $s_n$, and the first prediction time, $t_1$, determines how far into the future the hub needs to predict the channel. If the latency of extrapolation is large, then the hub has a good lead time to compute the pre-coding filters before it needs to apply them. On the other hand, larger latencies give a more difficult prediction problem.

Density: how frequent the hub receives channel measurements via feedback determines the feedback density. Greater density leads to more accurate prediction at the cost of greater overhead.

There are many channel prediction algorithms in the literature. They differ by what assumptions they make on the mathematical structure of the channel. The stronger the assumption, the greater the ability to extrapolate into the future if the assumption is true. However, if the assumption is false then the extrapolation will fail. For example:

Polynomial extrapolation: assumes the channel is smooth function. If true, can extrapolate the channel a very short time into the future≈0.5 ms.

Bandlimited extrapolation: assumes the channel is a bandlimited function. If true, can extrapolated a short time into the future≈1 ms.

MUSIC extrapolation: assumes the channel is a finite sum of waves. If true, can extrapolate a long time into the future 10 ms.

Precoding Filter Computation and Application

Using extrapolation, the hub computes an estimate of the downlink channel matrix for the times the pre-coded data will be transmitted. The estimates are then used to construct precoding filters. Precoding is performed by applying the filters on the data the hub wants the UEs to receive. Before going over details we introduce notation.

Channel estimate: for each time and frequency bin the hub has an estimate of the downlink channel which we denote by $\hat{H}(f, t) \in \mathbb{C}^{L_u \times L_h}$ for $f=1, \ldots, N_f$ and $t=1, \ldots, N_t$.

Precoding filter: for each time and frequency bin the hub uses the channel estimate to construct a precoding filter which we denote by $W(f, t) \in \mathbb{C}^{L_h \times L_u}$ for $f=1, N_f$ and $t=1, \ldots, N_t$.

Data: for each time and frequency bin the UE wants to transmit a vector of data to the UEs which we denote by $x(f, t) \Sigma \mathbb{C}^{L_u}$ for $f=1, \ldots, N_f$ and $t=1, \ldots, N_t$.

Hub Energy Constraint

When the precoder filter is applied to data, the hub power constraint is an important consideration. We assume that the total hub transmit energy cannot exceed $N_f N_t L_h$. Consider the pre-coded data:

$$W(f,t)x(f,t), \quad (6)$$

for $f=1, \ldots, N_f$ and $t=1, \ldots, N_t$. To ensure that the pre-coded data meets the hub energy constraints the hub applies normalization, transmitting:

$$\lambda W(f,t)x(f,t), \quad (7)$$

for $f=N_f$ and $t=1, \ldots, N_t$. Where the normalization constant $\lambda$ is given by:

$$\lambda = \sqrt{\frac{N_f N_t L_h}{\Sigma_{f,t} \|W(f, t)x(f, t)\|^2}} \quad (8)$$

Receiver SNR

The pre-coded data then passes through the downlink channel, the UEs receive the following signal:

$$\lambda H(f,t)W(f,t)x(f,t)+w(f,t), \quad (9)$$

for $f=1, \ldots, N_f$ and $t=1, \ldots, N_t$. The UE then removes the normalization constant, giving a soft estimate of the data:

$$x_{soft}(f, t) = H(f, t)W(f, t)x(f, t) + \frac{1}{\lambda}w(f, t), \quad (10)$$

for $f=1, \ldots, N_f$ and $t=1, \ldots, N_t$. The error of the estimate is given by:

$$x_{soft}(f, t) - x(f, t) = H(f, t)W(f, t)x(f, t) - x(f, t) + \frac{1}{\lambda}w(f, t), \quad (11)$$

The error of the estimate can be split into two terms. The term $H(f, t)W(f, t)-x(f, t)$ is the interference experienced by the UEs while the term $$\frac{1}{\lambda}w(f, t)$$

gives the noise experienced by the UEs.

When choosing a pre-coding filter there is a tradeoff between interference and noise. We now review the two most popular pre-coder filters: zero-forcing and regularized zero-forcing.

Zero Forcing Precoder

Figure 21:
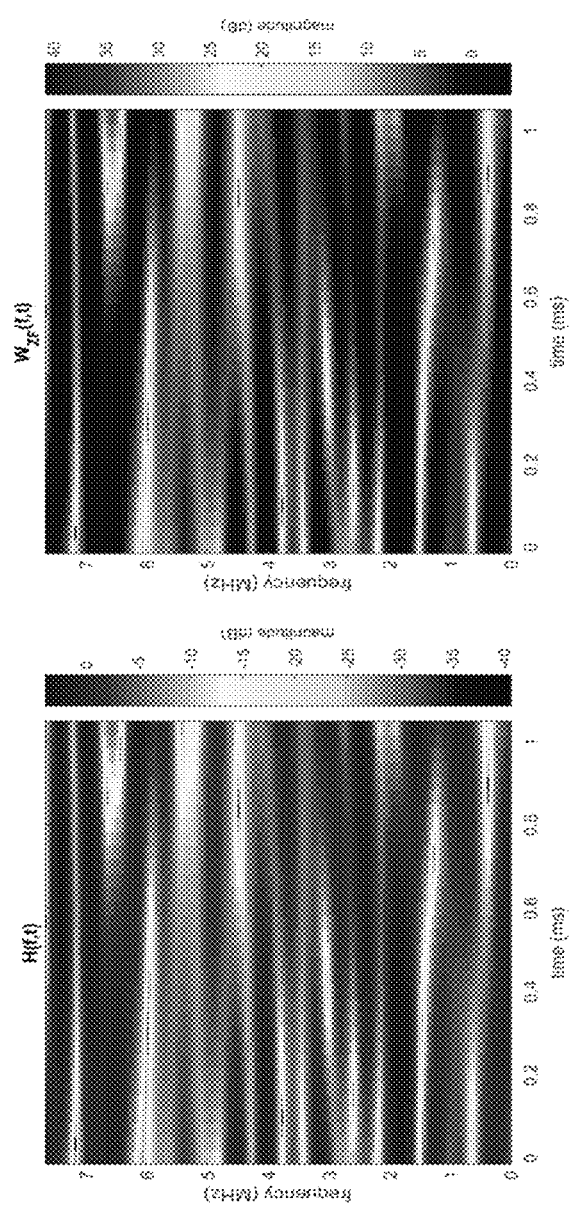
FIG. 21 graphically illustrates operation of an example implementation of a zero-forcing precoder (ZFP).

The hub constructs the zero forcing pre-coder (ZFP) by inverting its channel estimate:

$$W_{ZF}(f,t)=(\hat{H}^*(f,t)\hat{H}(f,t))^{-1}\hat{H}^*(f,t), \quad (12)$$

for $f=1, \ldots, N_f$ and $t=1, \ldots, N_t$. The advantage of ZPP is that the UEs experience little interference (if the channel estimate is perfect then the UEs experience no interference). The disadvantage of ZFP is that the UEs can experience a large amount of noise. This is because at time and frequency bins where the channel estimate R (f, t) is very small the filter $W_{ZF}$ (f, t) will be very large, thus causing the normalization constant $\lambda$ to be very small giving large noise energy. FIG. 21 demonstrates this phenomenon for a SISO channel.

Regularized Zero-Forcing Pre-Coder (rZFP)

Figure 22:
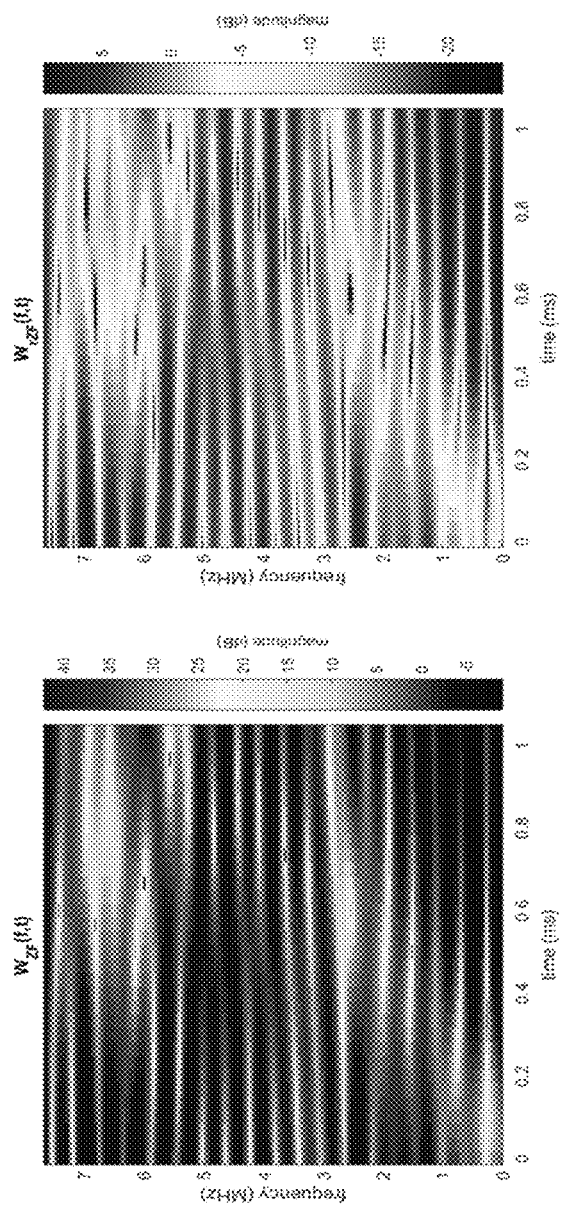
FIG. 22 graphically compares two implementations—a ZFP implementation and regularized ZFP implementation (rZFP).

To mitigates the effect of channel nulls (locations where the channel has very small energy) the regularized zero forcing precoder (rZFP) is constructed be taking a regularized inverse of its channel estimate:

$$W_{rZF}(f,t)=(\hat{H}^*(f,t)\hat{H}(f,t)+\alpha I)^{-1}\hat{H}^*(f,t), \quad (13)$$

for f=1, ..., $N_f$ and t=1, ..., $N_t$. Where $\alpha>0$ is the normalization constant. The advantage of rZFP is that the noise energy is smaller compared to ZPF. This is because rZFP deploys less energy in channel nulls, thus the normalization constant $\lambda$ is larger giving smaller noise energy. The disadvantage of rZFP is larger interference compared to ZFP. This is because the channel is not perfectly inverted (due to the normalization constant), so the UEs will experience residual interference. FIG. 22 demonstrates this phenomenon for a SISO channel.

Figure 23:
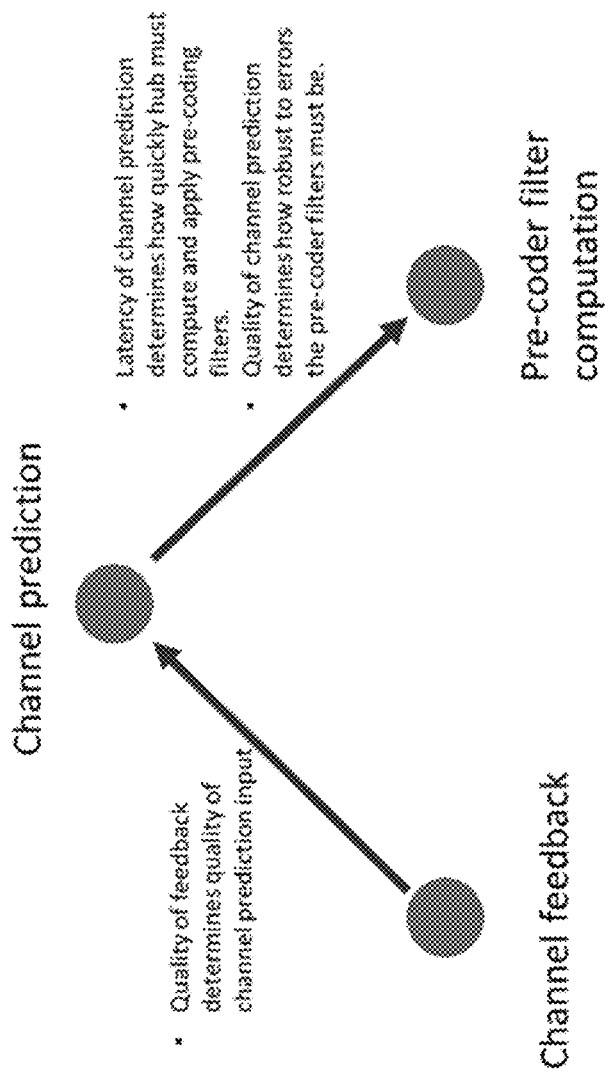
FIG. 23 shows components of an example embodiment of a precoding system.

As described above, there are three components to a precoding system: a channel feedback component, a channel prediction component, and a pre-coding filter component. The relationship between the three components is displayed in FIG. 23.

OTFS Precoding System

Various techniques for implementing OTFS precoding system are discussed. Some disclosed techniques can be used to provide the ability to shape the energy distribution of the transmission signal. For example, energy distribution may be such that the energy of the signal will be high in regions of time frequency and space where the channel information and the channel strength are strong. Conversely, the energy of the signal will be low in regions of time frequency and space where the channel information or the channel strength are weak.

Figure 24:
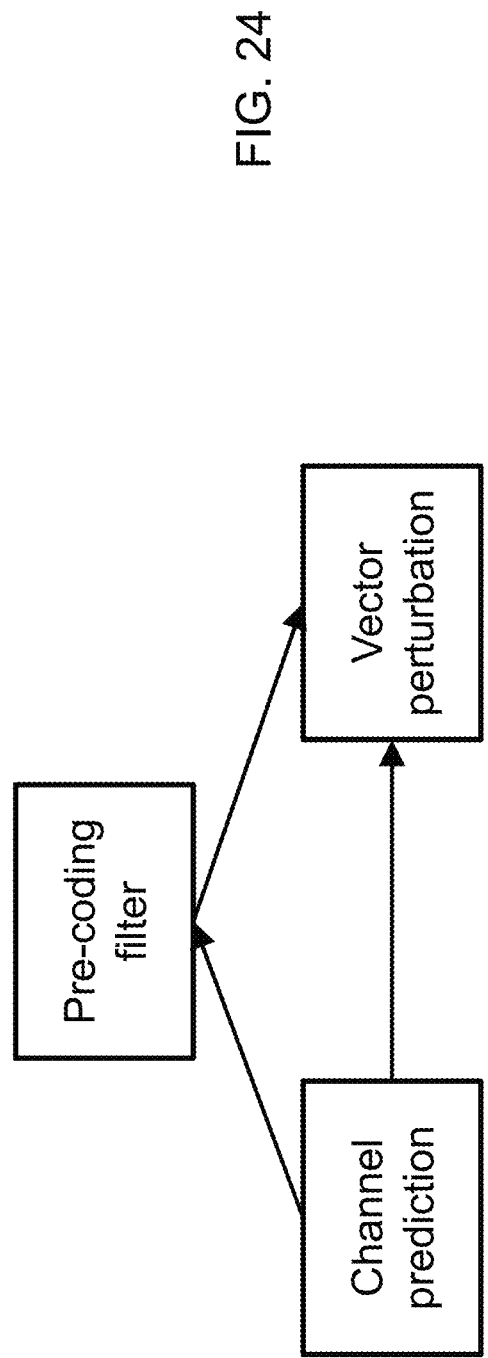
FIG. 24 is a block diagram depiction of an example of a precoding system.

Some embodiments may be described with reference to three main blocks, as depicted in FIG. 24.

Channel prediction: During channel prediction, second order statistics are used to build a prediction filter along with the covariance of the prediction error.

Optimal precoding filter: using knowledge of the predicted channel and the covariance of the prediction error: the hub computes the optimal precoding filter. The filter shapes the spatial energy distribution of the transmission signal.

Vector perturbation: using knowledge of the predicted channel, precoding filter, and prediction error, the hub perturbs the transmission signal. By doing this the hub shapes the time, frequency, and spatial energy distribution of the transmission signal.

Review of OTFS Modulation

A modulation is a method to transmit a collection of finite symbols (which encode data) over a fixed allocation of time and frequency. A popular method used today is Orthogonal Frequency Division Multiplexing (OFDM) which transmits each finite symbol over a narrow region of time and frequency (e.g., using subcarriers and timeslots). In contrast, Orthogonal Time Frequency Space (OTFS) transmits each finite symbol over the entire allocation of time and frequency. Before going into details, we introduce terminology and notation.

We call the allocation of time and frequency a frame. We denote the number of subcarriers in the frame by $N_f$. We denote the subcarrier spacing by df. We denote the number of OFDM symbols in the frame by $N_t$. We denote the OFDM symbol duration by dt. We call a collection of possible finite symbols an alphabet, denoted by A.

A signal transmitted over the frame, denoted by $\varphi$, can be specified by the values it takes for each time and frequency bin:

$$\varphi(f,t)\in\mathbb{C}, \quad (14)$$

for f=1, ..., $N_f$ and t=1, ..., $N_t$.

Figure 26:
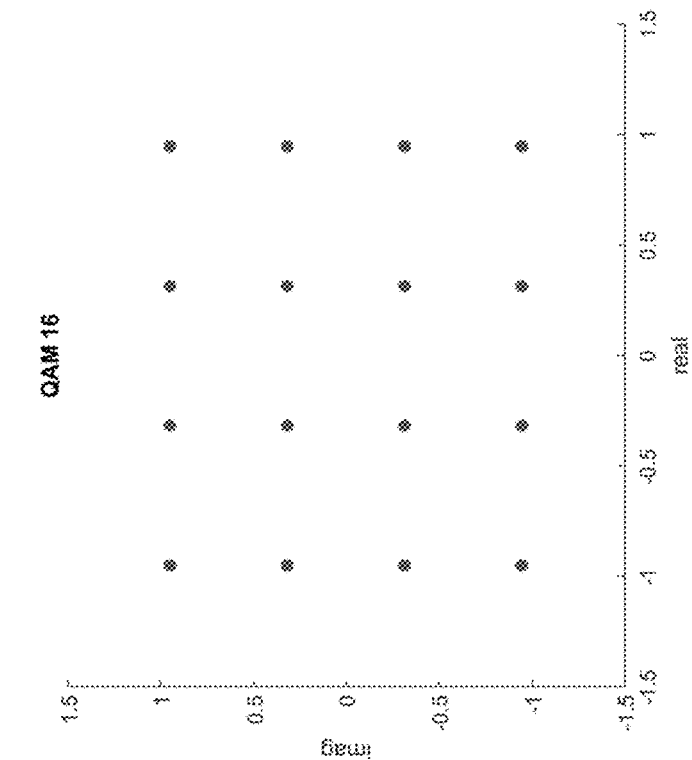
FIG. 26 shows another example of QAM constellation.
Figure 25:
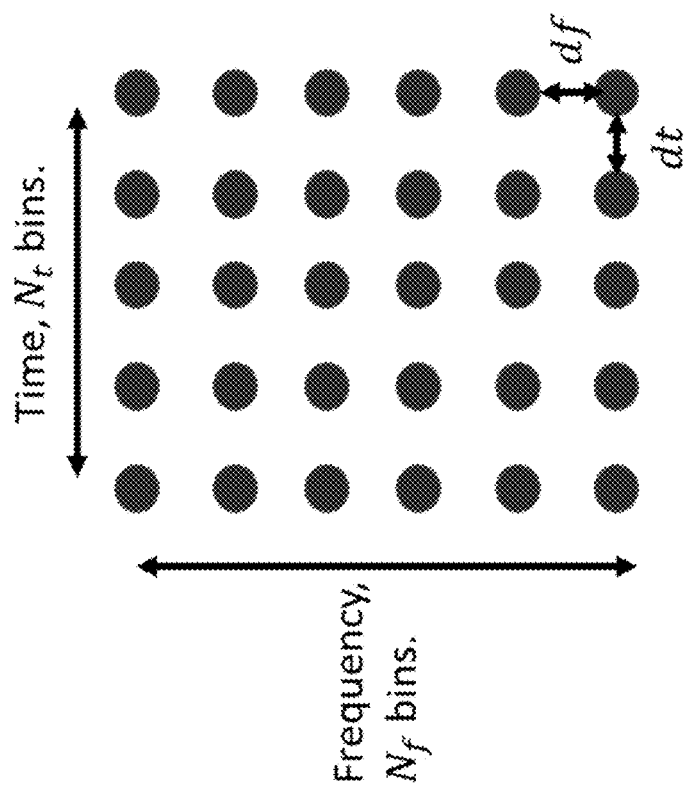
FIG. 25 shows an example of a quadrature amplitude modulation (QAM) constellation.

FIG. 25 shows an example of a frame along time (horizontal) axis and frequency (vertical) axis. FIG. 26 shows an example of the most commonly used alphabet: Quadrature Amplitude Modulation (QAM).

OTFS Modulation

Suppose a transmitter has a collection of $N_f N_t$ QAM symbols that the transmitter wants to transmit over a frame, denoted by:

$$x(f,t)\in A, \quad (15)$$

for f=1, ..., $N_f$ and t=1, ..., $N_t$. OFDM works by transmitting each QAM symbol over a single time frequency bin:

$$\varphi(f,t)=x(f,t), \quad (16a)$$

for f=1, ..., $N_f$ and t=1, ..., $N_t$. The advantage of OFDM is its inherent parallelism, this makes many computational aspects of communication very easy to implement. The disadvantage of OFDM is fading, that is, the wireless channel can be very poor for certain time frequency bins. Performing pre-coding for these bins is very difficult.

The OTFS modulation is defined using the delay Doppler domain, which is relating to the standard time frequency domain by the two-dimensional Fourier transform.

The delay dimension is dual to the frequency dimension. There are $N_\tau$ delay bins with $N_\tau=N_f$. The Doppler dimension is dual to the time dimension. There are $N_\nu$ Doppler bins with $N_\nu=N_t$.

A signal in the delay Doppler domain, denoted by $\phi$, is defined by the values it takes for each delay and Doppler bin:

$$\phi(\tau,\nu)\in\mathbb{C}, \quad (16b)$$

for $\tau=$, 1, ..., $N_\tau$, and $\nu=1, ..., N_\nu$.

Given a signal $\phi$ in the delay Doppler domain, some transmitter embodiments may apply the two-dimensional Fourier transform to define a signal $\varphi$ in the time frequency domain:

$$\varphi(f,t)=(F\phi)(f,t), \quad (17)$$

for f=1, ..., $N_f$ and t=1, ..., $N_t$. Where F denotes the two-dimensional Fourier transform.

Conversely, given a signal $\phi$ in the time frequency domain, transmitter embodiments could apply the inverse two-dimensional Fourier transform to define a signal $\phi$ in the delay Doppler domain:

$$\phi(\tau,\nu)=(F^{-1}\varphi)(\tau,\nu), \quad (18)$$

for $\tau=1, ..., N_\tau$ and $\nu=1, ..., N_\nu$.

Figure 27:
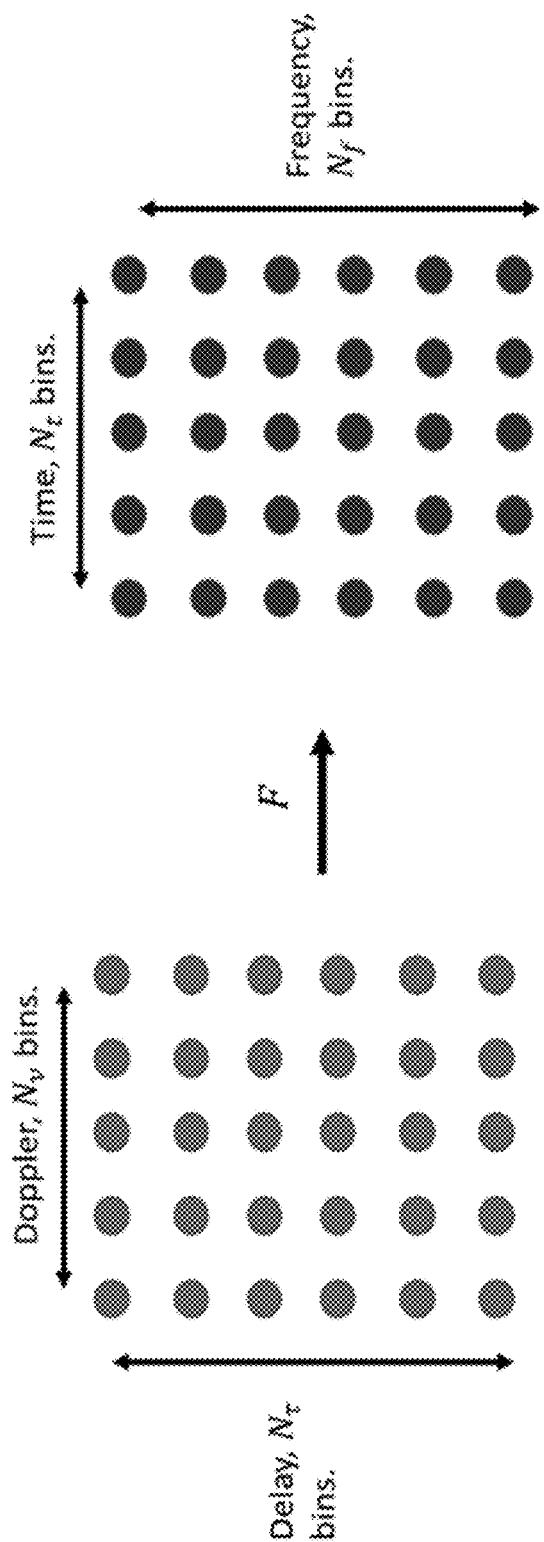
FIG. 27 pictorially depicts an example of relationship between delay-Doppler domain and time-frequency domain.

FIG. 27 depicts an example of the relationship between the delay Doppler and time frequency domains.

The advantage of OTFS is that each QAM symbol is spread evenly over the entire time frequency domain (by the two-two-dimensional Fourier transform), therefore each QAM symbol experience all the good and bad regions of the channel thus eliminating fading. The disadvantage of OTFS is that the QAM spreading adds computational complexity.

MMSE Channel Prediction

Channel prediction is performed at the hub by applying an optimization criterion, e.g., the Minimal Mean Square Error (MMSE) prediction filter to the hub's channel estimates (acquired by either implicit or explicit feedback). The MMSE filter is computed in two steps. First, the hub computes empirical estimates of the channel's second order statistics. Second, using standard estimation theory, the hub uses the second order statistics to compute the MMSE prediction filter. Before going into details, we introduce notation:

We denote the number of antennas at the hub by $L_h$. We denote the number of UE antennas by $L_u$. We index the UE antennas by u=1, ..., $L_u$. We denote the number frequency bins by $N_f$. We denote the number of feedback times by $n_{past}$.

Figure 28:
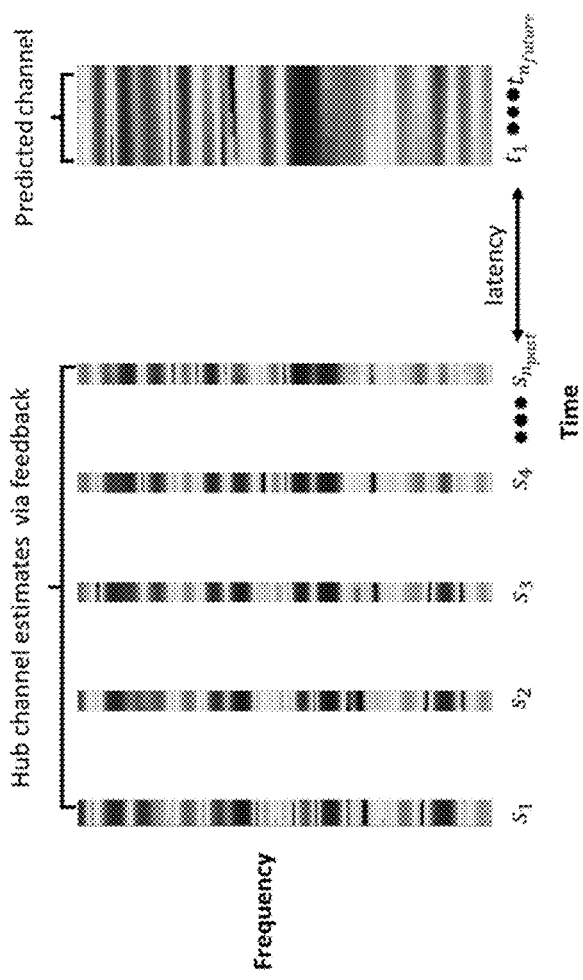
FIG. 28 is a spectral graph of an example of an extrapolation process.

We denote the number of prediction times by $n_{future}$. FIG. 28 shows an example of an extrapolation process setup.

For each UE antenna, the channel estimates for all the frequencies, hub antennas, and feedback times can be combined to form a single $N_f L_h n_{past}$ dimensional vector. We denote this by:

$$\hat{H}_{past}(u) \in \mathbb{C}^{N_f L_h n_{past}}, \quad (19)$$

Likewise, the channel values for all the frequencies, hub antennas, and prediction times can be combined to form a single $N_f L_h n_{future}$ dimensional vector. We denote this by:

$$H_{future}(u) \in \mathbb{C}^{N_f L_h n_{future}}, \quad (20)$$

In typical implementations, these are extremely high dimensional vectors and that in practice some form of compression should be used. For example, principal component compression may be one compression technique used.

Empirical Second Order Statistics

Empirical second order statistics are computed separately for each UE antenna in the following way:

At fixed times, the hub receives through feedback N samples of $\hat{H}_{past}(u)$ and estimates of $H_{future}(u)$. We denote them by: $\hat{H}_{past}(u)_i$ and $\hat{H}_{future}(u)_i$ for $i=1, \ldots, N$.

The hub computes an estimate of the covariance of $\hat{H}_{past}(u)$, which we denote by $\hat{R}_{past}(u)$:

$$\hat{R}_{past}(u) = \frac{1}{N} \sum_{i=1}^{N} \hat{H}_{past}(u)_i \hat{H}_{past}(u)_i^* \quad (21)$$

The hub computes an estimate of the covariance of $H_{future}(u)$, which we denote by $\hat{R}_{future}(u)$:

$$\hat{R}_{future}(u) = \frac{1}{N} \sum_{i=1}^{N} \hat{H}_{future}(u)_{(i)} \hat{H}_{future}(u)_i^* \quad (22)$$

The hub computes an estimate of the correlation between $H_{future}(u)$ and $\hat{H}_{past}(u)$, which we denote by $\hat{R}_{past,future}(u)$:

$$\hat{R}_{future,past}(u) = \frac{1}{N} \sum_{i=1}^{N} \hat{H}_{future}(u)_i \hat{H}_{past}(u)_i^* \quad (23)$$

In typical wireless scenarios (pedestrian to highway speeds) the second order statistics of the channel change slowly (on the order of 1-10 seconds). Therefore, they should be recomputed relatively infrequently. Also, in some instances it may be more efficient for the UEs to compute estimates of the second order statistics and feed these back to the hub.

MMSE Prediction Filter

Using standard estimation theory, the second order statistics can be used to compute the MMSE prediction filter for each UE antenna:

$$C(u) = \hat{R}_{future,past}(u) \hat{R}_{past}^{-1}(u), \quad (24)$$

Where $C(u)$ denotes the MMSE prediction filter. The hub can now predict the channel by applying feedback channel estimates into the MMSE filter:

$$\hat{H}_{future}(u) = C(u) \hat{H}_{past}(u). \quad (25)$$

Prediction Error Variance

We denote the MMSE prediction error by $\Delta H_{future}(u)$, then:

$$H_{future}(u) = \hat{H}_{future}(u) + \Delta H_{future}(u). \quad (26)$$

We denote the covariance of the MMSE prediction error by $R_{error}(u)$, with:

$$R_{error}(u) = \mathbb{E}[\Delta H_{future}(u) \Delta H_{future}(u)^*] \quad (27)$$

Using standard estimation theory, the empirical second order statistics can be used to compute an estimate of $R_{error}(u)$:

$$\hat{R}_{error}(u) = C(u) \hat{R}_{past}(u) C(u)^* - C(u) \hat{R}_{future,past}(u)^* - \hat{R}_{future,past}(u) C(u)^* + \hat{R}_{future}(u) \quad (28)$$

Simulation Results

Figure 29:
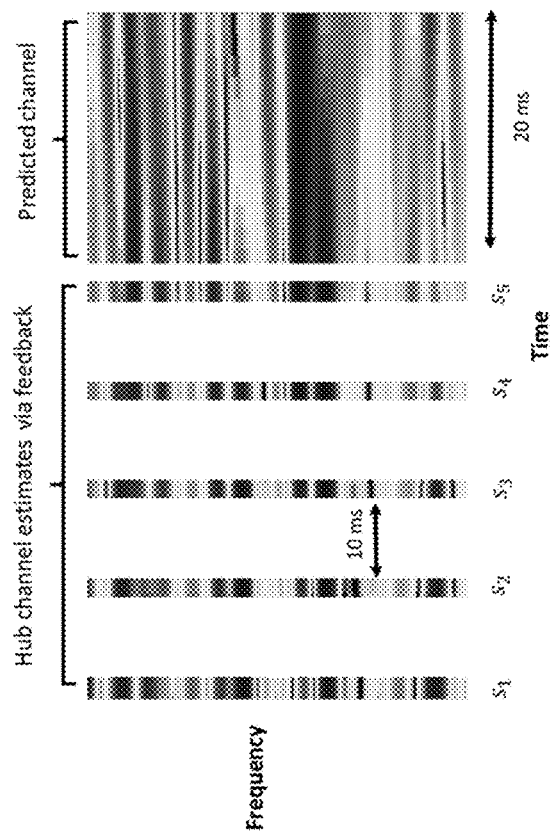
FIG. 29 is a spectral graph of another example of an extrapolation process.

We now present simulation results illustrating the use of the MMSE filter for channel prediction. Table 1 gives the simulation parameters and FIG. 29 shows the extrapolation setup for this example.

TABLE 1

| | |
|---|---|
| Subcarrier spacing | 15 kHz |
| Number of subcarriers | 512 |
| Delay spread | 3 μs |
| Doppler spread | 600 Hz |
| Number of channel feedback estimates | 5 |
| Spacing of channel feedback estimates | 10 ms |
| Prediction range | 0-20 ms into the future |

Figure 30:
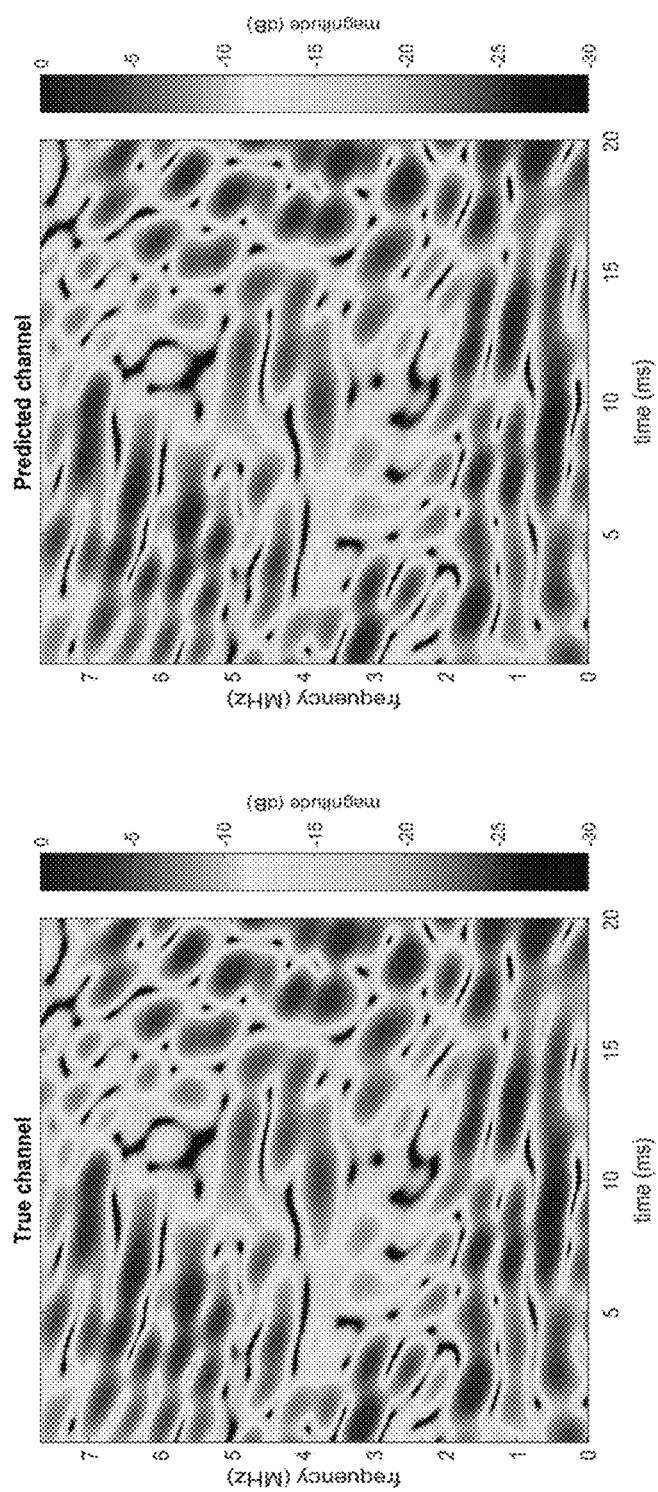
FIG. 30 compares spectra of a true and a predicted channel in some precoding implementation embodiments.

Fifty samples of $\hat{H}_{past}$ and $\hat{H}_{future}$ were used to compute empirical estimates of the second order statistics. The second order statistics were used to compute the MMSE prediction filter. FIG. 30 shows the results of applying the filter. The results have shown that the prediction is excellent at predicting the channel, even 20 ms into the future.

Block Diagrams

Figure 31:
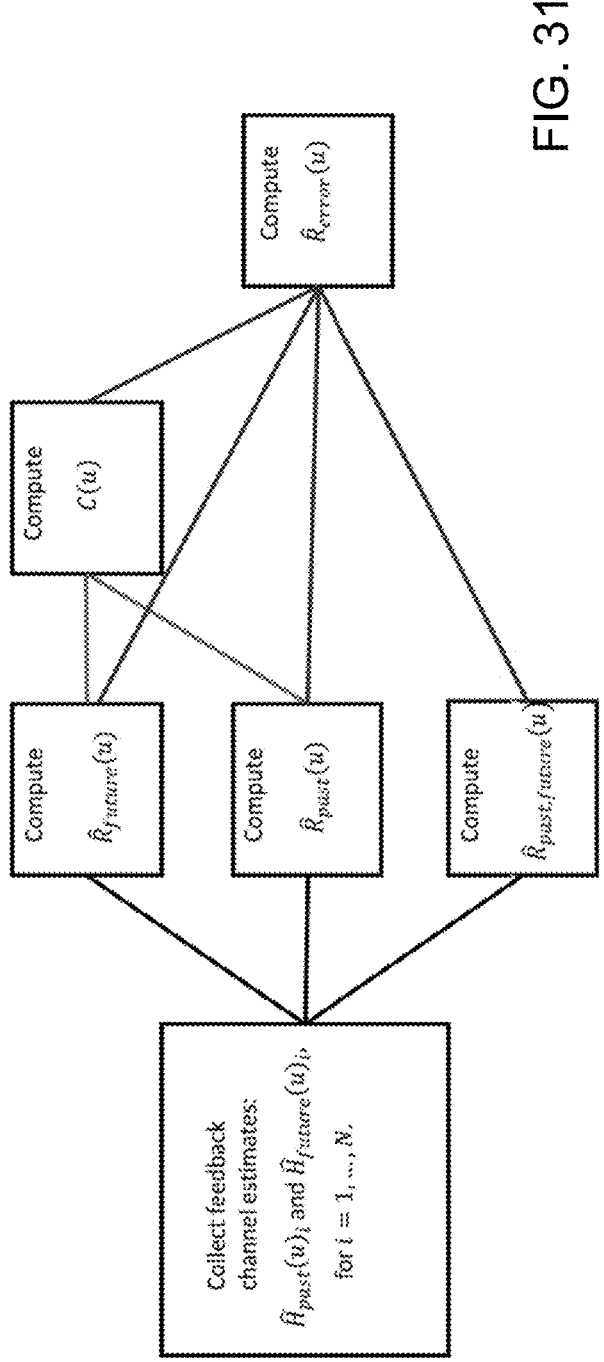
FIG. 31 is a block diagram depiction of a process for computing prediction filter and error covariance.

In some embodiments, the prediction is performed independently for each UE antenna. The prediction can be separated into two steps:

1) Computation of the MMSE prediction filter and prediction error covariance: the computation can be performed infrequently (on the order of seconds). The computation is summarized in FIG. 31. Starting from left in FIG. 31, first, feedback channel estimates are collected. Next, the past, future and future/past correlation matrices are computed. Next the filter estimate $C(u)$ and the error estimate are computed.

Figure 32:
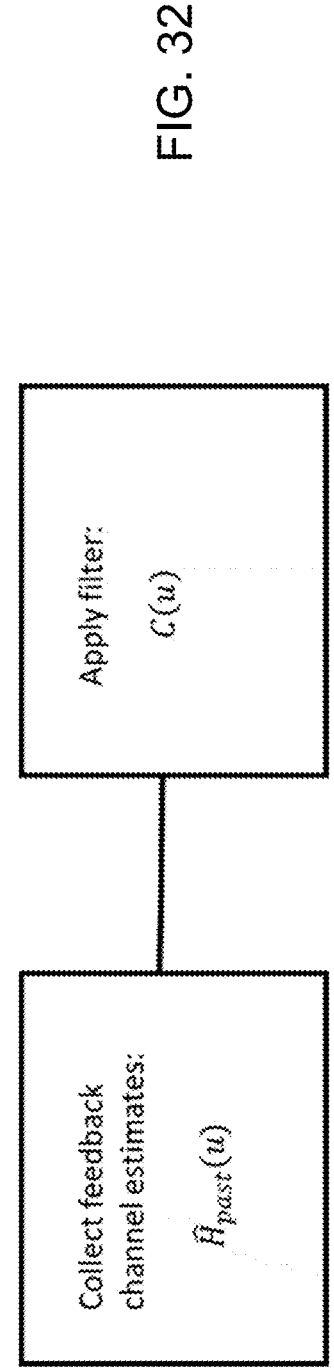
FIG. 32 is a block diagram illustrating an example of a channel prediction process.

2) Channel prediction: is performed every time precoding is performed. The procedure is summarized in FIG. 32.

Optimal Precoding Filter

Using MMSE prediction, the hub computes an estimate of the downlink channel matrix for the allocation of time and frequency the pre-coded data will be transmitted. The estimates are then used to construct precoding filters. Precoding is performed by applying the filters on the data the hub wants the UEs to receive. Embodiments may derive the "optimal" precoding filters as follows. Before going over details we introduce notation.

Frame (as defined previously): precoding is performed on a fixed allocation of time and frequency, with $N_f$ frequency bins and $N_t$ time bins. We index the frequency bins by: $f = 1, \ldots, N_f$. We index the time bins by $t = 1, \ldots, N_t$.

Channel estimate: for each time and frequency bin the hub has an estimate of the downlink channel which we denote by $\hat{H}(f, t) \in \mathbb{C}^{L_u \times L_h}$.

Error correlation: we denote the error of the channel estimates by $\Delta H(f, t)$, then:

$$H(f,t) = \hat{H}(f,t) + \Delta H(f,t), \quad (29)$$

We denote the expected matrix correlation of the estimation error by $R_{\Delta H}(f, t) \in \mathbb{C}^{L_h \times L_h}$, with:

$$R_{\Delta H}(f,t) = \mathbb{E}[\Delta H(f,t)^* \Delta H(f,t)]. \tag{30}$$

The hub can be easily compute these using the prediction error covariance matrices computed previously: $\hat{R}_{error}(u)$ for $u=1, \ldots, L_u$.

Signal: for each time and frequency bin the UE wants to transmit a signal to the UEs which we denote by $s(f, t) \in \mathbb{C}^{L_u}$.

Precoding filter: for each time and frequency bin the hub uses the channel estimate to construct a precoding filter which we denote by $W(f, t) \in \mathbb{C}^{L_h \times L_u}$.

White noise: for each time and frequency bin the UEs experience white noise which we denote by $n(f, t) \in \mathbb{C}^{L_u}$. We assume the white noise is iid Gaussian with mean zero and variance $N_0$.

Hub Energy Constraint

When the precoder filter is applied to data, the hub power constraint may be considered. We assume that the total hub transmit energy cannot exceed $N_f N_t L_h$. Consider the pre-coded data:

$$W(f,t)s(f,t), \tag{31}$$

To ensure that the pre-coded data meets the hub energy constraints the hub applies normalization, transmitting:

$$\lambda W(f,t)s(f,t), \tag{32}$$

Where the normalization constant $\lambda$ is given by:

$$\lambda = \sqrt{\frac{N_f N_t L_h}{\sum_{f,t} \|W(f,t)s(f,t)\|^2}} \tag{33}$$

Receiver SINR

The pre-coded data then passes through the downlink channel, the UEs receive the following signal:

$$\lambda H(f,t)W(f,t)s(f,t)+n(f,t), \tag{34}$$

The UEs then removes the normalization constant, giving a soft estimate of the signal:

$$s_{soft}(f, t) = H(f, t)W(f, t)s(f, t) + \frac{1}{\lambda}n(f, t). \tag{35}$$

The error of the estimate is given by:

$$s_{soft}(f, t) - s(f, t) = H(f, t)W(f, t)s(f, t) - s(f, t) + \frac{1}{\lambda}n(f, t). \tag{36}$$

The error can be decomposed into two independent terms: interference and noise. Embodiments can compute the total expected error energy:

$$\text{expected error energy} = \sum_{f=1}^{N_f} \sum_{t=1}^{N_t} \mathbb{E}\|s_{soft}(f,t) - s(f,t)\|^2 \tag{37}$$

$$= \sum_{f=1}^{N_f} \sum_{t=1}^{N_t} \mathbb{E}\|H(f,t)W(f,t)s(f,t) - s(f,t)\|^2 + \frac{1}{\lambda^2}\mathbb{E}\|n(f,t)\|^2$$

$$= \sum_{f=1}^{N_f} \sum_{t=1}^{N_t} \left(\hat{H}(f,t)W(f,t)s(f,t) - s(f,t)\right)^* \left(\hat{H}(f,t)W(f,t)s(f,t) - \right.$$

$$\left. s(f,t)\right) + (W(f,t)s(f,t))^* \left(R_{\Delta H}(f,t) + \frac{N_0 L_u}{L_h}I\right)(W(f,t)s(f,t))$$

Optimal Precoding Filter

We note that the expected error energy is convex and quadratic with respect to the coefficients of the precoding filter. Therefore, calculus can be used to derive the optimal precoding filter:

$$W_{opt}(f, t) = \left(\hat{H}(f,t)^* \hat{H}(f,t) + R_{\Delta H}(f,t) + \frac{N_0 L_u}{L_h}I\right)^{-1} \hat{H}(f,t)^* \tag{38}$$

Accordingly, some embodiments of an OTFS precoding system use this filter (or an estimate thereof) for precoding.

Simulation Results

Figure 33:
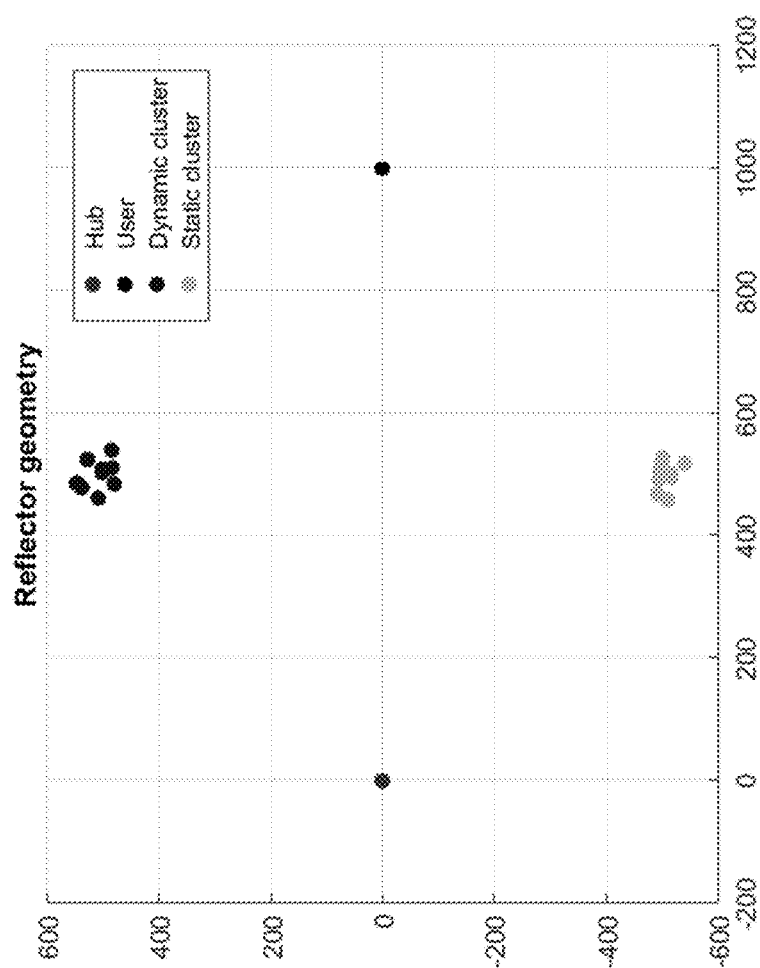
FIG. 33 is a graphical depiction of channel geometry of an example wireless channel.

We now present a simulation result illustrating the use of the optimal precoding filter. The simulation scenario was a hub transmitting data to a single UE. The channel was non line of sight, with two reflector clusters: one cluster consisted of static reflectors, the other cluster consisted of moving reflectors. FIG. 33 illustrates the channel geometry, with horizontal and vertical axis in units of distance. It is assumed that the hub has good Channel Side Information (CSI) regarding the static cluster and poor CSI regarding the dynamic cluster. The optimal precoding filter was compared to the MMSE precoding filter. FIG. 34A displays the antenna pattern given by the MMSE precoding filter. It can be seen that the energy is concentrated at ±45°, that is, towards the two clusters. The UE SINR is 15.9 dB, the SINR is relatively low due to the hub's poor CSI for the dynamic cluster.

Figure 34B:
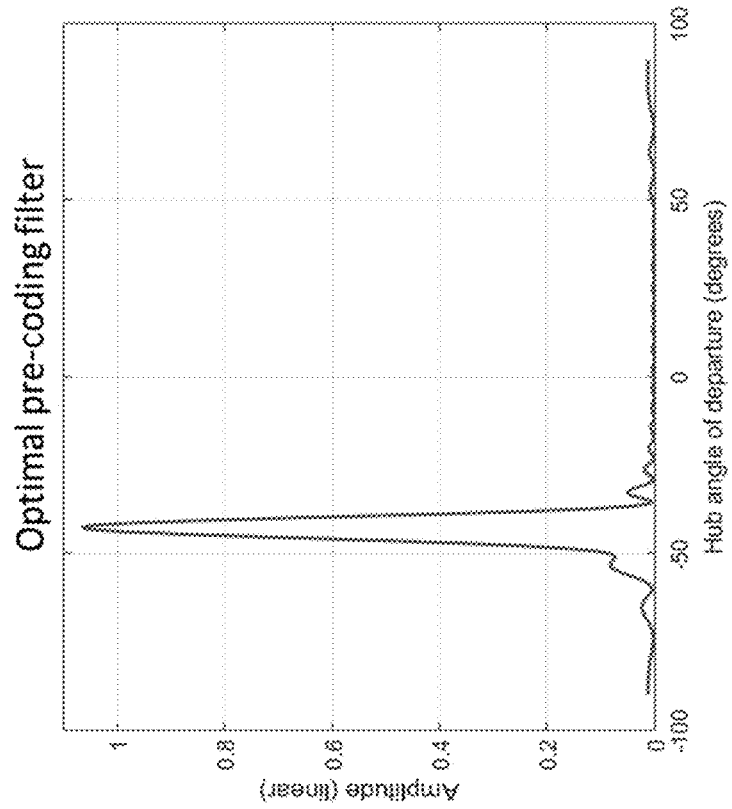
FIG. 34B is a graph showing an example of an optical pre-coding filter.
Figure 34A:
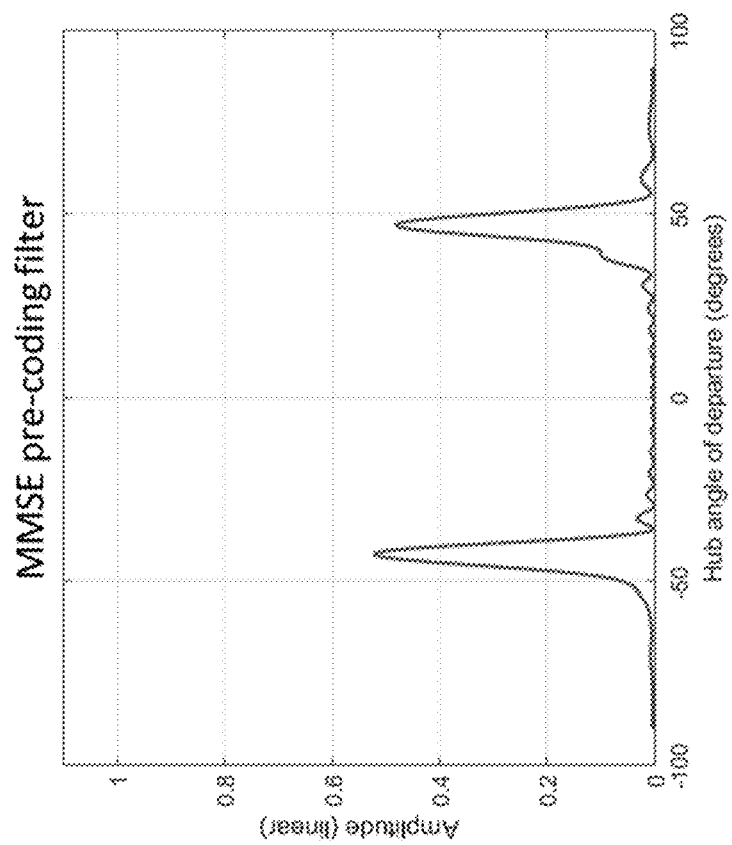
FIG. 34A is a graph showing an example of a precoding filter antenna pattern.

FIG. 34B displays the antenna pattern given by the optimal precoding filter as described above, e.g., using equation (38). In this example, the energy is concentrated at −45°, that is, toward the static cluster. The UE SINR is 45.3 dB, the SINR is high (compared to the MMSE case) due to the hub having good CSI for the static reflector.

The simulation results depicted in FIGS. 34A and 34B illustrate the advantage of the optimal pre-coding filter. The filter it is able to avoid sending energy towards spatial regions of poor channel CSI, e.g., moving regions.

Example Block diagrams

Figure 35:
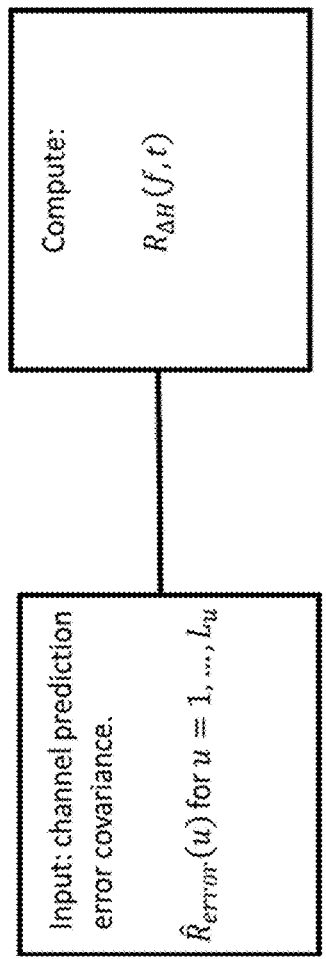
FIG. 35 is a block diagram showing an example process of error correlation computation.

Precoding is performed independently for each time frequency bin. The precoding can be separated into three steps:

[1] Computation of error correlation: the computation be performed infrequently (on the order of seconds). The computation is summarized in FIG. 35.

Figure 36:
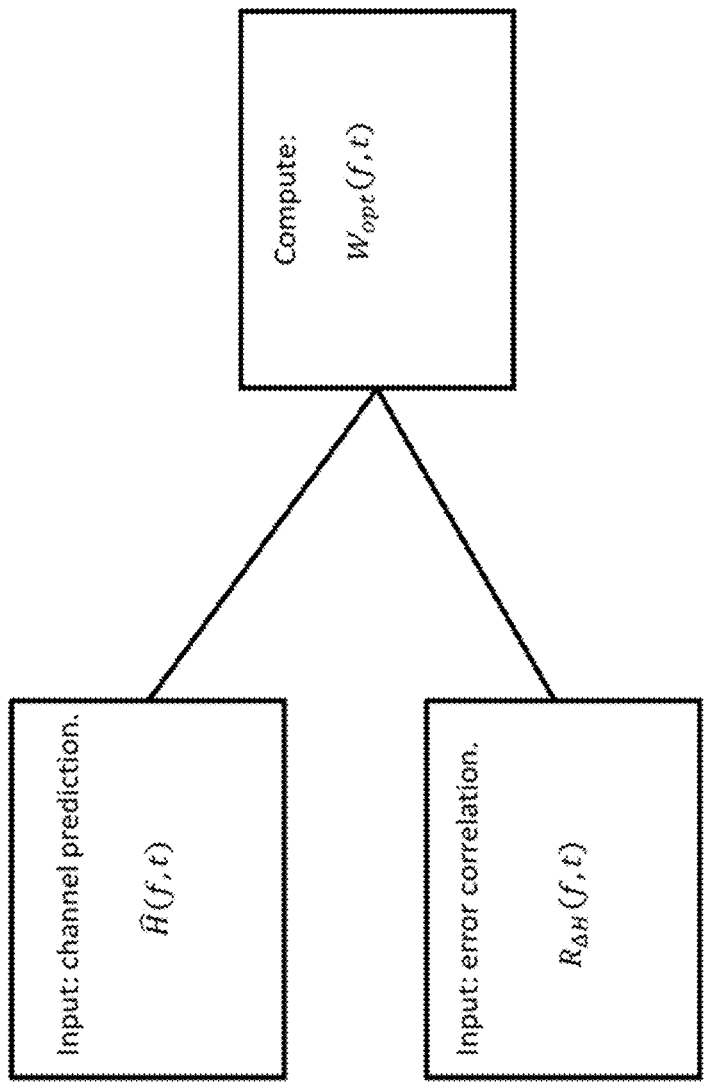
FIG. 36 is a block diagram showing an example process of precoding filter estimation.

[2] Computation of optimal precoding filter: may be performed every time pre-coding is performed. The computation is summarized in FIG. 36.

Figure 37:
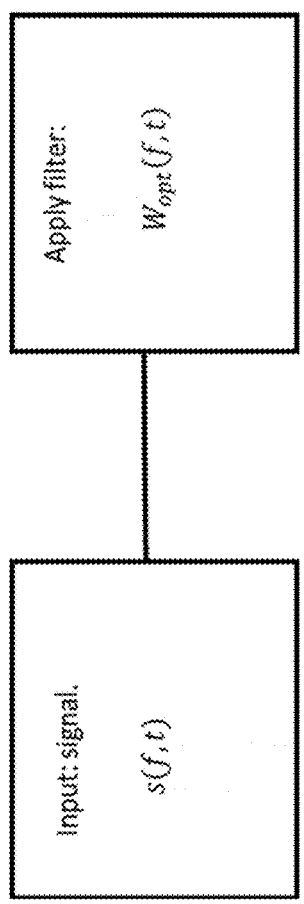
FIG. 37 is a block diagram showing an example process of applying an optimal precoding filter.

[3] Application of the optimal precoding filter: may be performed every time pre-coding is performed. The procedure is summarized in FIG. 37.

OTFS Vector Perturbation

Before introducing the concept of vector perturbation, we outline the application of the optimal pre-coding filter to OTFS.

OTFS Optimal Precoding

In OTFS, the data to be transmitted to the UEs are encoded using QAMs in the delay-Doppler domain. We denote this QAM signal by x, then:

$$x(\tau,\nu) \in A^{L_u}, \tag{39}$$

for $\tau=1, \ldots, N_\tau$ and $\nu=1, \ldots, N_\nu$. A denotes the QAM constellation. Using the two-dimensional Fourier transform the signal can be represented in the time frequency domain. We denote this representation by X:

$$X(f,t) = (Fx)(f,t), \tag{40}$$

for f=1, ..., $N_f$ and t=1, ..., $N_t$. F denotes the two-dimensional Fourier transform. The hub applies the optimal pre-coding filter to X and transmit the filter output over the air:

$$\lambda W_{opt}(f,t)X(f,t), \quad (41)$$

for f=1, ..., $N_f$ and t=1, ..., $N_t$. A denotes the normalization constant. The UEs remove the normalization constant giving a soft estimate of X:

$$X_{soft}(f,t) = H(f,t)W_{opt}(f,t)X(f,t) + \frac{1}{\lambda}w(f,t), \quad (42)$$

for f=1, ..., $N_f$ and t=1, ..., $N_t$. The term w(f, t) denotes white noise. We denote the error of the soft estimate by E:

$$E(f,t)=X_{soft}(f,t)-X(f,t), \quad (43)$$

for f=1, ..., $N_f$ and t=1, ..., $N_t$. The expected error energy was derived earlier in this document:

expected error energy=$\Sigma_{f=1}^{N_f}\Sigma_{t=1}^{N_t}\mathbb{E}\|X_{soft}(f,t)-X(f,t)\|^2$ $$=\Sigma_{f=1}^{N_f}\Sigma_{t=1}^{N_t}X(f,t)^*M_{error}(f,t)X(f,t) \quad (44)$$

Where:

$$M_{error}(f,t) = (\hat{H}(f,t)W_{opt}(f,t)-I)^*(\hat{H}(f,t)W_{opt}(f,t)-I) + \ldots W_{opt}(f,t)^*\left(R_{\Delta H}(f,t)+\frac{N_0 L_u}{L_h}\right)W_{opt}(f,t) \quad (45)$$

We call the positive definite matrix $M_{error}(f, t)$ the error metric.

Vector Perturbation

In vector perturbation, the hub transmits a perturbed version of the QAM signal:

$$x(\tau,\nu)+p(\tau,\nu), \quad (46)$$

for $\tau$=1, ..., $N_\tau$ and $\nu$=1, ..., $N_\nu$. Here, p($\tau$, $\nu$) denotes the perturbation signal. The perturbed QAMs can be represented in the time frequency domain:

$$X(f,t)+P(f,t)=(Fx)(f,t)+(Fp)(f,t), \quad (47)$$

for f=1, ..., $N_f$ and t=1, ..., $N_t$. The hub applies the optimal pre-coding filter to the perturbed signal and transmits the result over the air. The UEs remove the normalization constant giving a soft estimate of the perturbed signal:

$$X(f,t)+P(f,t)+E(f,t), \quad (48)$$

for f=1, ..., $N_f$ and t=1, ..., $N_t$. Where E denotes the error of the soft estimate. The expected energy of the error is given by:

expected error energy=$\Sigma_{f=1}^{N_f}\Sigma_{t=1}^{N_t}(X(f,t)+P(f,t))^*M_{error}(f,t)(X(f,t)+P(f,t))) \quad (49)$ The UEs then apply an inverse two dimensional Fourier transform to convert the soft estimate to the delay Doppler domain:

$$x(\tau,\nu)+p(\tau,\nu)+e(\tau,\nu), \quad (50)$$

for $\tau$=1, ..., $N_\tau$ and $\nu$=1, ..., $N_\nu$. The UEs then remove the perturbation p($\tau$,$\nu$) for each delay Doppler bin to recover the QAM signal x.

Collection of Vector Perturbation Signals

One question is: what collection of perturbation signals should be allowed? When making this decision, there are two conflicting criteria:

1) The collection of perturbation signals should be large so that the expected error energy can be greatly reduced.
2) The collection of perturbation signals should be small so the UE can easily remove them (reduced computational complexity):

$$x(\tau,\nu)+p(\tau,\nu)x(\tau,\nu) \quad (51)$$

Coarse Lattice Perturbation

An effective family of perturbation signals in the delay-Doppler domain, which take values in a coarse lattice:

$$p(\tau,\nu) \in B^{L_u}, \quad (52)$$

for $\tau$=1, ..., $N_\tau$, and $\nu$=, ..., $N_\nu$. Here, B denotes the coarse lattice. Specifically, if the QAM symbols lie in the box: [−r, r]×[−r, r] we take as our perturbation lattice B=2r $\mathbb{Z}$+2rj $\mathbb{Z}$. We now illustrate coarse lattice perturbation with an example.

EXAMPLES

Figure 38:
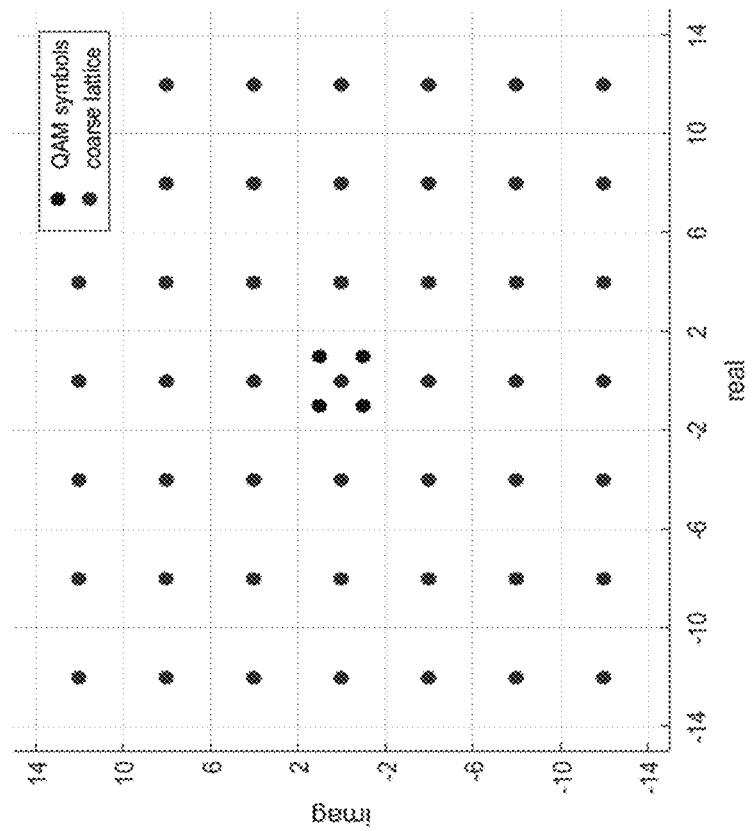
FIG. 38 is a graph showing an example of a lattice and QAM symbols.
Figure 39:
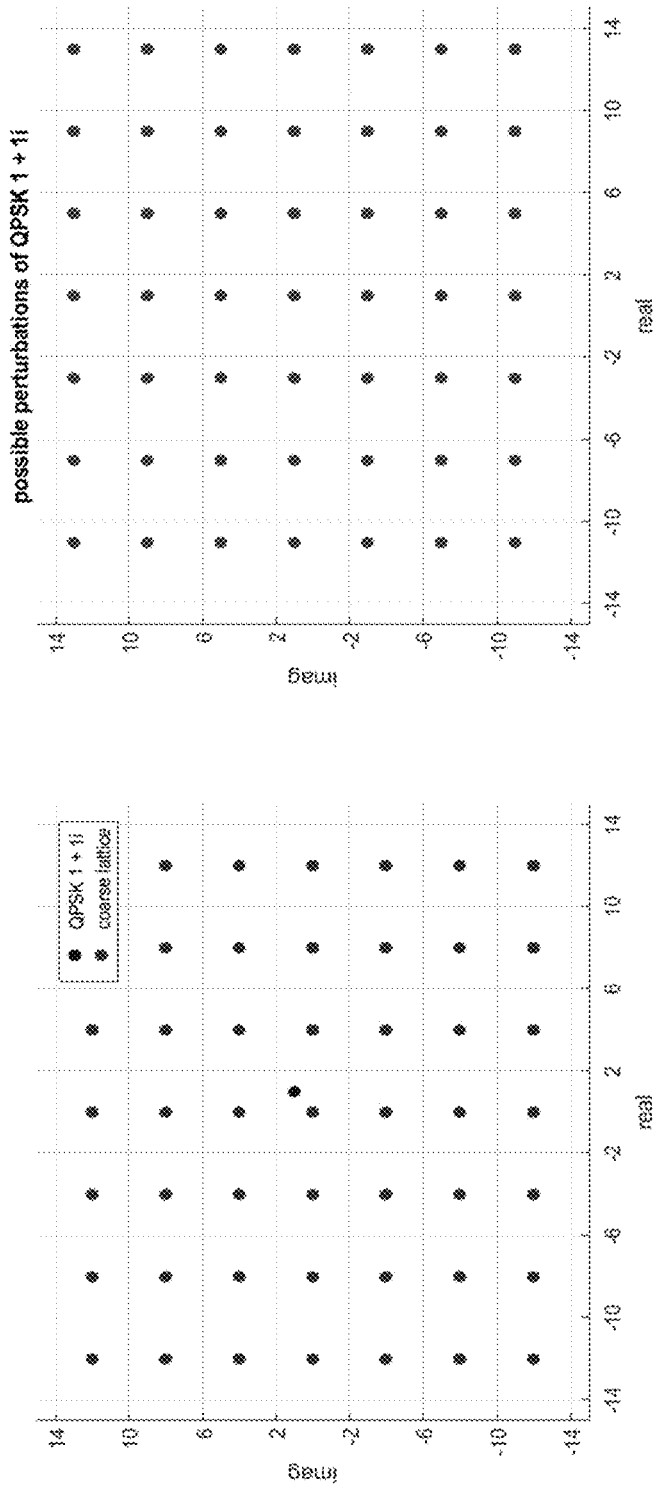
FIG. 39 graphically illustrates effects of perturbation examples.
Figure 40:
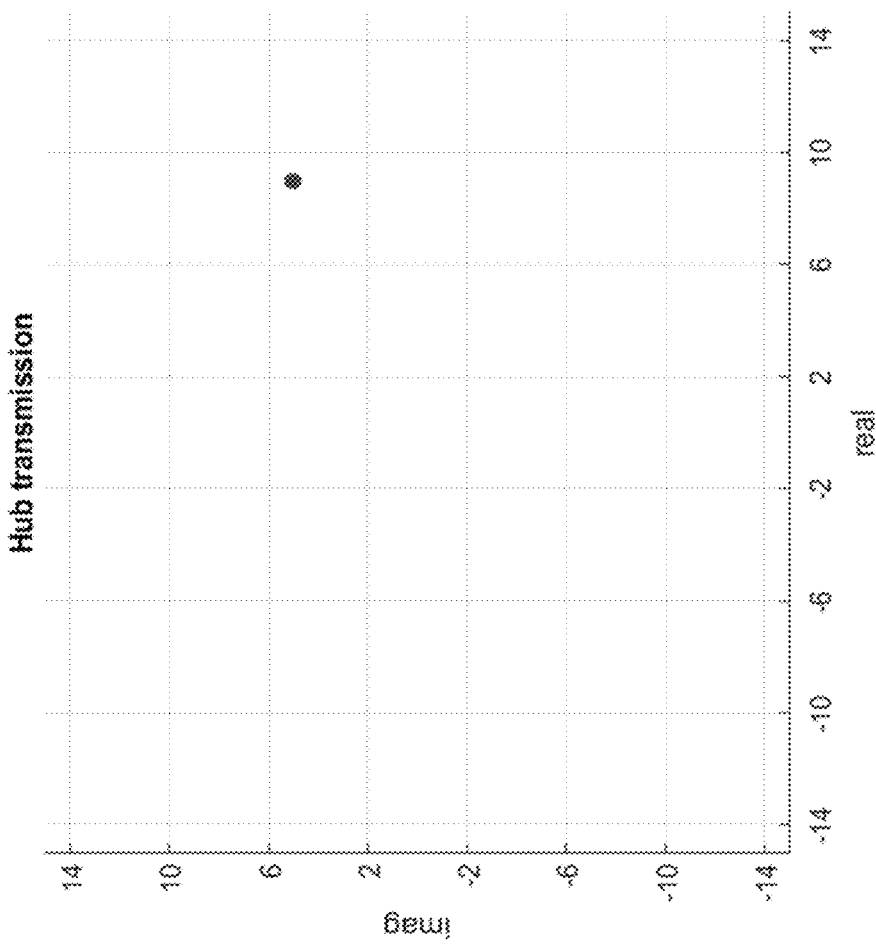
FIG. 40 is a graph illustrating an example of hub transmission.

Consider QPSK (or 4-QAM) symbols in the box [−2,2]× j[−2,2]. The perturbation lattice is then B=4$\mathbb{Z}$+4j$\mathbb{Z}$. FIG. 38 illustrates the symbols and the lattice. Suppose the hub wants to transmit the QPSK symbol 1+1j to a UE. Then there is an infinite number of coarse perturbations of 1+1j that the hub can transmit. FIG. 39 illustrates an example. The hub selects one of the possible perturbations and transmits it over the air. FIG. 40 illustrates the chosen perturbed symbol, depicted with a single solid circle.

Figure 41:
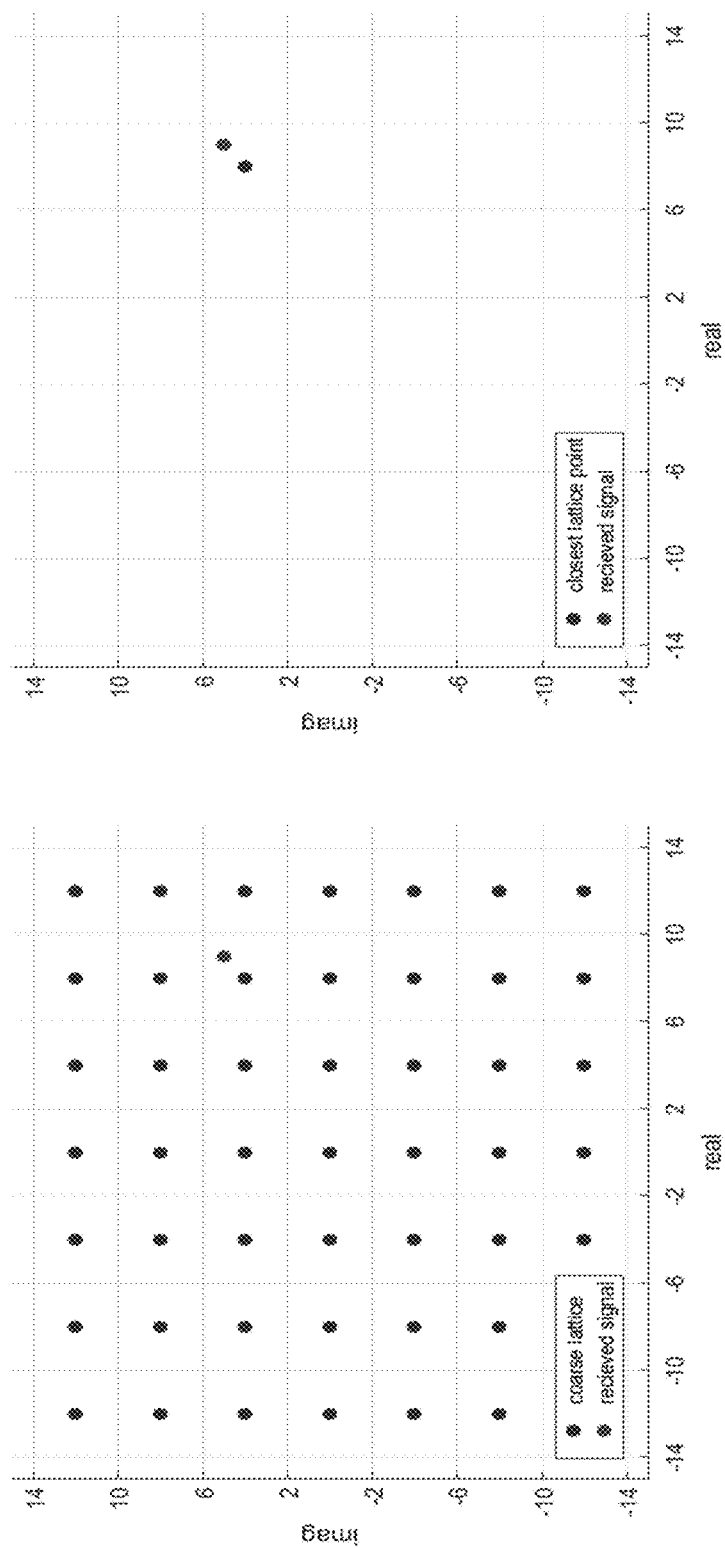
FIG. 41 is a graph showing an example of the process of a UE finding a closest coarse lattice point.

The UE receives the perturbed QPSK symbol. The UE then removes the perturbation to recover the QPSK symbol. To do this, the UE first searches for the coarse lattice point closest to the received signal. FIG. 41 illustrates this.

Figure 42:
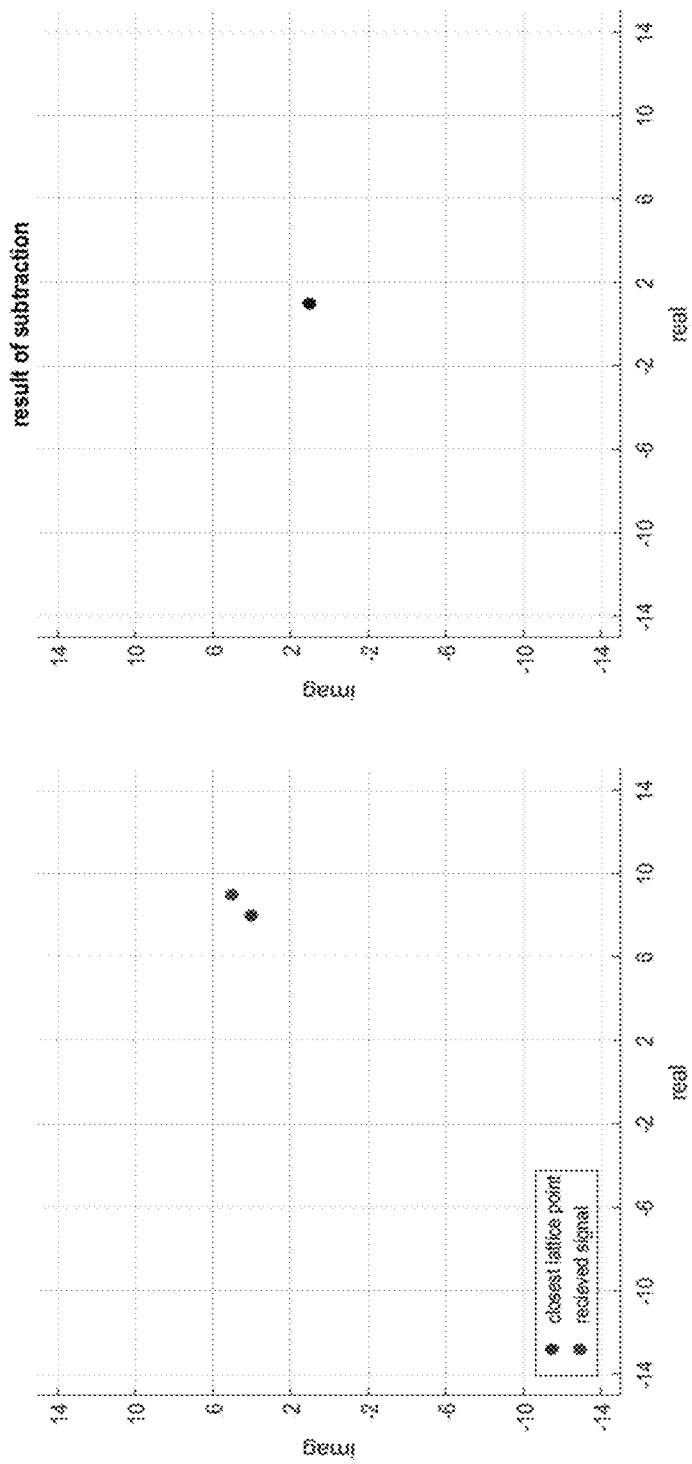
FIG. 42 is a graph showing an example process of UE recovering a QPSK symbol by subtraction.

The UE subtracts the closest lattice point from the received signal, thus recovering the QPSK symbol 1+1j. FIG. 42 illustrates this process.

Finding Optimal Coarse Lattice Perturbation Signal

The optimal coarse lattice perturbation signal, $p_{opt}$, is the one which minimizes the expected error energy:

$$p_{opt}=\text{argmin}_p \Sigma_{f=1}^{N_f}\Sigma_{t=1}^{N_t}(X(f,t)+P(f,t))^*M_{error}(f,t)(X(f,t)+P(f,t)) \quad (53)$$

The optimal coarse lattice perturbation signal can be computed using different methods. A computationally efficient method is a form of Thomlinson-Harashima precoding which involves applying a DFE (decision feedback equalization) filter at the hub.

Coarse Lattice Perturbation Example

We now present a simulation result illustrating the use of coarse lattice perturbation. The simulation scenario was a hub antenna transmitting to a single UE antenna. Table 2 displays the modulation parameters. Table 3 display the channel parameters for this example.

TABLE 2

| | |
|---|---|
| Subcarrier spacing | 30 kHz |
| Number of subcarriers | 256 |
| OFDM symbols per frame | 32 |
| QAM order | Infinity (uniform in the unit box) |

TABLE 3

| | |
|---|---|
| Number of reflectors | 20 |
| Delay spread | 2 µs |

TABLE 3-continued

| Doppler spread | 1 KHz |
|---|---|
| Noise variance | −35 dB |

Figure 43:
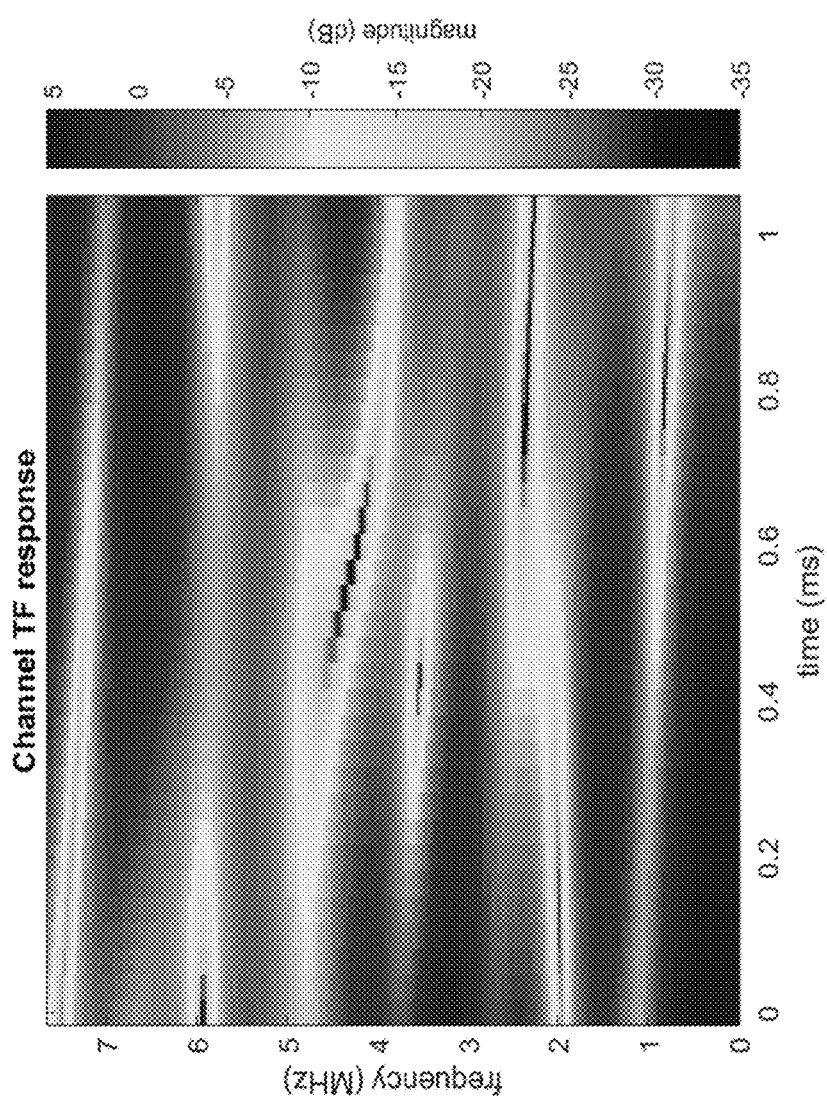
FIG. 43 depicts an example of a channel response.

FIG. 43 displays the channel energy in the time (horizontal axis) and frequency (vertical axis) domain.

Because this is a SISO (single input single output) channel, the error metric $M_{error}(f, t)$ is a positive scaler for each time frequency bin. The expected error energy is given by integrating the product of the error metric with the perturbed signal energy:

$$\text{expected error energy} = \Sigma_{f=1}^{N_f} \Sigma_{t=1}^{N_t} M_{error}(f,t) |(X(f,t)+ P(f,t))| \quad (54)$$

Figure 44:
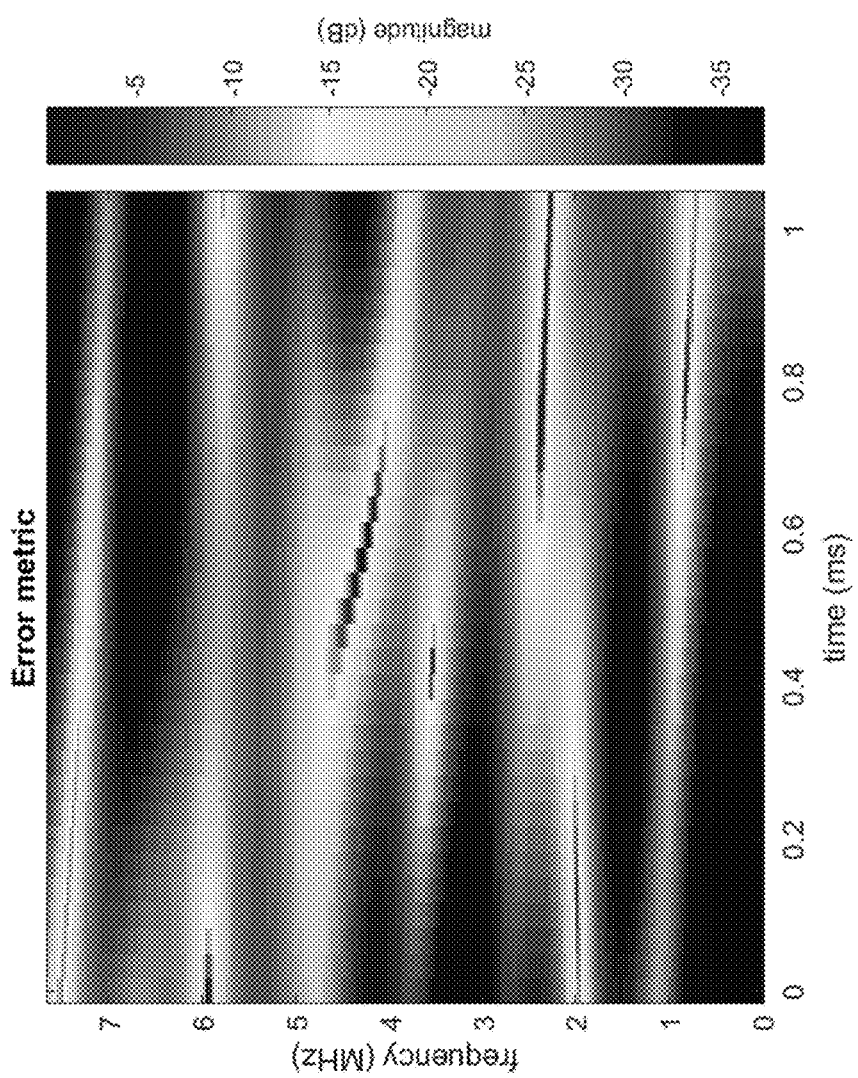
FIG. 44 depicts an example of an error of channel estimation.
Figure 45:
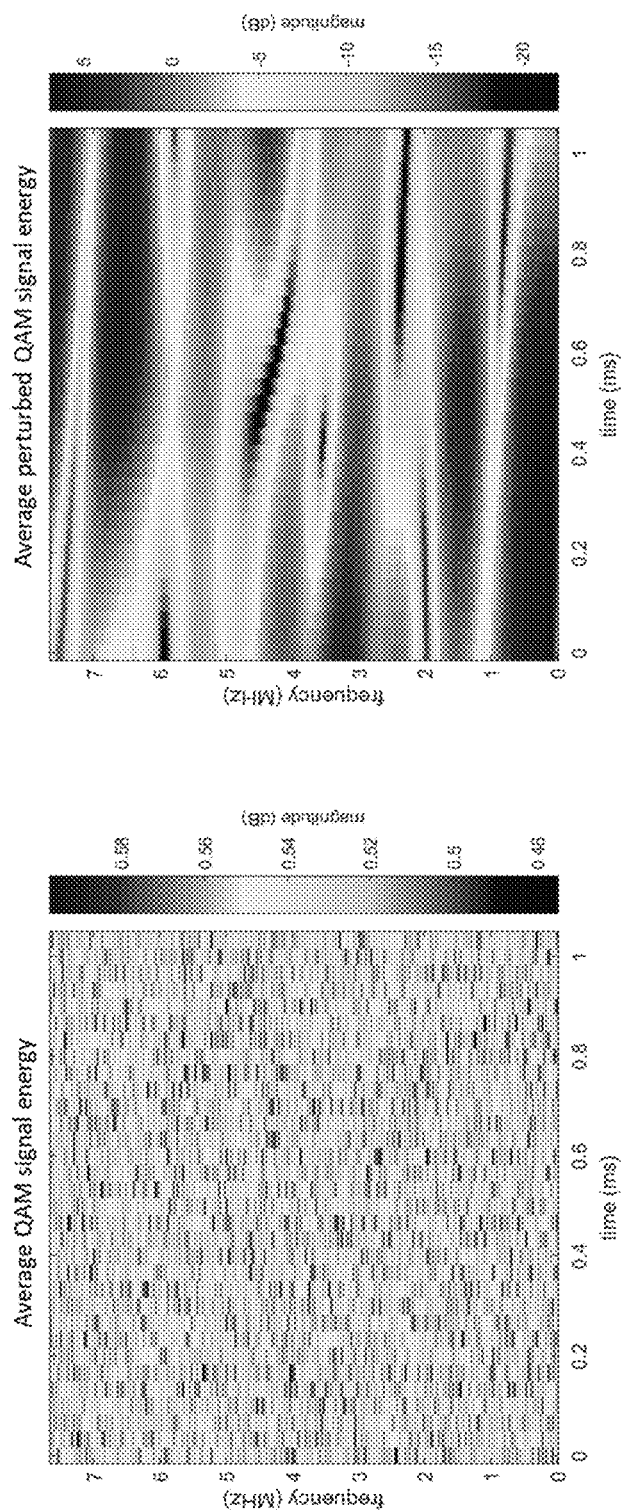
FIG. 45 shows a comparison of energy distribution of an example of QAM signals and an example of perturbed QAM signals.

FIG. 44 displays an example of the error metric. One hundred thousand random QAM signals were generated. For each QAM signal, the corresponding optimal perturbation signal was computed using Thomlinson-Harashima precoding. FIG. 45 compares the average energy of the QAM signals with the average energy of the perturbed QAM signals. The energy of QAM signals is white (evenly distributed) while the energy of the perturbed QAM signals is colored (strong in some time frequency regions and weak in others). The average error energy of the unperturbed QAM signal was −24.8 dB. The average error energy of the perturbed QAM signal was −30.3 dB. The improvement in error energy can be explained by comparing the energy distribution of the perturbed QAM signal with the error metric.

Figure 46:
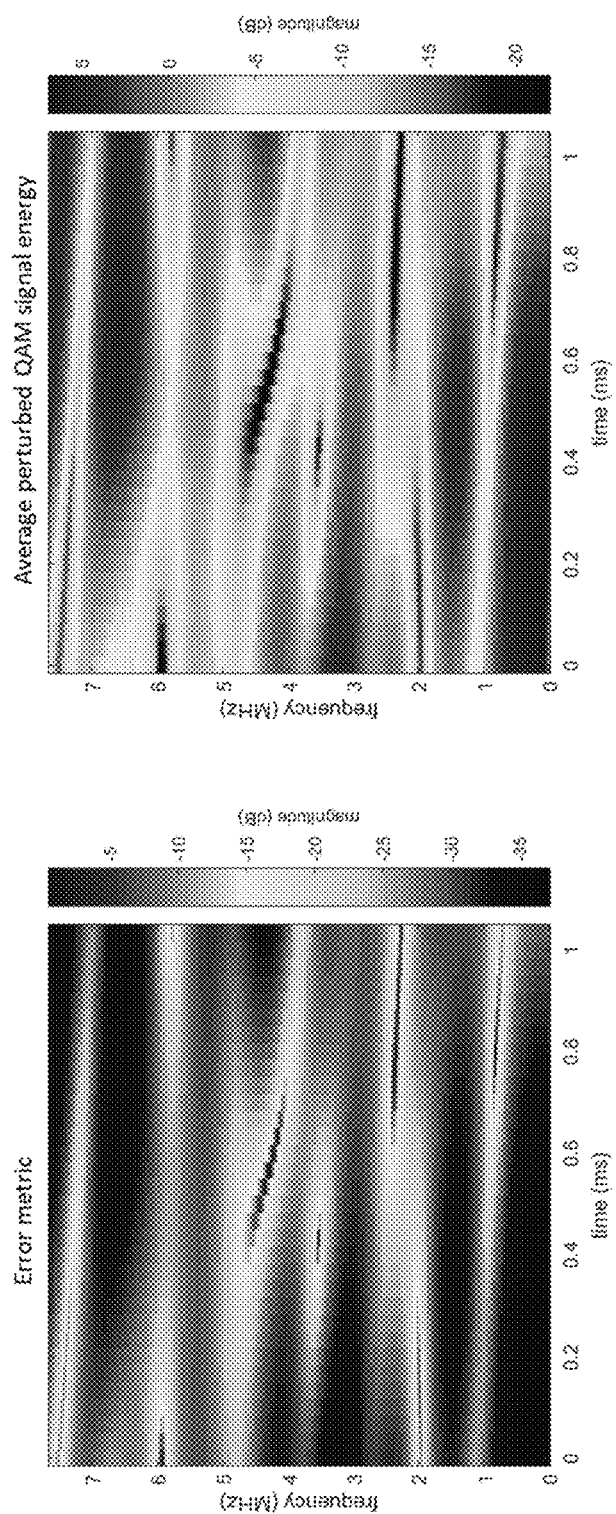
FIG. 46 is a graphical depiction of a comparison of an example error metric with an average perturbed QAM energy.

FIG. 46 shows a comparison of an example error metric with an average perturbed QAM energy. The perturbed QAM signal has high energy where the error metric is low, conversely it has low energy where the error metric is high.

The simulation illustrates the gain from using vector perturbation: shaping the energy of the signal to avoid time frequency regions where the error metric is high.

Block Diagrams

Vector perturbations may be performed in three steps. First, the hub perturbs the QAM signal. Next, the perturbed signal is transmitted over the air using the pre-coding filters. Finally, the UEs remove the perturbation to recover the data.

Figure 47:
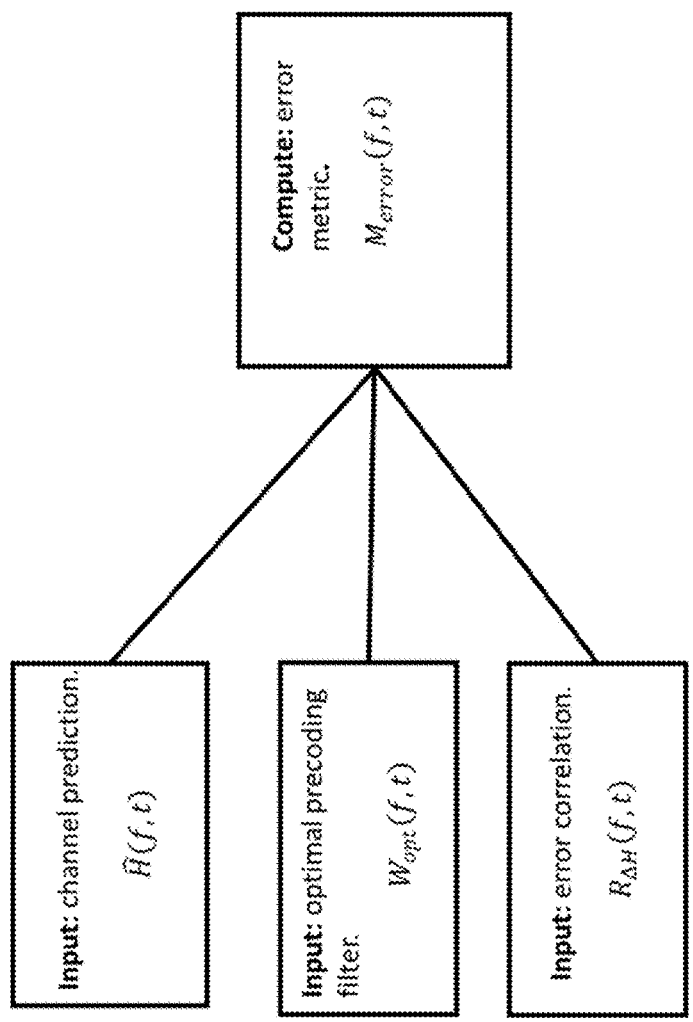
FIG. 47 is a block diagram illustrating an example process of computing an error metric.

Computation of error metric: the computation can be performed independently for each time frequency bin. The computation is summarized in FIG. 47. See also Eq. (45). As shown, the error metric is calculated using channel prediction estimate, the optimal coding filter and error correlation estimate.

Figure 48:
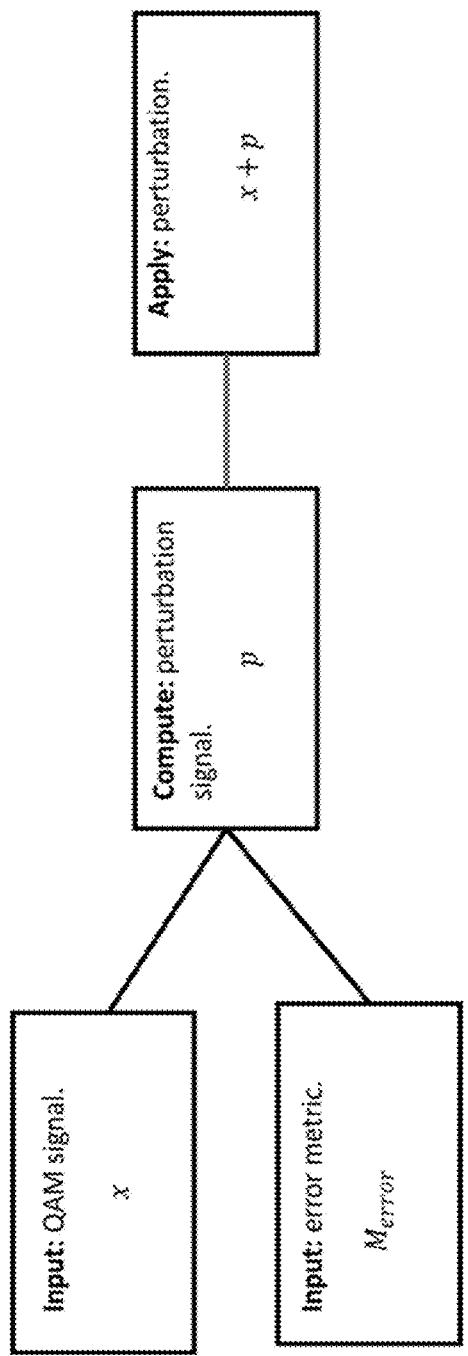
FIG. 48 is a block diagram illustrating an example process of computing perturbation.

Computation of perturbation: the perturbation is performed on the entire delay Doppler signal. The computation is summarized in FIG. 48. As shown, the QAM signal and the error metric are used to compute the perturbation signal. The calculated perturbation signal is additively applied to the QAM input signal.

Figure 49:
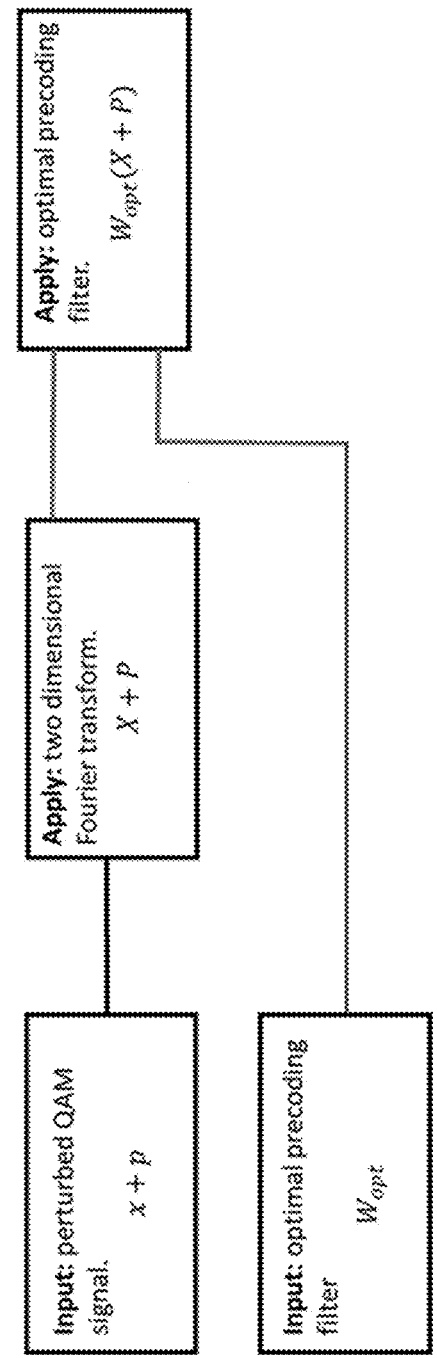
FIG. 49 is a block diagram illustrating an example of application of a precoding filter.

Application of the optimal precoding filter: the computation can be performed independently for each time frequency bin. The computation is summarized in FIG. 49. The perturbed QAM signal is processed through a two dimensional Fourier transform to generate a 2D transformed perturbed signal. The optimal precoding filter is applied to the 2D transformed perturbed signal.

Figure 50:
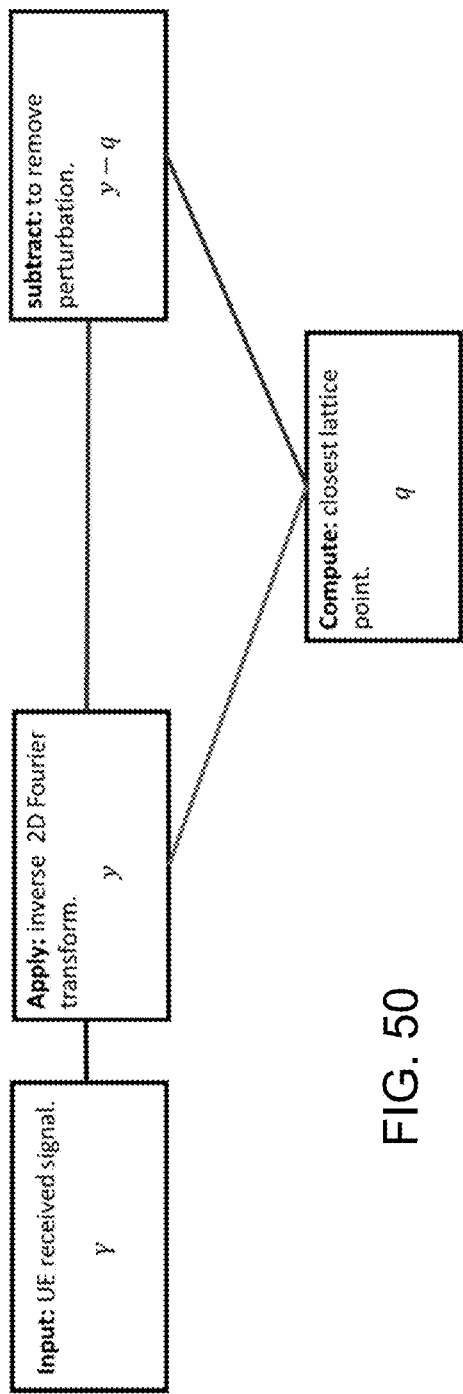
FIG. 50 is a block diagram illustrating an example process of UE removing the perturbation.

UEs removes perturbation: the computation can be FIG. 50. At UE, the input signal received is transformed through an inverse 2D Fourier transform. The closest lattice point for the resulting transformed signal is determined and then removed from the 2D transformed perturbed signal.

Spatial Tomlinson Harashima Precoding

This section provides additional details of achieving spatial precoding and the beneficial aspects of using Tomlinson Harashima precoding algorithm in implementing spatial precoding in the delay Doppler domain. The embodiments consider a flat channel (with no frequency or time selectivity).

Review of Linear Precoding

In precoding, the hub wants to transmit a vector of QAMs to the UEs. We denote this vector by $x \in \mathbb{C}^{L_u}$. The hub has access to the following information:

An estimate of the downlink channel, denoted by: $\hat{H} \in \mathbb{C}^{L_u \times L_h}$.

The matrix covariance of the channel estimation error, denoted by: $R_{\Delta H} \in \mathbb{C}^{L_h \times L_h}$.

From this information, the hub computes the "optimal" precoding filter, which minimizes the expected error energy experienced by the UEs:

$$W_{opt} = \left( \hat{H}^* \hat{H} + R_{\Delta H} + \frac{N_0 L_u}{L_h} I \right)^{-1} \hat{H}^*$$

By applying the precoding filter to the QAM vector the hub constructs a signal to transmit over the air: $\lambda W_{opt} x \in \mathbb{C}^{L_h}$, where $\lambda$ is a constant used to enforce the transmit energy constraints. The signal passes through the downlink channel and is received by the UEs:

$$\lambda H W_{opt} x + w,$$

Where $w \in \mathbb{C}^{L_u}$ denotes AWGN noise. The UEs remove the normalization constant giving a soft estimate of the QAM signal:

$$x + e,$$

where $e \in \mathbb{C}^{L_u}$ denotes the estimate error. The expected error energy can be computed using the error metric:

$$\text{expected error energy} = x^* M_{error} x$$

where $M_{error}$ is a positive definite matrix computed by:

$$M_{error} = (\hat{H} W_{opt} - I)^* (\hat{H} W_{opt} - I) + W_{opt}^* \left( R_{\Delta H} + \frac{N_0 L_u}{L_h} \right) W_{opt}$$

Review of Vector Perturbation

The expected error energy can be greatly reduced by perturbing the QAM signal by a vector $v \in \mathbb{C}^{L_u}$. The hub now transmits $\lambda W_{opt} (x+v) \in \mathbb{C}^{L_h}$. After removing the normalization constant, the UEs have a soft estimate of the perturbed QAM signal:

$$x + v + e$$

Again, the expected error energy can be computed using the error metric:

$$\text{expected error energy} = (x+v)^* M_{error}(x+v)$$

The optimal perturbation vector minimizes the expected error energy:

$$v_{opt} = \text{argmin}_v (x+v)^* M_{error}(x+v).$$

Computing the optimal perturbation vector is in general NP-hard, therefore, in practice an approximation of the optimal perturbation is computed instead. For the remainder of the document we assume the following signal and perturbation structure:

The QAMs lie in the box $[-1,1] \times j[-1, 1]$.

The perturbation vectors lie on the coarse lattice: $(2\mathbb{Z}+2j\mathbb{Z})^{L_u}$.

Spatial Tomlinson Harashima Precoding

In spatial THP a filter is used to compute a "good" perturbation vector. To this end, we make use of the Cholesky decomposition of the positive definite matrix $M_{error}$:

$$M_{error} = U^*DU,$$

where D is a diagonal matrix with positive entries and U is unit upper triangular. Using this decomposition, the expected error energy can be expressed as:

$$\text{expected error energy} = (U(x+v))^* D(U(x+v)) = z^*Dz = \sum_{n=1}^{L_u} D(n,n)|z(n)|^2,$$

where $z = U(x+v)$. We note that minimizing the expected error energy is equivalent to minimizing the energy of the z entries, where:

$$z(L_u) = x(L_u) + v(L_u),$$

$$z(n) = x(n) + v(n) + \sum_{m=n+1}^{L_u} U(n,m)(x(m) + v(m)),$$

for $n = 1, 2, \ldots, L_u - 1$. Spatial THP iteratively choses a perturbation vector in the following way.

$$v(L_u) = 0$$

Figure 51:
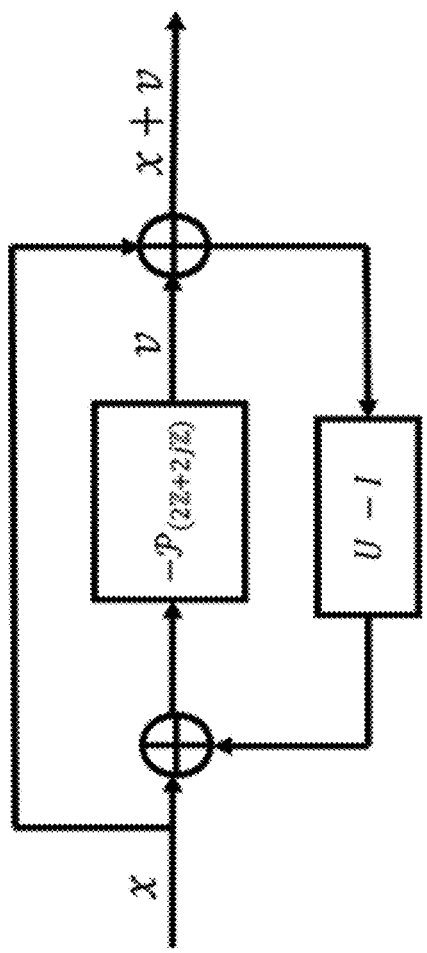
FIG. 51 is a block diagram illustrating an example spatial Tomlinsim Harashima precoder (THP).

Suppose $v(n+1), v(n+2), \ldots, v(L_u)$ have been chosen, then:

$$v(n) = -\mathcal{P}_{(2\mathbb{Z}+2j\mathbb{Z})}(x(n) + \sum_{m=n+1}^{L_u} U(n,m)(x(m) + v(m)))$$

where $\mathcal{P}_{(2\mathbb{Z}+2j\mathbb{Z})}$ denotes projection onto the coarse lattice. We note that by construction the coarse perturbation vector bounds the energy of the entries of z by two. FIG. 51 displays a block diagram of spatial THP.

Simulation Results

We now present the results of a simple simulation to illustrate the use of spatial THP. Table 4 summarizes the simulation setup.

TABLE 4

Simulation setup

| | |
|---|---|
| Number of hub antennas | 2 |
| Number of UEs | 2 (one antenna each) |
| Channel condition number | 10 dB |
| Modulation | PAM infinity (data uniformly disturbed on the interval [−1, 1]) |
| Data noise variance | −35 dB |
| Channel noise variance | −35 dB |

Figure 52:
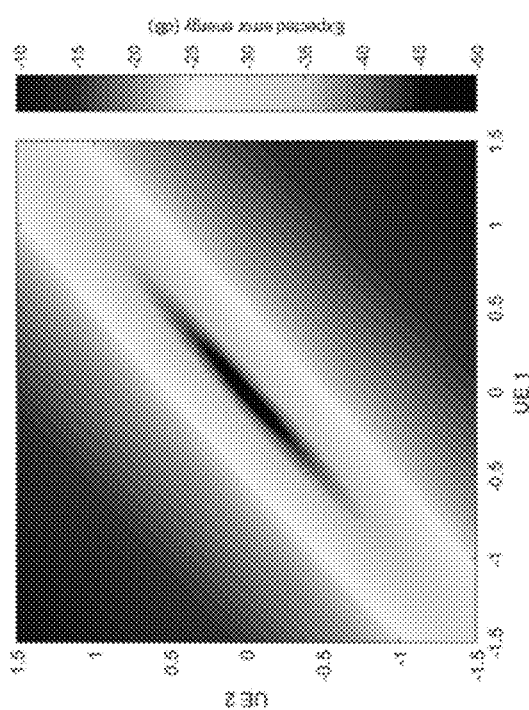
FIG. 52 is a spectral chart of the expected energy error for different exemplary pulse amplitude modulated (PAM) vectors.

FIG. 52 displays the expected error energy for different PAM vectors. We note two aspects of the figure.

The error energy is low when the signal transmitted to UE1 and UE2 are similar. Conversely, the error energy is high when the signals transmitted to the UEs are dissimilar. We can expect this pattern to appear when two UEs are spatially close together; in these situations, it is advantageous to transmit the same message to both UEs.

The error energy has the shape of an ellipses. The axes of the ellipse are defined by the eigenvectors of $M_{error}$.

Figure 53:
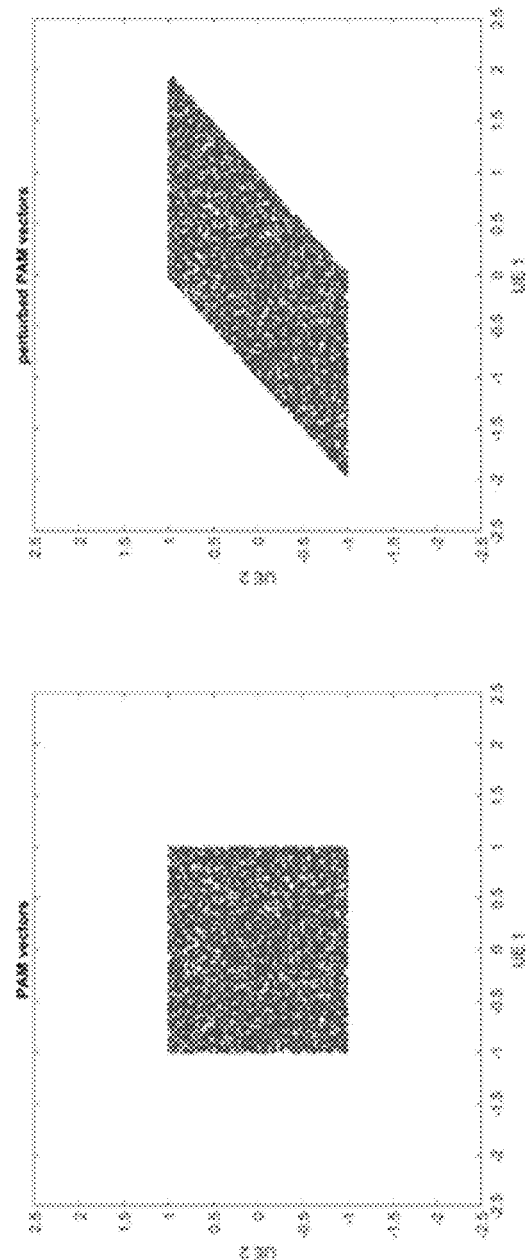
FIG. 53 is a plot illustrating an example result of a spatial THP.

A large number data of PAM vectors was generated and spatial THP was applied. FIG. 53 shows the result. Note that the perturbed PAM vectors are clustered along the axis with low expected error energy.

5. Channel Estimation for OTFS Systems

Figure 54:
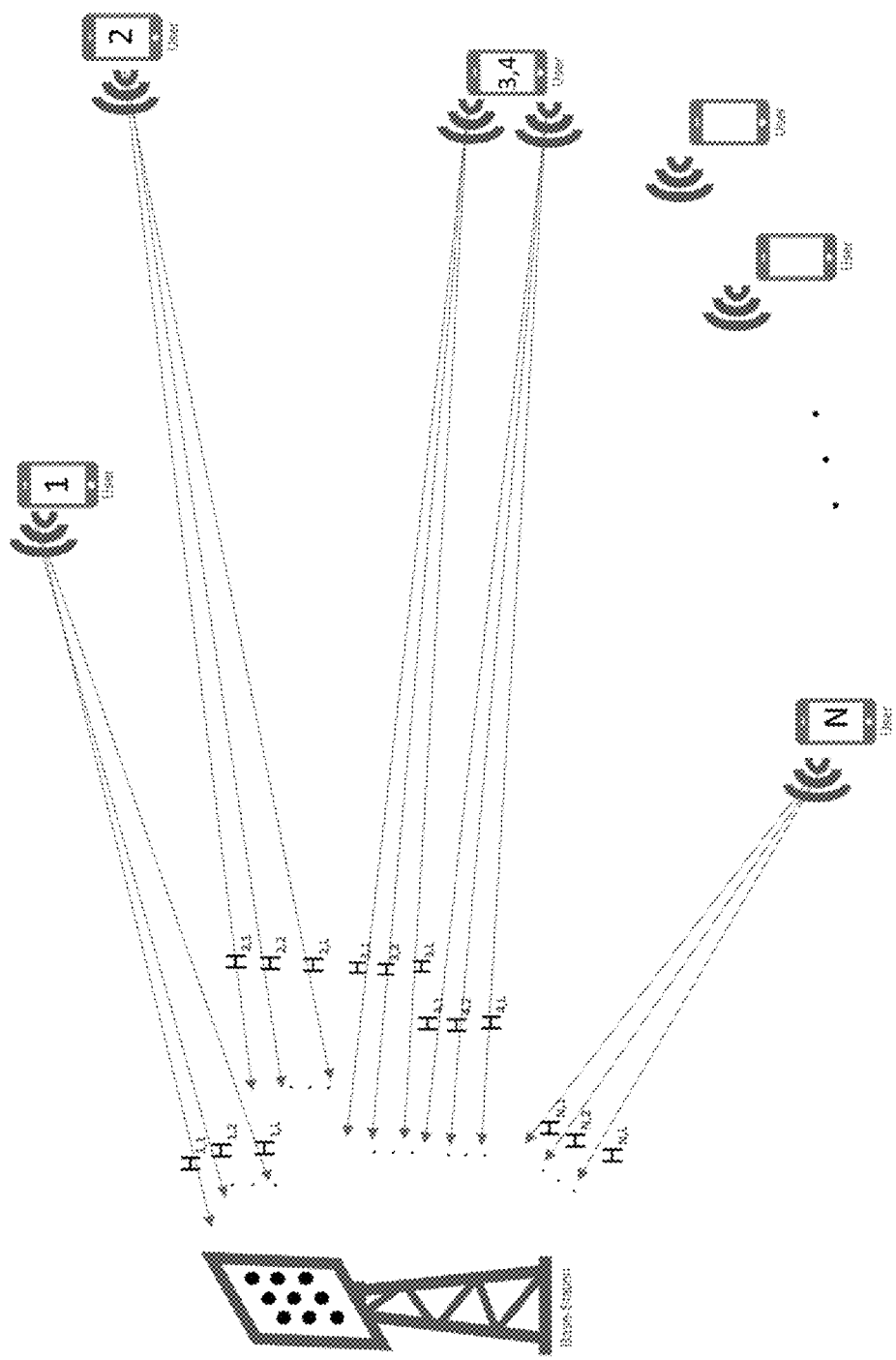
FIG. 54 shows an example of a wireless system including a base station with L antennas and multiple users.

This section overviews channel estimation for OTFS systems, and in particular, aspects of channel estimation and scheduling for a massive number of users. A wireless system, with a multi-antenna base-station and multiple user antennas, is shown in FIG. 54. Each transmission from a user antenna to one of the base-station antennas (or vice versa), experiences a different channel response (assuming the antennas are physically separated enough). For efficient communication, the base-station improves the users' received Signal-to-Interference-Noise-Ratio (SINR) by means of precoding. However, to precode, the base-station needs to have an accurate estimation of the downlink channels to the users during the transmission time.

In some embodiments, and when the channels are not static and when the number of users is very large, some of the challenges of such a precoded system include:

Accurately and efficiently estimating all the required channels

Predicting the changes in the channels during the downlink transmission time

Typical solutions in systems, which assume a low number of users and static channels, are to let each user transmit known pilot symbols (reference signals) from each one of its antennas. These pilots are received by all the base-station antennas and used to estimate the channel. It is important that these pilot symbols do not experience significant interference, so that the channel estimation quality is high. For this reason, they are typically sent in an orthogonal way to other transmissions at the same time. There are different methods for packing multiple pilots in an orthogonal (or nearly-orthogonal) way, but these methods are usually limited by the number of pilots that can be packed together (depending on the channel conditions) without causing significant interference to each other. Therefore, it becomes very difficult to have an efficient system, when the number of user antennas is high and the channels are not static. The amount of transmission resources that is needed for uplink pilots may take a considerable amount of the system's capacity or even make it unimplementable. For prediction of the channel, it is typically assumed that the channel is completely static and will not change from the time it was estimated till the end of the downlink transmission. This assumption usually causes significant degradation in non-static channels.

It is assumed that the downlink and uplink channels are reciprocal and after calibration it is possible to compensate for the difference in the uplink-downlink and downlink-uplink channel responses. Some example embodiments of the calibration process using reciprocity are further discussed in Section 5.

Embodiments of the disclosed technology include a system and a method for packing and separating multiple non-orthogonal pilots, as well as a method for channel prediction. In such a system, it is possible to pack together a considerably higher number of pilots comparing to other commonly used methods, thus allowing an accurate prediction of the channel for precoding.

Second-Order Training Statistics

The system consists of a preliminary training step, in which all users send uplink orthogonal pilots to the base-station. Although these pilots are orthogonal, they may be sent at a very low rate (such as one every second) and therefore do not overload the system too much. The base-station receives a multiple of $N_{SOS}$ such transmissions of these pilots, and use them to compute the second-order statistics (covariance) of each channel.

Figure 55:
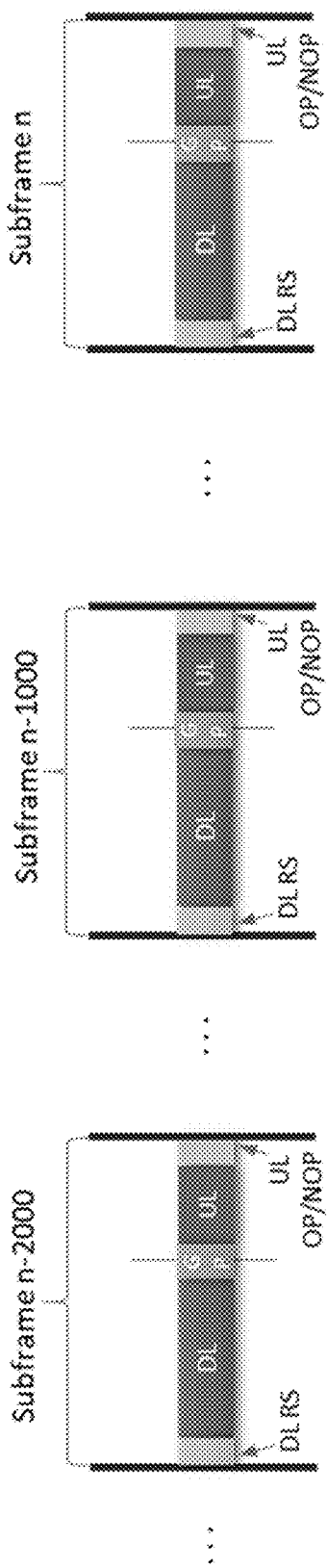
FIG. 55 shows an example of a subframe structure that can be used to compute second-order statistics for training.

FIG. 55 shows an example of such a system, where a subframe of length 1 msec consists of a downlink portion (DL), a guard period (GP) and an uplink portion (UL). Some of the uplink portion is dedicated to orthogonal pilots (OP) and non-orthogonal pilots (NOP). Each specific user is scheduled to send on these resources its pilots every 1000 subframes, which are equivalent to 1 sec. After the reception of $N_{SOS}$ subframes with pilots (equivalent to $N_{SOS}$ seconds), the base-station will compute the second-order statistics of this channel.

The computation of the second-order statistics for a user antenna u is defined as:

For each received subframe i=1, 2, . . . , $N_{SOS}$ with orthogonal pilots and for each one of the L base-station receive antennas—estimate the channel along the entire frequency band ($N_f$ grid elements) from the pilots and store it as the i-th column of the matrix $H^{(u)}$ with dimensions $(N_f L) \times N_{SOS}$.

Compute the covariance matrix $R_{HH}^{(u)} = H^{(u)})H^{(u)}$, where $(\cdot)^H$ is the Hermitian operator.

For the case that the channel $H^{(u)}$ is non-zero-mean, both the mean and the covariance matrix should be determined.

To accommodate for possible future changes in the channel response, the second-order statistics may be updated later, after the training step is completed. It may be recomputed from scratch by sending again $N_{SOS}$ orthogonal pilots, or gradually updated. One possible method may be to remove the first column of $H^{(u)}$ and attach a new column at the end and then re-compute the covariance matrix again.

The interval at which these orthogonal pilots need to be repeated depends on the stationarity time of the channel, e.g., the time during which the second-order statistics stay approximately constant. This time can be chosen either to be a system-determined constant, or can be adapted to the environment. In particular, users can determine through observation of downlink broadcast pilot symbols changes in the second-order statistics, and request resources for transmission of the uplink pilots when a significant change has been observed. In another embodiment, the base-station may use the frequency of retransmission requests from the users to detect changes in the channel, and restart the process of computing the second-order statistics of the channel.

To reduce the computational load, it is possible to use principal component analysis (PCA) techniques on $R_{HH}^{(u)}$. We compute $\{\lambda^{(u)}\}$, the $K^{(u)}$ most dominant eigenvalues of $R_{HH}^{(u)}$, arranged in a diagonal matrix $D^{(u)}=\text{diag }(\lambda_1^{(u)}, \lambda_2^{(u)}, \ldots, \lambda_{K^{(u)}}^{(u)})$ and their corresponding eigenvectors matrix $V^{(u)}$. Typically, $K^{(u)}$ will be in the order of the number of reflectors along the wireless path. The covariance matrix can then be approximated by $R_{HH}^{(u)} \approx V^{(u)} \cdot D^{(u)} \cdot (V^{(u)})^H$.

Non-Orthogonal Pilots

The non-orthogonal pilots (NOP), $P^{(u)}$, for user antenna u, may be defined as a pseudo-random sequence of known symbols and of size $N_{NOP}$, over a set of frequency grid elements. The base-station can schedule many users to transmit their non-orthogonal pilots at the same subframe using overlapping time and frequency resources. The base-station will be able to separate these pilots and obtain a high-quality channel estimation for all the users, using the method describes below.

Define the vector Y of size $(L \cdot N_{NOP}) \times 1$, as the base-station received signal over all its antennas, at the frequency grid elements of the shared non-orthogonal pilots. Let $\tilde{V}^{(u)}$ be the eigenvectors matrix $V^{(u)}$ decimated along its first dimension (frequency-space) to the locations of the non-orthogonal pilots.

The base-station may apply a Minimum-Mean-Square-Error (MMSE) estimator to separate the pilots of every user antenna:

For every user antenna u, compute $$R_{YY}^{(u)} = [\tilde{V}^{(u)} \odot P^{(u)}] \cdot D^{(u)} \cdot [\tilde{V}(u) \odot P^{(u)}]^H$$

$$R_{XY}^{(u)} = \tilde{V}^{(u)} \cdot D^{(u)} \cdot [\tilde{V}(u) \odot P^{(u)}]^H$$

Herein, $\odot$ is defined as the element-by-element multiplication. For a matrix A and vector B, the $A \odot B$ operation includes replicating the vector B to match the size of the matrix A before applying the element-by-element multiplication.

If principal component analysis (PCA) is not used, the covariance matrices can be computed directly as:

$$R_{YY}^{(u)} = (P^{(u)}[P^{(u)}]^H) \odot R_{HH}^{(u)}$$

$$R_{XY}^{(u)} = (1[P^{(u)}]^H) \odot R_{HH}^{(u)}$$

For the set of user antennas shared on the same resources $u \in U$, compute $$R_{YY} = \Sigma_{u \in U} R_{YY}^{(u)}$$

and invert it. Note that it is possible to apply PCA here as well by finding the dominant eigenvalues of $R_{YY}$ ($D_{R_{YY}}$) and their corresponding eigenvectors matrix ($V_{R_{YY}}$) and approximating the inverse with $R_{YY}^{-1} \approx V_{R_{YY}} \cdot D_{R_{YY}}^{-1} \cdot (V_{R_{YY}})^H$.

For each user antenna u, compute the pilot separation filter $$C_P^{(u)} = R_{XY}^{(u)} \cdot R_{YY}^{-1}$$

For each user antenna u, separate its non-orthogonal pilots by computing $$H_{NOP}^{(u)} = C_P^{(u)} \cdot Y$$

Note that $H_{NOP}^{(u)}$ is the channel response over the frequency grid-elements of the non-orthogonal pilots for the L base-station received antennas. It may be also interpolated along frequency to obtain the channel response over the entire bandwidth.

Prediction Training

Figure 56:
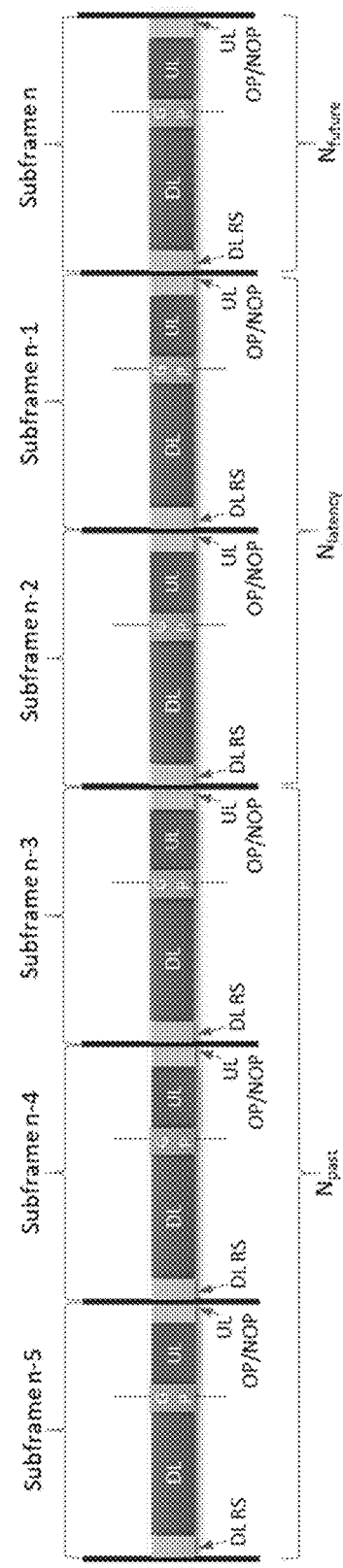
FIG. 56 shows an example of prediction training for channel estimation.

The method described in the previous section for separating non-orthogonal pilots is applied to train different users for prediction. In this step, a user sends uplink non-orthogonal pilots on consecutive subframes, which are divided to 3 different sections, as shown in the example in FIG. 56.

1. Past—the first $N_{past}$ subframes. These subframes will later be used to predict future subframes.

2. Latency—the following $N_{latency}$ subframes are used for the latency required for prediction and precoding computations.

3. Future—the last $N_{future}$ subframes (typically one), where the channel at the downlink portion will be later predicted.

Each user, is scheduled $N_{PR}$ times to send uplink non-orthogonal pilots on consecutive $N_{past}+N_{latency}+N_{future}$ subframes. Note that in one uplink symbol in the subframe, both orthogonal and non-orthogonal pilots may be packed together (although the number of orthogonal pilots will be significantly lower than the number of non-orthogonal pilots). The base-station applies the pilot separation filter for the non-orthogonal pilots of each user and computes $H_{NOP}^{(u)}$. To reduce storage and computation, the channel response may be compressed using the eigenvector matrix computed in the second-order statistics step $$H_K^{(u)} = (\tilde{V}^{(u)})^H \cdot H_{NOP}^{(u)},$$

For subframes, which are part of the "Past" section, store $H_K^{(u)}$ as columns in the matrix $H_{past,(i)}^{(u)}$, where i=1, 2, . . . , $N_{PR}$. Use all or part of the non-orthogonal pilots to interpolate the channel over the whole or part of the downlink portion of the "Future" subframes, compress it using $\tilde{V}^{(u)}$ and store it as $H_{future,(i)}^{(u)}$. Compute the following covariance matrices:

$$R_{past,(i)}^{(u)} = H_{past,(i)}^{(u)} \cdot (H_{past,(i)}^{(u)})^H$$

$$R_{future,(i)}^{(u)} = H_{future,(i)}^{(u)} \cdot (H_{future,(i)}^{(u)})^H$$

$$R_{future\_past,(i)}^{(u)} = H_{future,(i)}^{(u)} \cdot (H_{past,(i)}^{(u)})^H$$

After all $N_{PR}$ groups of prediction training subframes have been scheduled, compute the average covariance matrices for each user $$R_{past}^{(u)} = \frac{1}{N_{PR}} \sum_{i=1}^{N_{PR}} R_{past,(i)}^{(u)}$$

$$R_{future}^{(u)} = \frac{1}{N_{PR}} \sum_{i=1}^{N_{PR}} R_{future,(i)}^{(u)}$$

$$R_{future\_past}^{(u)} = \frac{1}{N_{PR}} \sum_{i=1}^{N_{PR}} R_{future\_past,(i)}^{(u)}$$

Finally, for each user compute the MMSE prediction filter $$C_{PR}^{(u)} = R_{future\_past}^{(u)} \cdot (R_{past}^{(u)})^{-1}$$

and its error variance for the precoder $$R_E^{(u)} = R_{future}^{(u)} - C_{PR}^{(u)} \cdot (R_{future\_past}^{(u)})^H.$$

Scheduling a Downlink Precoded Transmission

Figure 57:
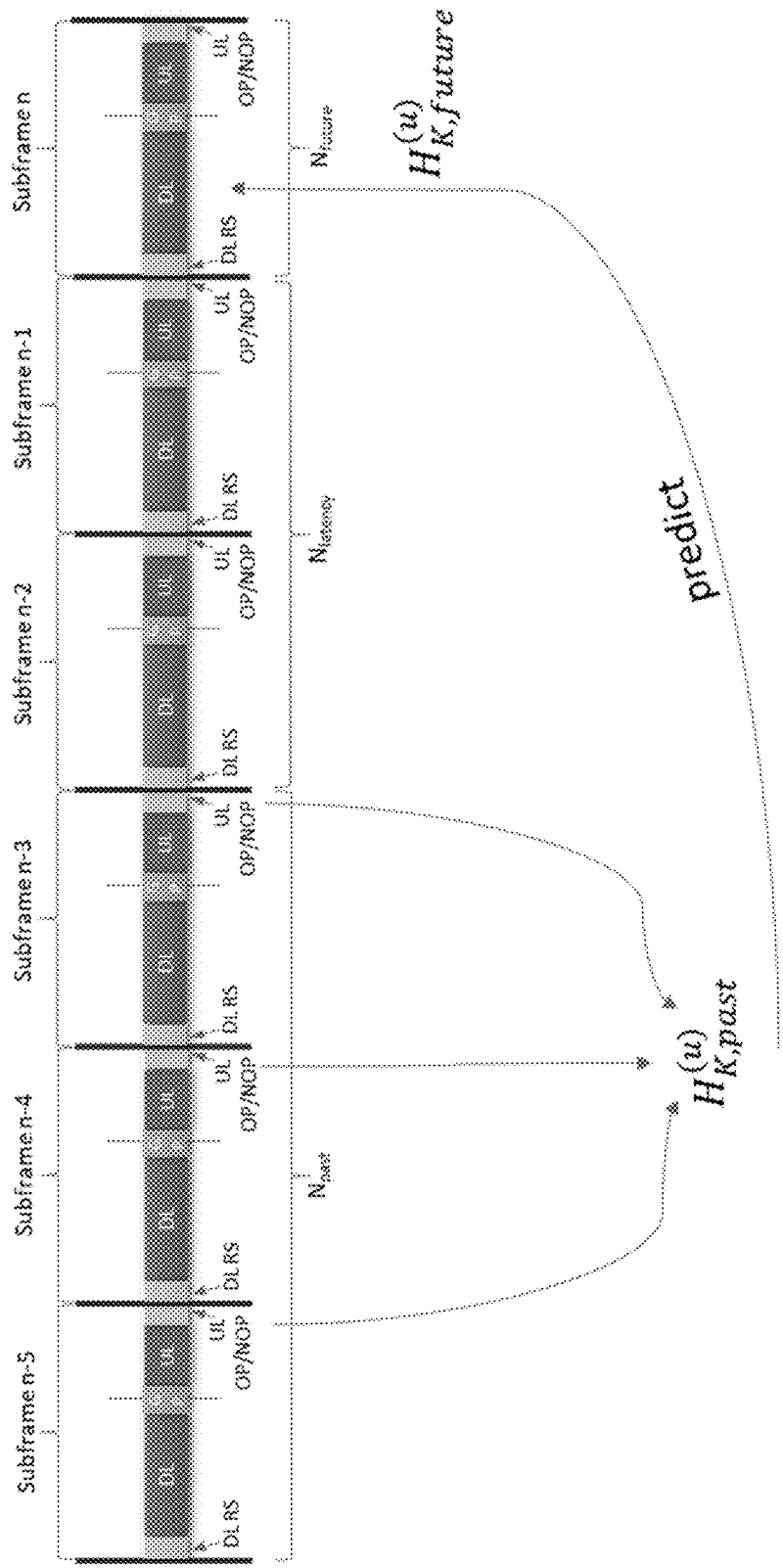
FIG. 57 shows an example of prediction for channel estimation.

For each subframe with a precoded downlink transmission, the base-station should schedule all the users of that transmission to send uplink non-orthogonal pilots for $N_{past}$ consecutive subframes, starting $N_{past}+N_{latency}$ subframes before it, as shown in FIG. 57. The base-station will separate the non-orthogonal pilots of each user, compress it and store the channel response as $H_{K,past}^{(u)}$. Then, it will apply the prediction filter to get the compressed channel response for the future part $$H_{K,future}^{(u)} = C_{PR}^{(u)} \cdot H_{K,past}^{(u)}$$

Finally, the uncompressed channel response is computed as $$H_{future}^{(u)} = \tilde{V}^{(u)} \cdot H_{K,future}^{(u)}(f)$$

The base-station may correct for differences in the reciprocal channel by applying a phase and amplitude correction, $\alpha(f)$, for each frequency grid-element $$H_{future\_reciprocity}^{(u)}(f) = \alpha(f) \cdot H_{future}^{(u)}(f)$$

Then, use $H_{future\_reciprocity}^{(u)}$ and $R_E^{(u)}$ of the participating users to compute the precoder for the downlink transmission.

Scheduling of the Uplink Pilots

If during a frame there are multiple orthogonal resources available for pilot transmission (e.g., different timeslots or different frequency grid elements), then the set of uplink pilots that needs to be transmitted can be divided into sets such that each set is transmitted on a different resource. The criterion of for the division into sets can be, e.g., the achievable pilot SINR. The transmission of non-orthogonal pilots leads to a reduction in the achievable pilot SINR, which is the more pronounced the stronger the alignment of the vector spaces containing the correlation matrices from different users is. Thus, arranging users in sets such that two pilots with very similar correlation matrices are not transmitted at the same time improves performance. However, other criteria are possible as well. For example, for users that have only a low SINR during data transmission, achieving a high pilot SINR might be wasteful; thus, achieving an optimal "matching" of the pilot SINR to the data SINR might be another possible criterion.

The embodiments of the disclosed technology described in this section may be characterized by, but not limited to, the following features:

A wireless system in which a network node performs precoded downlink transmissions, which support a massive number of users, consisting of channel prediction, reciprocity adjustment and precoding, based on the second-order statistics of the channels.

A system including a mix of uplink orthogonal pilots and non-orthogonal pilots.

Computing the second-order statistics of a channel based on orthogonal pilots.

Separating non-orthogonal pilots from multiple users, using second-order statistics and computation of channel estimation.

Training for prediction of channel estimates.

Scheduling non-orthogonal uplink pilots based on second-order statistics.

Compressing channel responses using PCA

6. Pilot Scheduling to Reduce Transmission Overhead

This section covers scheduling pilots to reduce transmission overhead and improve the throughput of a wireless communication system. One possible FWA system design is based on separating users based on their angular power spectra. For example, users can operate in parallel if they do not create "significant" interference in each other's "beams." A beam may for example be a Luneburg beam. A precoding vector can also be associated with a beam pattern. However, for ease of explanation, the word "precoder pattern" is used in the present description. Consider as an example a system with 8 beams in a 90-degree sector, such that any two adjacent beams have overlapping beam patterns, while beams whose difference of indices is at least 2 are orthogonal to each other. If there is a pure line of sight (LoS), or a small angular spread around the LoS direction, then a spatial reuse factor of 2 may be possible. For example, beams 1, 3, 5, and 7 can operate in parallel (and similarly beam 2, 4, 6, 8). However, most channels provide a larger angular spread than can be handled by such a configuration, so that only beams with a wider angular separation may use the same time/frequency resources; e.g., a reuse factor on the order of 4 may be achieved. This means that only 2 users can operate on the same time-frequency resources within one sector, so that the overall performance gain compared to traditional systems is somewhat limited.

Considerably better spatial reuse can be achieved when the user separation is based on instantaneous channel state information, using joint receive processing of the multiple beam signals, and joint precoding, for the uplink and downlink, respectively. To take the example of the uplink, with N antenna (beam) ports, N signals can be separated, so that N users can be active at the same time (and analogously for the downlink). The simplest way to achieve this is zero-forcing, though it may suffer from poor performance in particular if users are close together (in mathematical terms, this occurs if their channel vectors are nearly linearly dependent). More sophisticated techniques, such as turbo equalization in the uplink, and Tomlinson-Harashima Precoding (THP) in the downlink can improve the performance further. Such implementations can increase signal to interference plus noise ratio (SINR) for the users, though they may not increase the degrees of freedom.

However, while these methods have great advantages, they rely on the knowledge of the instantaneous channel state information (CSI) for the processing, while the beam-based transmission can be performed simply by the time-averaged (for FWA) or second order (for mobile) systems CSI. The problem is aggravated by two facts:

1) while N users can be served in parallel (since they are separated by their different instantaneous CSI), the pilots cannot be separated this way (because the CSI is not yet known when the pilots are transmitted—it is a "chicken and egg" problem). Thus, pilots can be separated based on their average or second-order statistics.
2) OTFS modulation may have a higher pilot overhead compared to, e.g., OFDMA, because of the spreading of the information over the whole time-frequency plane, such that each user attempts to determine the CSI for the whole bandwidth.

Example System Model and Basic Analysis

A. Assumptions for the Analysis

An example system is described and for ease of explanation, the following assumptions are made:

1) Luneburg lens with 8 beams. Adjacent beams have overlap, beams separated by at least 1 other beam have a pattern overlap separation of better than 30 dB. However, in general, any number of beams may be used.
2) For the uplink, no use of continuous pilots. Channels might be estimated either based on the pilots embedded in the data packets. Alternatively, placing a packet in a queue for, say 4 ms, to allow transmission of uplink pilots before the transmission of data can improve channel estimation performance.
3) For the downlink, every UE observes broadcast pilots, which, in this example, are sent periodically or continuously, and extrapolates the channel for the next downlink frame. It then might send this information, in quantized form, to the BS (for the case that explicit channel state feedback is used).
4) The discussion here only considers the basic degrees of freedom for the pilot tones, not the details of overhead associated with delay-Doppler versus time-frequency multiplexing. In some implementations, both may give approximately the same overhead.
5) A frame structure with 1 ms frame duration is used. Different users may transmit in different frames. It is assumed that in the uplink and for the precoded pilots of the downlink, two pilots are transmitted per user, one at the beginning of the frame, and one at the end of the frame, so that interpolation can be done. For the broadcast pilots in the downlink, this may not be done, since it will be transmitted once per frame anyway, so that interpolation and extrapolation is implicitly possible.
6) A system bandwidth of 10 MHz is assumed.

B. Efficiency of an Example System

The following presents a first example calculation of the pilot overhead when the pilots in all beams are kept completely orthogonal. For the example, first compute the degrees of freedom for the pilot for each user. With 10 MHz bandwidth and 1 ms frame duration, and two polarizations, there are in general 10,000 "resolvable bins" (degrees of freedom) that can be used for either data transmission or pilot tone transmission. The propagation channel has 200 degrees of freedom (resolvable delay bin 100 ns and 5 microseconds maximum excess delay means 50 delay coefficients characterize the channel, plus two resolvable Doppler bins within each channel, on each of two polarizations). Thus, the pilot tones for each user constitute an overhead of 2% of the total transmission resources. Due to the principle of OTFS of spreading over the whole system bandwidth and frame duration, the pilot tone overhead does not depend on the percentage of resources assigned to each user, but is a percentage of taken over all resources. This implies a high overhead when many users with small number of bytes per packet are active.

If completely orthogonalizing the users in the spatial and polarization domains, then the pilot overhead gets multiplied with the number of beams and polarizations. In other words, reserve a separate delay-Doppler (or time-frequency) resource for the pilot of each beam, which ensures that there is no pilot contamination. The broadcast pilots in the downlink need therefore 16% of the total resources (assuming communication in a sector) or 64% (for a full circular cell). The following examples will mostly concentrate on a single sector.

Similarly, for the uplink pilots, orthogonal pilots may be used for each of the users, in each of the beams. This results in a 16% overhead per user; with multiple users, this quickly becomes unsustainable.

The overhead for digitized feedback from the users can also be considerable. Since there are 200 channel degrees of freedom, quantization with 24 bit (12 bits each on I and Q branch) results in 4.8 Mbit/s for each user. Equivalently, if assuming on average 16 QAM (4 bit/s/Hz spectral efficiency), 1200 channel degrees of freedom are used up for the feedback of quantized information from a single user. This implies that the feedback of the digitized information is by a factor 6 less spectrally efficient than the transmission of an analog uplink pilot whose information can be used. Furthermore, the feedback is sent for the channel state information (CSI) from each BS antenna element to the customer premises equipment (CPE) or user device. Even though the feedback can be sent in a form that allows joint detection, in other words, the feedback info from users in different beams can be sent simultaneously, the overall effort for such feedback seems prohibitively large.

In addition, it is useful to consider the overhead of the embedded pilots for the downlink, where they are transmitted precoded in the same way as the data, and thus are used for the demodulation. By the nature of zero-forcing precoding, pilots can be transmitted on each beam separately. Thus, the overhead for the embedded downlink pilots is about 2% of the resources times the average number of users per beam.

For explicit feedback, there is yet another factor to consider, namely the overhead for the uplink pilots that accompany the transmission of the feedback data. This tends to be the dominant factor. Overhead reduction methods are discussed in the next section.

Overhead Reduction Methods

From the above description, it can be seen that overhead reduction is useful. The main bottlenecks indeed are the downlink broadcast pilots and the uplink pilots, since these pilots have to be sent on different time-frequency (or delay/Doppler) resources in different beams. However, under some circumstances, overhead reduction for the feedback packets is important as well. Before going into details, it is worth repeating why transmitters cannot transmit pilots on all beams all the time. Neither the UL pilots nor the broadcast DL pilots are precoded. To separate the pilots from/to different users, transmitters would have to beamform, but in order to beamform, a transmitter should know the channel, e.g., have decided pilots. Thus, a continuous transmission of pilots leads to "pilot contamination", e.g., the signals from/to users employing the same pilots interfere with each other and lead to a reduced pilot SINR. Since the pilot quality determines the capability of coherently decoding the received data signal, reduction of the pilot SINR is—to a first approximation—as detrimental as reduction of the data SINR. While countermeasures such as joint equalization and decoding are possible, they greatly increase complexity and still result in a performance loss.

One effective method of reducing pilot contamination is minimum mean square error (MMSE) filtering, which achieves separation of users with the same pilot tones by projection of the desired users' pilot onto the null-space of the channel correlation matrix of the interfering user. This reduces interference, though at the price of reduced signal power of the desired user. This method can be combined with any and all of the methods described below, and, in some situations, such a combined method will achieve the best performance. In some embodiments, linearly dependent pilot tones for the different users (instead of sets of users that use the same pilots within such a set, while the pilots in different sets are orthogonal to each other) may be used. Again, such a whitening approach can be used in conjunction with the methods described here.

A. Pilot Scheduling

The previous derivations assumed that the downlink broadcast and uplink pilots in different beams are on orthogonal resources, in order to reduce the overhead. Such an arrangement may not be needed when the angular spectra of the users are sufficiently separated. The simplest assumption is that each user has only a very small angular spread; then users that are on beams without overlaps (beam 1,3, 5, . . . etc.) can be transmitted simultaneously. For a larger angular spread, a larger spacing between the beams is used. Still, if, e.g., every 4th beam can be used, then the overall overhead for the downlink broadcast pilots reduces, e.g., from 32% to 16% in one sector. Equally importantly, the overhead remains at 16% when moving from a sector to a 360 degree cell.

However, this consideration still assumes that there is a compact support of the angular power spectrum, and there is no "crosstalk", e.g., between a beam at 0 degree and one at 60 degree. Often, this is not the case. In the presence of scattering objects, the sets of directions of contributions from/to different user devices can be quite different, and not simply a translation (in angle domain) of each other. If simply basing the beam reuse on the "worst case", one might end up with complete orthogonalization. Thus, for every deployment, it is useful to assess individually what the best pattern is for a spatial reuse of the pilots. This is henceforth called "pilot scheduling".

Before describing some examples of pilot scheduling embodiments, note that it is based on the knowledge of the power transfer matrix (PTM). The PTM may be a K×M matrix, where M is the number of beams at the BS, and K is the number of UEs. The (I,j)th entry of the PMT is then the amount of power (averaged over small-scale fading or time) arriving at the j-th beam when the i-th UE transmits with unit power (one simplification we assume in this exemplary description is that the PTM is identical for the two polarizations, which is reasonable, e.g., when there is sufficient frequency selectivity such that OTFS averages out small-scale fading over its transmission bandwidth; in any case generalization to having different PMT entries for different polarization ports is straightforward). For example, in the uplink, the receiver (base station) should know when a particular user transmits a pilot tone, in which beams to anticipate appreciable energy. This might again seem like a "chicken and egg" problem, since the aim of the pilot transmission is to learn about the channel between the user and the BS. However, the PTM is based on the knowledge of the average or second order channel state information (CSI). Since this property of a channel changes very slowly (on the order of seconds for mobile systems, on the order of minutes or more for FWA), learning the PTM does not require a significant percentage of time-frequency resources. While provisions should be taken in the protocol for suitable mechanisms, those pose no fundamental difficulty, and the remainder of the report simply assumes that PTM is known.

1) Pilot scheduling for the uplink: as mentioned above, the PTM contains information about the amount of power that is transferred from the ith user to the jth beam. Now, given the PTM, the question is: when can two uplink pilots be transmitted on the same time-frequency resources?

The answer may depend on the subsequent data transmission, for example, if the criterion is: "is the loss of capacity resulting from the imperfect beamforming vectors is less than the spectral efficiency gain of the reduced pilot overhead". Conventional techniques do not consider such a criterion. This aspect of inquiry can be used in many advantageous ways:

a) It is not necessary to have highly accurate (contamination-free) pilots if the subsequent data transmission uses a low-order QAM anyways.

b) The pilot scheduling depends on the receiver type. First, different receivers allow different modulation schemes (even for the same SINR). Second, a receiver with iterative channel estimation and data decoding might be able to deal with more pilot contamination, since it processes the decoded data (protected by forward error correction FEC) to improve the channel estimates and reduce contamination effects.

c) The pilot scheduling, and the pilot reuse, may change whenever the transmitting users change. A fixed scheduling, such as beams 1,5,9, . . . etc. may be highly suboptimum.

d) Given the high overhead for uplink pilots, allowing considerable pilot contamination, and use of associated low SINR and modulation coding scheme (MCS), is reasonable, in particular for small data packets.

e) For an FWA system, it may be reasonable to allow uplink transmission without embedded pilots, basing the demodulation solely on the average channel state. However, due to the clock drift, a few pilots for phase/timing synchronizations may still be used, but no pilots may be used for channel re-estimation. For those short packets, a reduced-order MCS may be used. Alternatively, the short packets could be transmitted on a subband of the time-frequency resources, where the subband could even be selected to provide opportunistic scheduling gain.

The optimum scheduler may be highly complicated, and may change whenever the combination of considered user devices changes. Due to the huge number of possible user combinations in the different beams, it may not even possible to compute the optimum scheduler for each combination in advance and then reuse. Thus, a simplified (and suboptimum) scheduler may have to be designed.

2) Pilot scheduling for the downlink: The scheduler for the downlink broadcast pilots has some similarities to the uplink pilots, in that it is based on the PTM. However, one difference is worth noting: the scheduler has to provide acceptable levels of pilot contamination for all users in the system, since all users are monitoring the broadcast pilots and extrapolate the channel in order to be able to feed back the extrapolated channel when the need arises. Thus, the reuse factor of the broadcast pilots may be large (meaning there is less reuse) than for the uplink pilots. For the computation of the pilot schedule, a few things may be taken into account:

a) the schedule may only be changed when the active user devices change, e.g., a modem goes to sleep or wakes up. This happens on a much rarer basis than the schedule change in the uplink, which happens whenever the actually transmitting user devices change.

b) In the downlink pilots, it may not be exactly known what pilot quality will be required at what time (e.g., the required SINR), since the transmitting user schedule is not yet known (e.g., when the pilots are transmitted continuously). Thus, it may be assumed that data transmission could occur without interference (e.g., all other beams are silent because there are no data to transmit), so that the data transmission for the user under consideration happens with the MCS that is supported by the SNR.

c) It is possible that one (or a few) user devices become a "bottleneck", in the sense that they require a large reuse factor when all other users might allow dense reuse. It is thus useful to consider the tradeoff of reducing the pilot quality to these bottleneck user devices and reducing the MCS for the data transmission, as this might lead to an increase of sum spectral efficiency, and may be performed by taking minimum (committed) service quality constraints into account.

Since broadcast pilots are always transmitted from the BS, and can be only either transmitted or not transmitted (there is no power control for them), the number of possible combinations is manageable ($2^8$), and it is thus possible to compute the SINR at all users in the cell for all pilot schedules, and check whether they result in acceptable SNR at all users, and pick the best one. As outlined above, there is no need to recompute the schedule, except when the set of active user devices changes. When considering a combination of this scheme with MMSE receivers, scheduling should be based on the SINR that occurs after the MMSE filtering.

B. Exploiting the Properties of FWA

One way for reducing the overhead is to exploit the special properties of FWA channels, namely that the instantaneous channel is the average channel plus a small perturbation. This can be exploited both for reducing the reuse factor, and for more efficient quantization.

1) Reducing the reuse factor: The goal of the pilot tones is to determine the CSI for each user device with a certain accuracy. Let us consider the uplink: for the i-th user in the j-th beam, the CSI can be written as $H^{av}_{ij}+\Delta H_{ij}$; the power ratio $(\Delta H_{ij}/H^{av}_{ij})^2$ is the temporal Rice factor for this particular link $K_{ij}$. Now any pilot contamination based on $H^{av}_{ij}$ is known and can be eliminated by interference cancellation. Thus, denoting the kj-th entry of the PTM $C_{kj}$, then a naïve assessment of the pilot contamination would say that the achievable pilot SIR in the j-th beam is $C_{ij}/C_{kj}$. However, by first subtracting the known contribution $H^{av}_{kj}$ from the overall received signal, $K_{kj}C_{ij}/C_{kj}$ can be achieved. Having thus improved the SIR for each user, the system can employ a much smaller reuse factor (that is, reduce overhead). In practice this method can probably reduce the reuse factor by about a factor of 2. The same approach can also be applied in the downlink. The improvement that can be achieved will differ from user device to user device, and the overall reuse factor improvement will be determined by the "bottleneck links" (the ones requiring the largest reuse factor). Some embodiments can sacrifice throughput on a few links if that helps to reduce the pilot reuse factor and thus overhead, as described above. When combining this method with MMSE filtering, the procedure may occur in two steps: first, the time-invariant part of the channel is subtracted. The time-variant part is estimated with the help of the MMSE filtering (employing the channel correlation matrix of the time-variant part), and then the total channel is obtained as the sum of the time-invariant and the thus-estimated time-variant channel.

2) Improved quantization: Another question is the level of quantization that is to be used for the case that explicit feedback is used. Generally, the rule is that quantization noise is 6 dB for every bit of resolution. The 12 bit resolution assumed above for the feedback of the CSI thus amply covers the desired signal-to-quantization-noise ratio and dynamic range. However, in a fixed wireless system, implementations do not need a large dynamic range margin (the received power level stays constant except for small variations), and any variations around the mean are small. Thus, assume a temporal Rice factor of 10 dB, and an average signal level of −60 dBm. This means that the actual fluctuations of the signal have a signal power of −70 dBm. 4-bit quantization provides −24 dB quantization noise, so that the quantization noise level is at −94 dBm, providing more than enough SIR. Embodiments can thus actually reduce the amount of feedback bits by a factor of 3 (from 12-bit as assumed above to 4 bits) without noticeable performance impact.

3) Adaptivity of the methods: The improvements described above use the decomposition of the signal into fixed and time-varying parts, and the improvements are the larger the larger the temporal Rice factor is. Measurements have shown that the temporal Rice factor varies from cell to cell, and even UE to UE, and furthermore might change over time. It is thus difficult to determine in advance the reduction of the reuse factor, or the suitable quantization. For the reduction of the reuse factor, variations of the Rice factor from cell to cell and between user devices such as UEs can be taken care of as a part of the pilot scheduling design, as described above. Changes in the temporal Rice factor (e.g., due to reduced car traffic during nighttime, or reduction of vegetation scatter due to change in wind speed) might trigger a new scheduling of pilots even when the active user set has not changed. For the quantization, the protocol should not contain a fixed number of quantization bits, but rather allow an adaptive design, e.g., by having the feedback packet denote in the preamble how many bits are used for quantization.

C. Reduction Methods for Small Packet Size

The most problematic situation occurs when a large number of users, each with a small packet, are scheduled within one frame. Such a situation is problematic no matter whether it occurs in the uplink or the downlink, as the pilot overhead in either case is significant. This problem can be combatted in two ways (as alluded to above)

1) reduce the bandwidth assigned to each user. This is a deviation from the principle of full-spreading OTFS, but well aligned with other implementations of OTFS that can assign a subband to a particular user, and furthermore to various forms of OFDMA.

The two design trade-offs of the approach are that (i) it may use a more sophisticated scheduler, which now considers frequency selectivity as well, and (ii) it is a deviation from the simple transmission structure described above, where different users are designed different timeslots and/or delay/Doppler bins. Both of these issues might be solved by a multi-subband approach (e.g., 4 equally spaced subbands), though this may trade off some performance (compared to full OTFS) and retains some significant pilot overhead, since at least CSI in the 4 chosen subbands has to be transmitted.

2) transmit the small packets without any pilots, relying on the average CSI for suppression of inter-beam interference. It is noteworthy that for the downlink, an implementation can sacrifice SIR (due to pilot contamination) on some links without disturbing others. Imagine that precise CSI for UE j is available, while it is not available for UE k. An implementation can thus ensure that the transmission for k lies in the exact null-space of j, since the CSI vector $hj=[h_{ij}; h_{2j}; \ldots]$ is known accurately, and thus its nullspace can be determined accurately as well. So, if the link to j wants to send a big data packet for which the use of a high-order MCS is essential, then the system can invest more resources (e.g., reduce pilot imprecision) for this link, and reap the benefits.

3) For the uplink, the approach 2 may not work: in order to have high SINR for the signal from the j-th user, it is advantageous to suppress the interference from all other users that are transmitting in parallel. Thus, instead one approach may be to provide orthogonalization in time/frequency (or delay/Doppler) between the group of users that needs low pilot contamination (usually large packets, so that the efficiency gain from transmitting pilots outweighs the overhead), and another group of users (the ones with small packets) that do not transmit pilots (or just synchronization pilots) and thus are efficient, yet have to operate with lower-order MCS due to the pilot contamination. It must be noted that methods 2 and 3 only work for FWA systems, where one can make use of the average CSI to get a reasonable channel estimate without instantaneous pilots. When migrating to a mobile system, it is recommended to move to approach 1.

Examples for the Achievable Gain

This section describes some examples of the gain that can be achieved by the proposed methods versus a baseline system. It should be noted that the gain will be different depending on the number of users, the type of traffic, and particularly the directional channel properties. There are examples where the simple orthogonalization scheme provides optimum efficiency, so that no gain can be achieved, and other examples where the gain can be more than an order of magnitude. The section will use what can be considered "typical" examples. Ray tracing data for typical environments and traffic data from deployed FWA or similar systems, for example, can be used to identify a typical or representative system.

A. Gain of Pilot Scheduling

One purpose of pilot scheduling is to place pilots on such time-frequency resources that they either do not interfere significantly with each other, or that the capacity loss by using more spectral resources for pilots is less than the loss one would get from pilot contamination. In a strictly orthogonal system, there is no pilot contamination, but 16% of all spectral resources must be dedicated to the downlink pilots, and a fraction 0.16*Nupb of the resources for the uplink pilots, where Nupb is the number of users per beam in the uplink. For a full 360 degree cell, the numbers are 64% and 0.64*Nupb.

A possibly simplest form of pilot scheduling is just a reuse of the pilot in every P-th beam, where P is chosen such that the interference between two beams separated by P is "acceptable" (either negligible, or with a sufficiently low penalty on the capacity of the data stream). This scheme achieves a gain of 36/P in a completely homogeneous environment. For a suburban LoS type of environment, P is typically 4, so that the pilot overhead can be reduced by a factor of 9 (almost an order of magnitude) for a 360 degree cell. Equivalently, for the uplink pilots, the number of users in the cell can be increased by a factor of 9 (this assumes that the overhead for the uplink pilots dominates the feedback overhead, as discussed above).

Simple scheduling may work only in an environment with homogeneous channel and user conditions. It can be seen that a single (uplink) user with angular spread covering P0 beams would entail a change in the angular reuse factor to P0 (assuming that a regular reuse pattern for all users is used), thus reducing the achievable gain. The more irregular the environment, the more difficult it is to find a reasonable regular reuse factor, and in the extreme case, complete orthogonalization might be necessary for regular reuse patterns, while an irregular scheduling that simply finds the best combination of users for transmitting on the same spectral resources, could provide angular reuse factors on the order of 10. However, in an environment with high angular dispersion (e.g., microcell in a street canyon), where radiation is incident on the BS from all directions, even adaptive scheduling cannot provide significant advantages over orthogonalization.

In conclusion, pilot scheduling provides an order-of-magnitude reduction in pilot overhead, or equivalently an order of magnitude larger number of users that can be accommodated for a fixed pilot overhead, compared to full orthogonalization. Compared to simple (regular) pilot reuse, environment-adaptive scheduling retains most of the possible gains, while regular scheduling starts to lose its advantages over complete orthogonalization as the environment becomes more irregular.

B. Exploiting FWA Properties for Pilot Scheduling

The exploitation of FWA properties can be more easily quantified if we retain the same reuse factor P as we would have with a "regular" scheme, but just make use of the better signal-to-interference ratio of the pilots (e.g., reduced pilot contamination). As outlined in Sec. 3.2, the reduction in the pilot contamination is equal to the temporal Rice factor. Assuming 15 dB as a typical value, and assuming a high-enough SNR that the capacity of the data transmission is dominated by pilot contamination, the SINR per user is thus improved by 15 dB. Since 3 dB SNR improvement provide 1 bit/s/Hz increase in spectral efficiency, this means that for each user, capacity is increased by 5 bit/s/Hz. Assuming 32 QAM as the usual modulation scheme, an implementation can double the capacity through this scheme.

A different way to look at the advantages is to see how much the number of users per beam can be increased, when keeping the pilot SIR constant. This can depend on the angular spectrum of the user devices. However, with a 15 dB suppression of the interference, one can conjecture that (with suitable scheduling), a reuse factor of P=2, and possibly even P=1, is feasible. This implies that compared to the case where an implementation does not use this property, a doubling or quadrupling of the number of users is feasible (and even more in highly dispersive environments)

In summary, exploiting the FWA properties for pilot scheduling doubles the capacity, or quadruples the number of users C. Exploiting the FWA Properties for Reduction of Feedback Overhead As outlined above, exploiting the FWA properties allow to reduce the feedback from 12 bit to 4 bit, thus reducing overhead by a factor of 3. Further advantages can be gained if the time-variant part occurs only in the parts of the impulse response with small delay, as has been determined experimentally. Then the feedback can be restricted to the delay range over which the time changes occur. If, for example, this range is 500 ns, then the feedback effort is reduced by a further factor of 10 (500 ns/5 microsec). In summary, the reduction of the feedback overhead can be by a factor of 3 to 30.

7. Reciprocal Calibration of a Communication Channel

This section covers reciprocal calibration of a communication channel for reverse channel estimation. In the recent years, to meet the increased demand on available bandwidth, many new techniques have been introduced in wireless communications. For example, the amount of bandwidth, measured as a total number or as a number of bits per Hertz per second number, has grown steadily over years in prevalent communication standards such as the Long Term Evolution (LTE). This trend is expected to grow even more due to the explosion of smartphones and multimedia streaming services.

Of the available bandwidth in a wireless network, some bandwidth is typically used by system overhead signaling that may be used for maintaining operational efficiency of the system. Examples of the overhead signaling includes transmission of pilot signals, transmission of system information, and so on. With time-varying nature of a communication channel between mobile end point(s), the system messages may have to be exchanged more frequently and the overhead may end up becoming significant. The embodiments described in the present document can be used to alleviate such bandwidth overhead, and solve other problems faced in wireless communication systems.

Figure 58:
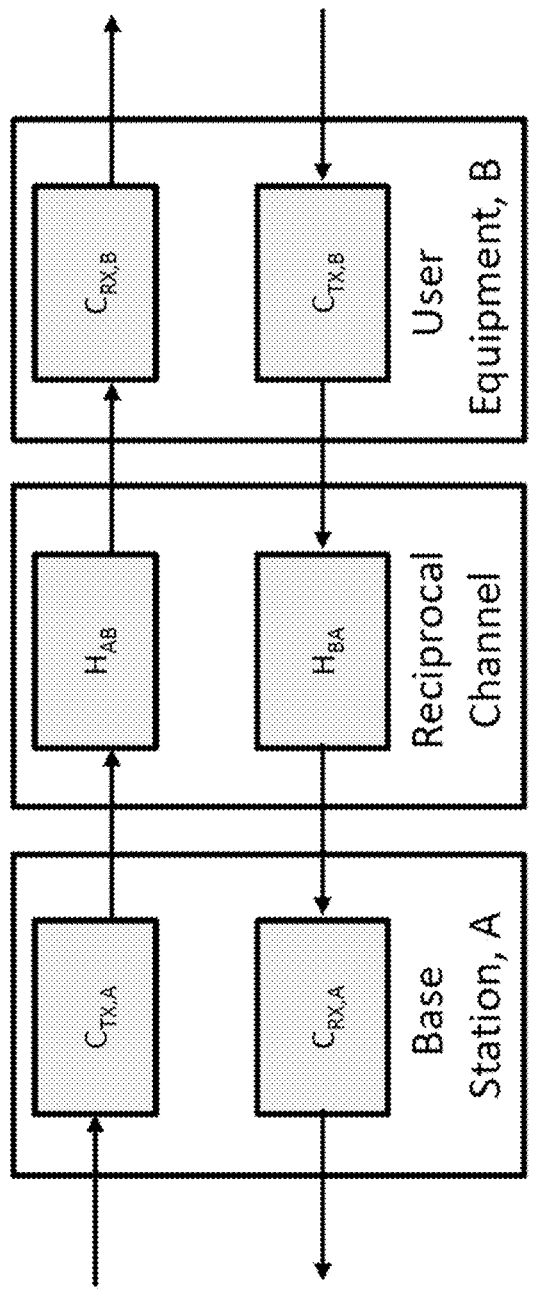
FIG. 58 shows an example of a wireless channel with reciprocity.

FIG. 58 shows an example block diagram of a communication channel with reciprocity. The composite wireless channel from A to B may be represented as: $\hat{H}_{A,B} = C_{RX,B} \cdot H_{A,B} \cdot C_{TX,A}$.

For the reciprocal channel, assume that $H_{AB} = \lambda H_{BA}^T$ for a complex scalar $\lambda$.

In the case of a non-reciprocal channel, with analog and RF components, Non-reciprocal analog and RF components: $C_{TX, A}$, $C_{RX, A}$, $C_{RX, B}$, $C_{TX, B}$, ideally for simplicity, it is beneficial if each matrix is a diagonal matrix. Such an embodiment may also use a design that minimizes the coupling between Tx and Rx paths.

Similarly, the composite channel from B to A is given by $\hat{H}_{B,A} = C_{RX, A} \cdot H_{B,A} \cdot C_{TX,B}$.

If all the C matrices can be estimated a priori, the BS to UE channel can be estimated from the UE to BS channel. In such a case, feeding back channel state information for transmit beamforming may not be needed, thereby making the upstream bandwidth available for data instead of having to transmit channel state information. Estimation of the C matrices may also improve system efficiency. In some embodiments disclosed herein, the reciprocity calibration may be performed by calibrating Tx and Rx of the BS and UE side during a startup or a pre-designated time. The diagonal matrices $C_{TX, A}$, $C_{RX, A}$, $C_{RX, B}$, $C_{TX, B}$ may be estimated. These matrices may be re-estimated and updated periodically. The rate of change of the C matrices will typically be slow and may be related to factors such as the operating temperature of the electronics used for Tx and Rx.

Brief Discussion

In point to multi-point (P2MP) systems and fixed wireless access (FWA) systems, multi-user MIMO (MU-MIMO) is used for increasing the system throughput. One of the components of MU-MIMO is a transmit pre-coder based beam-forming at the Base Station (BS) transmitter. BS sends signals to all User Equipments (UE) (say n of them) simultaneously.

In operation, n−1 signals, intended for n−1 individual UEs, will act as interference for the target UE. A transmit pre-coder cancels the interference generated at the target UE by the n−1 un-intended signals meant for other UEs. To build a pre-coder, down link channel state information (CSI) is used.

In an extrinsic beamforming technique, CSI is fed back from the UE to BS through a feedback up-link channel. However, considerable amount of data BW is used for this, thus affecting the overall system throughput efficiency.

For Time Division Duplex (TDD) systems, the physical channel in the air (sometimes called the radio channel) is reciprocal within the channel coherence time. e.g., the case wherein the uplink (UE to BS) and downlink (BS to UE) are identical (in SISO (transpose in MIMO). However, when the transceiver front-end (FE) hardware is also taken into account, channel reciprocity no longer holds. This is due to the non-symmetric characteristics of the RF hardware. It includes PA non-linearity, RF chain crosstalk, phase noise, LNA non-linearity and noise figure, carrier and clock drifts etc.

In some embodiments, a calibration mechanism can be designed to calibrate for the nonreciprocal components of the wireless link such that embodiments can estimate the down-link by observing the up-link with the help of these calibration coefficients. If this is feasible, no CSI feedback is necessary (as in the case of extrinsic beam forming), thus improving the overall system throughput efficiency. The associated beamforming is also sometimes called intrinsic beamforming. The technique disclosed in this patent document can be used to solve the above discussed problem, and others.

Notation

In the description herein, $h_{a1a2}$ denotes the channel from transmitter (TX) a1 to receiver (RX) a2. This notation is different from the conventional MIMO channel notation. In the conventional methods, this will be denoted as $h_{a2a1}$). Also, conjugate of a complex quantity is represented with a*, e.g., conj(h)=h*.

Reciprocity Calibration for Precoding

A precoded transmission is based on the knowledge of the exact channel response between the transmitting antenna(s) of a first terminal denoted by A—typically a base-station (BS)—to the receiving antenna(s) of a second terminal denoted by B—typically a piece of Consumer Premises Equipment (CPE) or a user equipment (UE). This channel response can be considered to be composed of three different parts as illustrated in FIG. 3. First, the channel response of the transmitter in terminal A. Second, the channel response of the different reflectors. Third, the channel response of the receiver in terminal B. The transmitter channel responses may be due to the transmit chain circuitry such as power amplifiers, digital to analog converters (DACs), frequency upconverters and so on. The receiver channel response may be due to receiver-side circuitry such as low noise block (LNB), frequency downconverter, analog to digital conversion circuitry (ADC).

There are two main differences between the channel responses at terminals A and B and the channel response of the wireless channel reflectors:
1. The channel response of the wireless channel reflectors in a time-division duplex (TDD) system is reciprocal whereas the channel response of the terminals is not.
2. The channel response of the wireless channel reflectors may change rapidly (e.g., in 1-10 milliseconds, depending on the Doppler of the reflectors and terminals), but the channel response of the terminals changes slowly, mostly with temperature.

There are several methods for obtaining the complete channel response from terminal A to B described in the literature. For example, an explicit method would be to send known reference signals from terminal A to B and have terminal B transmit back the values of the received reference signals to terminal A. This is often referred to as explicit feedback. However, each value must be represented with multiple bits, and in a system where terminal A has many antennas, there are many user terminals and significant Doppler effects causing the propagation channel to change rapidly, the amount of information that needs to be transmitted can severely reduce the overall system efficiency. In the extreme case with high levels of Doppler, it is simply not possible to feedback all the required Channel State Information (CSI) quickly enough, resulting in stale CSI and suboptimal precoding.

Instead, a TDD system can use an approach known as "reciprocity calibration" to obtain the relationship between the non-reciprocal parts of the channel response in both transmission directions: the AB (from A to B) and the BA (from B to A). Terminal B first transmits known reference signals that allow terminal A to compute the AB channel response. Using knowledge of the non-reciprocal relationship, terminal A can adjust the BA channel response to make it suitable for precoding a transmission back to terminal B.

More formally, for a multi-carrier TDD system that uses multi-carrier modulation, where the channel can be described as a complex value in the frequency domain for a specific sub-carrier (tone), the three components of the AB channel response can be denoted as $H_A^{TX}$, $H^{CH}$ and $H_B^{RX}$. Similarly, the three components of the BA channel response are $H_B^{TX}$, $H^{CH}$ and $H_A^{RX}$. The overall downlink (AB) channel response is $$H_{AB} = H_A^{TX} \cdot H^{CH} \cdot H_B^{RX} \tag{55}$$

and the overall uplink (BA) channel response is $$H_{BA} = H_B^{TX} \cdot H^{CH} \cdot H_A^{RX} \tag{56}$$

From $H_{AB}$ and $H_{BA}$, the reciprocity calibration factor can be written as $$\alpha = \frac{H_A^{TX} \cdot H_B^{RX}}{H_B^{TX} \cdot H_A^{RX}} \tag{57}$$

Therefore, if $H_{BA}$ is known at terminal A, it can compute $H_{AB} = \alpha H_{BA}$. The question that remains is how to obtain $\alpha$. Note that for the multi-carrier system, the above Equations (55) to (57) will provide reciprocity calibration values and channel responses on a per sub-carrier basis for sub-carriers on which reference signals are transmitted.

Different methods exist within the literature for computing the reciprocity calibration factor. The most straight forward of these is to utilize explicit feedback as described above, but only feed back $H_{AB}$ when $\alpha$ is re-calculated.

Since the transmitter and receiver channel responses change relatively slowly, the rate of feedback is typically in the order of minutes and thus represents negligible overhead for a modest number of terminals and antennas. However, when the number of antennas in terminal A and the number of CPEs (terminal B) is large, as can be the case in a massive multiple-input multiple-output (MIMO) system with many subscribers, the feedback overhead can consume a considerable portion of the system capacity.

Another approach is to have terminal A transmit reference signals between its own antennas and calculate calibration factors for only $H_A^{TX}$ and $H_A^{RX}$. That is, obtain:

$$\alpha_A = \frac{H_A^{TX}}{H_A^{RX}} \tag{58}$$

which results in $$\tilde{H}_{AB} = \alpha_A \cdot H_{BA} = H_A^{TX} \cdot H_B^{TX} \cdot H^{CH} \tag{59}$$

Terminal A will then precode one reference symbol using $\tilde{H}_{AB}$ that terminal B can use to remove its $H_B^{TX}$ and $H_B^{RX}$ contributions from all subsequent precoded transmissions. This technique may be called relative calibration. Whilst this approach entirely removes the need for feedback of $H_{BA}$, the need for terminal A to transmit to itself during a calibration procedure and then to CPEs that could be located many hundreds of meters or even kilometers away can create dynamic range challenges. It is typically desirable to use the same hardware gain stages in the transmit chain when calibrating as those used for transmission, since having to switch gain stages between calibration and transmission can change the nature of $H_A^{TX}$ and $H_A^{RX}$.

This document describes a new approach for computing the reciprocity calibration factor that avoids the dynamic range concern of relative calibration whilst maintaining high levels of efficiency when scaling to a larger number of antennas and terminals. As described herein, the reference signals transmitted for calibration and at the same power level as typical signal transmissions, and hence are better suited to capture and calibrate the distortions introduced by transmit/receive circuitry.

Reciprocity Calibration Via Receiver-Side Inversion

Let Terminal A transmit known reference signals over a subset of multi-carrier tones and P be a specific reference signal at one of these tones. For example, Terminal A may use every Mth subcarrier for reference signal transmission, where M is an integer. For example, M may be 8 or 16 in practical systems. Terminal B receives $$Y_B = H_{AB} \cdot P + W \tag{60}$$

where W is additive white Gaussian noise with zero mean and variance $N_0$. Note that the above equation is a scalar equation because the equation represents the received signal at a single subcarrier. For each subcarrier on which a reference is transmitted, there will be one such equation. Terminal B estimates $H_{AB}$ from $Y_B$ and inverts it. To avoid singularities and cope with a large dynamic range, regularized zero forcing may be used to compute the inversion:

$$\tilde{H}_{AB}^{-1} = \frac{H_{AB}^*}{H_{AB}^* \cdot H_{AB} + N_0} \approx H_{AB}^{-1} \tag{61}$$

Terminal B then transmits $\tilde{H}_{AB}^{-1}$ back to terminal A over the same tone. This transmission should quickly follow the first one—especially in the presence of Doppler—to ensure $H^{CH}$ remains relatively constant. Terminal A then receives $$Y_B = H_{BA} \cdot \hat{H}_{AB}^{-1} + W \tag{62}$$

Ignoring the noise term, which may be averaged out over multiple transmissions, it can be seen that $Y_B$ is the inverse of the reciprocity calibration factor:

$$Y_B \approx \frac{H_B^{TX} \cdot H^{CH} \cdot H_A^{RX}}{H_A^{TX} \cdot H^{CH} \cdot H_B^{RX}} = \frac{H_B^{TX} \cdot H_A^{RX}}{H_A^{TX} \cdot H_B^{RX}} = \alpha^{-1} \tag{63}$$

Since these are scalar values, the inversion processing is for both $H_{AB}$ and $Y_B$ is straightforward. Here, the inverse reciprocity calibration factor represents a ratio of circuitry channel from Terminal B to Terminal A, and a circuitry channel from Terminal A to Terminal B.

In multi-carrier systems, the above-described procedure may be repeated over multiple tones and the result interpolated to yield the full set of calibration factors over the bandwidth of interest. This full set may be obtained, for example, by averaging or interpolating the calibration factors are the subcarriers at which reference signals were transmitted. Since the Tx and Rx contributions of both terminal A and B will be relatively flat across frequency, it should be possible to use a sparse subgrid of tones with the appropriate interpolation to obtain an accurate level of calibration.

The results of the channel estimation as above may be combined with channel estimation of the $H^{CH}$ channel to obtain an estimate of the overall channel $H_{AB}$ and $H_{BA}$.

Example Embodiments

A. Downlink Channel Estimation from Uplink Channel and Calibration Coefficients

While the disclosed techniques are more generally applicable, for the ease of explanation, the following assumptions are made:

[1] cross talk between the TX-TX, RX-RX and TX-RX RF chains is negligible
[2] Antenna mutual coupling in negligible
[3] TX and RX at BS are working with clocks generated from the same PLL so that carrier and symbol clocks are synchronized in wireless transmissions among transceivers at A or B (and not necessarily between A and B). Here, "A" and "B" represent communication devices at two ends of a communication medium. For example, A may refer to a base station (or user equipment) and correspondingly B may refer to a user equipment (or base station). As another example, A may refer to a hub and B may refer to a remote station. Without loss of generality, the channel from A to B may be called the downlink (DL) channel and the channel from B to A may be called the uplink (UL) channel. See, e.g., FIG. 59 and FIG. 60.
[4] same assumptions as above for UE.

Measurements on existing equipment have verified that a) the coupling between different RF paths is typically of the order of −30 dB. A careful design of the RF front end can ensure even lesser levels of cross talk. b) The isolation between the cross polarizations of the antenna is of the order of 15 to 20 dB. This means that if a signal of x dB power is sent on the vertical polarization of a cross polarized antenna, an image with (x−15) dB power will appear on the horizontal polarization. This isolation cannot be improved much even under improved antenna design. So, for the below calibration mechanism to work properly, embodiments should either use i) antenna with single polarization is used or ii) if dual polarized antenna are used, take care that simultaneous transmission on both the polarizations is never happening.

However, these assumptions can be relaxed, as described herein, and modifications in the below described calibration algorithm will be presented as well. If dual polarized antenna is the design choice, modifications to the disclosed algorithm as described herein could be used in some embodiments.

Some embodiments of a calibration algorithm are described herein for a 4×4 MIMO system. This is to keep the description simple and easy to comprehend. The same mechanism can be generalized to systems with any number of BS and UE antenna.

With reference to FIG. 59 and FIG. 60, a four antenna system 5900 at A and a four antenna system 6000 at B are depicted. For example, the configuration 5900 at A may represent a base station and the configuration 6000 at B may represent a UE (or vice versa). Let $\hat{h}_{a1a2}$ denote the channel from TX a1 to RX a2. It is constituted by 2 components a). The reciprocal radio channel from antenna a1 to antenna a2 and b) the non-reciprocal components at TX a1 and RX a2. Non-reciprocal components are captured in two memoryless complex scalars denoted by $t_{a1}$ and $r_{a1}$ corresponding to the TX and RX respectively. In this patent document, modifications when delay is involved will be demonstrated as well.

Thus, $\hat{h}_{a1a2}$ can be written as:

$$\hat{h}_{a1a2} = t_{a1} \cdot h_{a1a2} \cdot r_{a2} \tag{64}$$

Similarly, channel between TX at a2 to RX at a1, $\hat{h}_{a1a2}$, can be written as $$\hat{h}_{a2a1} = t_{a2} \cdot h_{a2a1} \cdot r_{a1} \tag{65}$$

Taking the ratio between $\hat{h}_{a1a2}$ and $\hat{h}_{a2a1}$, and noting that $h_{a1a2}$ and $h_{a2a1}$ are identical, the following can be written:

$$c_{a1a2} = \frac{t_{a1} \cdot r_{a2}}{r_{a1} \cdot t_{a2}} \tag{66}$$
$$= \frac{1}{c_{a2a1}}.$$

The coefficient $c_{a1a2}$ is referred to as the calibration coefficient from a1 to a2. Similarly, the calibration coefficient from a2 to a3, $c_{a2a3}$, can be written as:

$$c_{a2a3} = \frac{t_{a2} \cdot r_{a3}}{r_{a2} \cdot t_{a3}} \tag{67}$$
$$= \frac{t_{a1} \cdot r_{a3}}{r_{a1} \cdot t_{a3}} \cdot \frac{r_{a1} \cdot t_{a2}}{t_{a1} \cdot r_{a2}}$$
$$= \frac{c_{a1a3}}{c_{a1a2}}$$

From Equation (67), it can be seen that the calibration coefficient between antenna a2 (TX) and antenna a3 (RX) can be written as the ratio of the calibration coefficients of the reference antenna a1 to that of a3 and a2. Similar relations can be derived for TXs and RXs at B, depicted in configuration 6000 of FIG. 60. Equations for calibration coefficients that involve antennas from both sides A and B can be derived as below.

$$c_{a2b2} = \frac{t_{a2} \cdot r_{b2}}{t_{b2} \cdot r_{a2}} \quad (68)$$

$$= \frac{t_{a1} \cdot r_{b1}}{t_{b1} \cdot r_{a1}} \cdot \frac{r_{a1} \cdot t_{a2}}{t_{a1} \cdot r_{a2}} \cdot \frac{t_{b1} \cdot r_{b2}}{t_{b2} \cdot r_{b1}}$$

$$= \frac{c_{a1b1}}{c_{a1a2}} \cdot c_{b1b2}$$

From Equation (68), it should be clear that any wireless channel between A and B can be written in terms of a) a calibration coefficient with respect to a reference antenna at A, b) a calibration coefficient with respect to a reference antenna at B, and c) a calibration coefficient between the same reference antennas at A and B.

Similarly, the downstream channels (BS-UE) can be represented in terms of the upstream channels (UE-BS) and calibration coefficients.

$$\hat{h}_{a1b1} = c_{a1b1} \cdot \hat{h}_{b1a1}$$

$$\hat{h}_{a1b2} = c_{a1b1} \cdot c_{b1b2} \cdot \hat{h}_{b2a1} (c_{a1b2} \cdot \hat{h}_{b2a1})$$

$$\hat{h}_{a1b3} = c_{a1b1} \cdot c_{b1b3} \cdot \hat{h}_{b3a1} (c_{a1b3} \cdot \hat{h}_{b3a1})$$

$$\hat{h}_{a1b4} = c_{a1b1} \cdot c_{b1b4} \cdot \hat{h}_{b4a1} \quad (69)$$

Similarly, $$\hat{h}_{a2b1} = \frac{c_{a1b1}}{c_{a1a2}} \cdot \hat{h}_{b1a2} \quad (70)$$

$$\hat{h}_{a2b2} = \frac{c_{a1b1}}{c_{a1a2}} \cdot c_{b1b2} \cdot \hat{h}_{b2a2}$$

$$\hat{h}_{a2b3} = \frac{c_{a1b1}}{c_{a1a2}} \cdot c_{b1b3} \cdot \hat{h}_{b3a2}$$

$$\hat{h}_{a2b4} = \frac{c_{a1b1}}{c_{a1a2}} \cdot c_{b1b4} \cdot \hat{h}_{b4a2}.$$

Furthermore, $$\hat{h}_{a3b1} = \frac{c_{a1b1}}{c_{a1a3}} \cdot \hat{h}_{b1a3} \quad (71)$$

$$\hat{h}_{a3b2} = \frac{c_{a1b1}}{c_{a1a3}} \cdot c_{b1b2} \cdot \hat{h}_{b2a3}$$

$$\hat{h}_{a3b3} = \frac{c_{a1b1}}{c_{a1a3}} \cdot c_{b1b3} \cdot \hat{h}_{b3a3}$$

$$\hat{h}_{a4b1} = \frac{c_{a1b1}}{c_{a1a3}} \cdot c_{b1b4} \cdot \hat{h}_{b4a3},$$

And finally $$\hat{h}_{a4b1} = \frac{c_{a1b1}}{c_{a1a4}} \cdot \hat{h}_{b1a1} \quad (72)$$

$$\hat{h}_{a4b2} = \frac{c_{a1b1}}{c_{a1a4}} \cdot c_{b1b2} \cdot \hat{h}_{b2a4}$$

$$\hat{h}_{a4b3} = \frac{c_{a1b1}}{c_{a1a4}} \cdot c_{b1b3} \cdot \hat{h}_{b3a4}$$

$$\hat{h}_{a4b4} = \frac{c_{a1b1}}{c_{a1a4}} \cdot c_{b1b4} \cdot \hat{h}_{b4a4}$$

Using the results from Equations (69) to (72), and denoting $c_{a1b1}$ as $\zeta$, a complex constant, the downlink MIMO channel can be expressed in terms of the uplink MIMO channel using the following equation:

$$\begin{bmatrix} \hat{h}_{a1b1} & \hat{h}_{a2b1} & \hat{h}_{a3b1} & \hat{h}_{a4b1} \\ \hat{h}_{a1b2} & \hat{h}_{a2b2} & \hat{h}_{a3b2} & \hat{h}_{a4b2} \\ \hat{h}_{a1b3} & \hat{h}_{a2b3} & \hat{h}_{a3b3} & \hat{h}_{a4b3} \\ \hat{h}_{a1b4} & \hat{h}_{a2b4} & \hat{h}_{a3b4} & \hat{h}_{a4b4} \end{bmatrix} = \quad (73)$$

$$\zeta \cdot \begin{bmatrix} \hat{h}_{b1a1} & \frac{1}{c_{a1a2}} \hat{h}_{b1a2} & \frac{1}{c_{a1a3}} \hat{h}_{b1a3} & \frac{1}{c_{a1a1}} \hat{h}_{b1a4} \\ c_{b1b2} \hat{h}_{b2a1} & \frac{c_{b1b2}}{c_{a1a2}} \hat{h}_{b2a2} & \frac{c_{b1b2}}{c_{a1a3}} \hat{h}_{b2a3} & \frac{c_{b1b2}}{c_{a1a4}} \hat{h}_{b2a4} \\ c_{b1b3} \hat{h}_{b3a1} & \frac{c_{b1b3}}{c_{a1a3}} \hat{h}_{b3a2} & \frac{c_{b1b3}}{c_{a1a3}} \hat{h}_{b3a3} & \frac{c_{b1b3}}{c_{a1a2}} \hat{h}_{b3a4} \\ c_{b1b4} \hat{h}_{b4a1} & \frac{c_{b1b4}}{c_{a1a3}} \hat{h}_{b4a2} & \frac{c_{b1b4}}{c_{a1a3}} \hat{h}_{b1a3} & \frac{c_{b1b4}}{c_{a1a1}} \hat{h}_{b4a4} \end{bmatrix}$$

The right hand side of Equation (73) can be further decomposed as:

$$= \zeta \cdot \begin{bmatrix} 1 & 0 & 0 & 0 \\ 0 & c_{b1b2} & 0 & 0 \\ 0 & 0 & c_{b1b3} & 0 \\ 0 & 0 & 0 & c_{b1b4} \end{bmatrix} \cdot \begin{bmatrix} \hat{h}_{b1a1} & \hat{h}_{b1a2} & \hat{h}_{b1a3} & \hat{h}_{b1a4} \\ \hat{h}_{b2a1} & \hat{h}_{b2a2} & \hat{h}_{b2a3} & \hat{h}_{b2a4} \\ \hat{h}_{b3a1} & \hat{h}_{b3a2} & \hat{h}_{b3a3} & \hat{h}_{b3a4} \\ \hat{h}_{b4a1} & \hat{h}_{b4a2} & \hat{h}_{b4a3} & \hat{h}_{b4a4} \end{bmatrix} \cdot \quad (74)$$

$$\begin{bmatrix} 1 & 0 & 0 & 0 \\ 0 & \frac{1}{c_{a1a2}} & 0 & 0 \\ 0 & 0 & \frac{1}{c_{a1a3}} & 0 \\ 0 & 0 & 0 & \frac{1}{c_{a1a4}} \end{bmatrix}$$

Equation (74) is of the form $\zeta \cdot K_B \cdot H_U \cdot K_A$. Elements in the calibration coefficient matrix $K_A$ and $K_B$ are obtained by calibrations performed at A (BS) and B (UE) and later by transferring UE coefficients to the BS. Note that calibration coefficient estimation at the BS may involve transmission and reception of calibration signals among BS antennas (a.k.a. local calibration). Similarly, estimation of calibration coefficients at UE can be performed using local transmission and reception of calibration signals among UE antennas.

In some embodiments, the TX and RX timing at a device (BS or UE) may be operated from the same PLL. This eliminates the carrier and/or clock offset impairments that is often associated with the detector at B for RF transmissions from A and vice versa. This is because A and B will be deriving all their internal clock frequencies, in general, from 2 different PLLs, one at A and another one at B. If these impairments are a part of the calibration coefficients, e.g., manifest themselves as a time varying phase rotation, then the coefficients will vary more frequently due to time varying carrier or clock errors in addition to its own time variability. Since $K_A$ and $K_B$ are obtained from measurements exclusively at BS or UE (and not using transmissions from BS to UE or vice versa), they vary relatively slowly.

Local calibrations, thus, are generally stable and do not change much over a period of several minutes (e.g., 30 minutes).

Equation (74) further reveals that the reverse MIMO channel can be mathematically modelled as the composition of a) a complex scalar, b) calibration coefficients at B, c) MIMO uplink channel transfer function, and d) calibration coefficients at A.

A pre-coder can be built at A (or at B), by acquiring calibration coefficients of the receiver side. The pre-coder implementation could be based on any of several pre-coders available in the literature. Some examples include: an MMSE pre-coder, a regularized MMSE precoder, a zero forcing precoder, a Tomlinson-Harashima pre-coder, and so on. As will be appreciated by one of skill in the art, either linear pre-coders (first three examples above) or non-linear pre-coders (the last example above) may be used.

Figure 61:
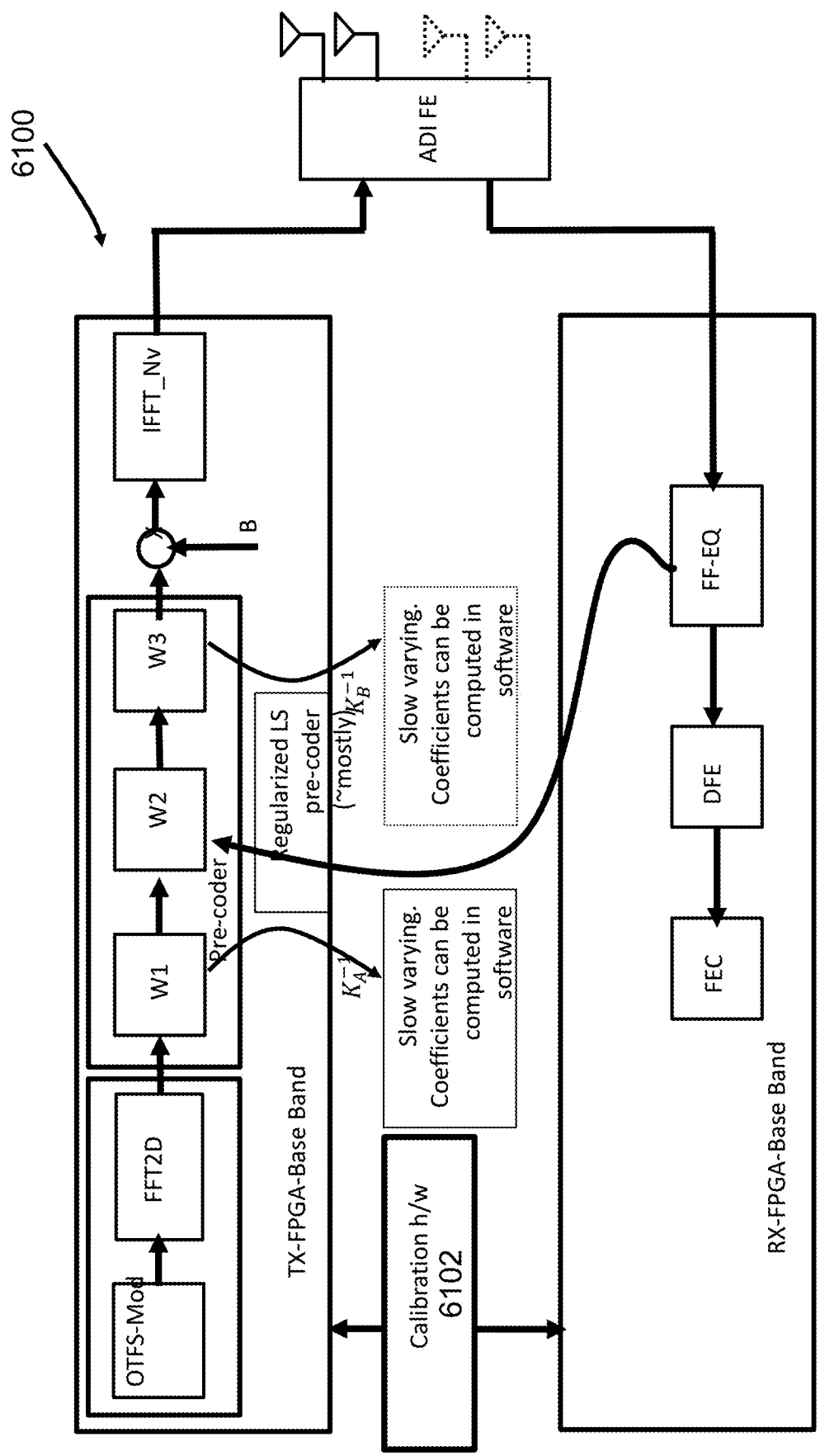
FIG. 61 shows a block diagram for an example implementation of reciprocity calculation.

To illustrate this point, an example embodiment of a reciprocity based zero-forcing (ZF) pre-coder using the data above (ref. Equation 74) is described below. An example configuration of this precoder is depicted in FIG. 61. Note that, the same set of data can be used to design any type of pre-coder.

A ZF pre-coder may have the following form.

$$W = \frac{K_A^{-1} \cdot H_U^{-1} \cdot K_B^{-1}}{E\{\|K_A \cdot H_U \cdot B\|_F\}} \quad (75)$$

Here, $\|.\|_F$ is the Frobenious norm of a given matrix. Note that $\zeta$, the calibration coefficient between A and B does not appear in the pre-coder. The effect of $\zeta$ will be counteracted by the equalizer (single tap or MIMO) at the UEs.

Some embodiments use the fact that $K_B$ and $K_A$ are typically slow-varying, so that their inverse can be implemented in software (instead of implementing in hardware). In some embodiments, W2 ($H_U^{-1}$ or inverse of $H_U$) may be fast varying and implemented in hardware circuits.

In some embodiments, W2 may be obtained as a by-product of the receiver Equalizer at the BS. For example BS equalizer often implements a variant of the $H_U^{-1}$.

Therefore, using the techniques disclosed herein, some embodiments may model the downlink channel as a composition of the uplink channel and slow varying local coefficients. This enables to build a variety of different pre-coders with minimal-feedback overhead, and certain linear precoders, use receiver equalizer computations performed at the base station.

Estimation of $\zeta$ or $c_{a1b1}$ involves calibrating across BS and UE. For the reasons discussed above, these coefficients can be frequently varying and the estimation and feedback of these coefficients could consume a lot of bandwidth. Advantageously, a transmit-side pre-coder to cancel the multi-user interference can be designed without the knowledge of $\zeta$. It can be designed from the upstream channel measurements $K_A$ and $K_B$, as described in the present document.

Several estimation methods to determine the calibration coefficients are described in the present document. When the number of antenna is relatively small, the method described in Section B may be used. When a large number of antennas are involved, the method described in Section C may be used.

B. Estimation of Calibration Coefficients ($C_{x1,x2}$)—Method 1—Iterative Algorithm When the number of antenna is relatively small, such as 4 as in this example, an iterative algorithm can be used to compute the calibration coefficients. This, however, will entail a large amount of calibrations in a massive MIMO scenario and may become impractical. In a massive MIMO scenario, estimation described in sec. III may be used.

Iteration 1:

$$c_{a1a3} = c_{a1a2} \cdot c_{a2a3} \quad (76)$$

$$c_{a1a4} = c_{a1a2} \cdot c_{a2a4} \quad (77)$$

Make an initial estimate of $c_{a1a2}$, $c_{a1a3}$, $c_{a1a4}$ as described herein. Also estimate $c_{a2a3}$ and $c_{a2a4}$. Using the latter, make an alternative estimate of $c_{a1a3}$ and $c_{a1a4}$ (Equations 76 and 77). From these two independent estimates of $c_{a1a3}$ and $c_{a1a4}$, make a refined estimate of $c_{a1a3}$ and $c_{a1a4}$ (e.g., the arithmetic mean). A refined estimate of $c_{a1a2}$ can be obtained from Equations 76 or 77

$$c_{a1a4} = c_{a1a3} \cdot c_{a3a4} \quad (78)$$

A refined estimate of $c_{a1a4}$ can be obtained (as described above), from a measurement of $c_{a3a4}$ using Equation (78). Using the updated $c_{a1a4}$, estimates of $c_{a1a2}$ and $c_{a1a3}$ can be updated.

More iterations, in the above manner, can be performed to further refine the above coefficients.

The number of calibrations to be performed in this method is $4_{C2}=6$. Number of calibrations will grow exponentially in N, the number of antenna; hence not practical for large array of antenna.

C. Estimation of Calibration Coefficients ($C_{x1,x2}$)—Method 2—Large Number of Antenna:

When the number of antenna is high, e.g., 64, Method 1 is not practically feasible. This section describes a simple method for the same.

The following equations have been previously seen derived.

$$\hat{h}_{a1a2} = c_{a1a2} \hat{h}_{a2a1} \quad (79)$$

$$y_{a2} = \hat{h}_{a1a2} s_{a1} + n_{a2} \quad (80)$$

$$y_{a1} = \hat{h}_{a2a1} s_{a2} + n_{a1} \quad (81)$$

where sa1, sa2 are known training symbols, $y_{a1}$ and $y_{a2}$ are the received signal and n is additive noise. It is assumed that the noise is white in the frequency band of interest. The LS estimates of $$\hat{h}_{a1a2} = \frac{y_{a2} \cdot s_{a1}^*}{|s_{a1}|^2} \text{ and } \hat{h}_{a2a1} = \frac{y_{a1} \cdot s_{a2}^*}{|s_{a2}|^2}.$$

Note that the estimation error is $$CN\left(0, \frac{\sigma_n^2}{|s_b|^2}\right).$$

Now $$c_{a1a2} = \frac{\hat{h}_{a1a2}}{\hat{h}_{a2a1}}.$$

Similar expressions hold good for other calibration coefficients.

For a 64 antenna system, this method would use a total of 64 calibration signal transmissions.

D. Estimation of Calibration Coefficients ($C_{x1x2}$)—Method 3—Using Total Least Squares (LS):

What is described below is an algorithm to estimate the calibration coefficients using the method of total least squares.

Refer to Method 2. Take k (say 4) such LS estimates and form the following matrix $$H_{a1a2} = [\hat{h}_{a1a2,1}, \hat{h}_{a1a2,2} \ldots \hat{h}_{a1a2,4}] \quad (82)$$

$$H_{a2a1} = [\hat{h}_{a2a1,1}, \hat{h}_{a2a1,2} \ldots \hat{h}_{a2a1,4}] \quad (83)$$

Let $D = [H_{a2a1}, H_{a1a2}]$. Note that D is a 4×2 matrix in this example.

$$\hat{c}_{a1a2} = \underset{\Delta H_{a1a2}, \Delta H_{a2a1}}{\mathrm{argmin}} \; |\Delta H_{a2a1}|_F^2 + |\Delta H_{a1a2}|_F^2$$

subject to $$H_{a1a2} + \Delta H_{a1a2} = (H_{a2a1} + \Delta H_{a2a1}) \cdot c_{a1a2}$$

Solution for the above is obtained as below,

Let $D = U\Sigma V^H$ where $\Sigma = \mathrm{diag}(\sigma_1, \sigma_2)$, $\sigma_1 > \sigma_2$, where $\sigma$s are singular values of D; U and V are the left and right eigen-vectors respectively. Let $$V = \begin{bmatrix} v_{11} & v_{12} \\ v_{21} & v_{22} \end{bmatrix}. \quad (84)$$

To have a solution for this Total Least Squares problem, $v_{22} \neq 0$. Only if $\sigma_1 \neq \sigma_2$, the solution will be unique.

The solution is given by, $$\hat{c}_{a1a2-opt} = \frac{-v_{12}}{v_{22}}.$$

In some embodiments, total least squares error optimization criteria may be used. Total least squares assumes that both $h_{(\ldots)}$ and $c_{(\ldots)}$ are subject to estimation errors. This is more realistic compared to assuming that $h_{(\ldots)}$ is impervious to estimation errors.

Note that three different methods for estimating the calibration coefficients are described above. During the implementation/prototyping phase, effectiveness of each method can be evaluated separately and the one with the best merit need to be selected for the final implementation. Alternatively, the decision may be made based on the number of antennas for which the calibration is performed. For example, method 1 may be suitable for up to 8 receive and/or transmit antennas, while methods 2 or 3 may be used for higher number of antennas.

E. Effects of Delays in the TX/RX Path

Let delays associated with $t_{a1}$, $t_{a2}$, $r_{a1}$ and $r_{a2}$ be $\tau_{ta1}$, $\tau_{ta2}$, $\tau_{ra1}$, $\tau_{ra2}$. Therefore, $$c_{a1a2} = \frac{|t_{a1} \cdot r_{a2}|}{|r_{a1} \cdot t_{a2}|} \cdot \frac{e^{-j2\pi f \tau_{ra2}} \cdot e^{-j2\pi f \tau_{ta1}}}{e^{-j2\pi f \tau_{ra1}} \cdot e^{-j2\pi f \tau_{ta2}}} \quad (85)$$

$$= |c_{a1a2}| \cdot e^{-j2\pi f \delta\tau}$$

where $\delta\tau = (\tau_{ta1} + \tau_{ra2}) - (\tau_{ta2} + \tau_{ra1})$ the delay difference between the $a_1$ and $a_2$. It is clear that, the effect of $\delta\tau$ is to cause a linear phase on the calibration coefficients across the frequency.

Calibration coefficient as can be seen is a function of $\delta\tau$. The delays in the digital sections of TX and RX will not affect the calibration coefficients, as these will cancel out in the expression above (Note that digital delays are identical for all transmitters. This is true for receivers as well). It is clear that, a delay effect, as described above, will be manifested if the synchronizing clocks at BS or UE are routed using long traces.

It has been assumed that $t_{a1}$ etc. is memory-less. The case were $t_{a1}$ for example is say a 2 tap filter is not considered in this formulation.

F. Calibration Coefficients when there is Mutual Coupling Between TX/TX, TX/RX Paths Non-negligible coupling between different TX/RX path can exist due to a) Imperfect hardware design or more importantly b) if cross-polarized antenna is used in the design. Modifications to the calibration algorithm under these conditions is described below. It is assumed that there is no coupling between the TX and RX paths.

Referring to FIG. 59 and FIG. 60, assume that the receive paths have mutual coupling between them. For e.g., $r_{a1a2}$ is the mutual coupling between receive paths $r_1$ and $r_2$. Similarly $r_{a1a3}$ refers to the coupling between the receive paths $r_1$ and $r_3$. Similar explanation applies to mutual coupling between the transmit paths. Note that $r_{a1a1}$ refers to $r_{a1}$ of Section A.

Assume that antenna a1 transmits a calibration sequence, sa1. It has been received by receive antenna $a_2$, $a_3$ and $a_4$. Similar to the formulation in Sections A and B, the following expressions can be derived.

$$\begin{bmatrix} y'_{a2} \\ y'_{a3} \\ y'_{a4} \end{bmatrix} = \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix} \begin{bmatrix} h_{a1a2} \\ h_{a1a3} \\ h_{a1a4} \end{bmatrix} t_{a1} \cdot s_{a1} + \begin{bmatrix} n_{a2} \\ n_{a3} \\ n_{a4} \end{bmatrix} \quad (86)$$

$$\begin{bmatrix} y''_{a1} \\ y''_{a3} \\ y''_{a4} \end{bmatrix} = \begin{bmatrix} r_{a1a1} & r_{a1a3} & r_{a1a4} \\ r_{a3a1} & r_{a3a3} & r_{a3a4} \\ r_{a4a1} & r_{a4a3} & r_{a4a4} \end{bmatrix} \begin{bmatrix} h_{a2a1} \\ h_{a2a3} \\ h_{a2a4} \end{bmatrix} t_{a2} \cdot s_{a2} + \begin{bmatrix} n_{a1} \\ n_{a3} \\ n_{a4} \end{bmatrix} \quad (87)$$

$$\begin{bmatrix} y'''_{a1} \\ y'''_{a2} \\ y'''_{a4} \end{bmatrix} = \begin{bmatrix} r_{a1a1} & r_{a1a2} & r_{a1a4} \\ r_{a2a1} & r_{a2a2} & r_{a2a4} \\ r_{a4a1} & r_{a4a2} & r_{a4a4} \end{bmatrix} \begin{bmatrix} h_{a3a1} \\ h_{a3a2} \\ h_{a3a4} \end{bmatrix} t_{a3} \cdot s_{a3} + \begin{bmatrix} n_{a1} \\ n_{a2} \\ n_{a4} \end{bmatrix} \quad (88)$$

$$\begin{bmatrix} y''''_{a1} \\ y''''_{a2} \\ y''''_{a3} \end{bmatrix} = \begin{bmatrix} r_{a1a1} & r_{a1a2} & r_{a1a3} \\ r_{a2a1} & r_{a2a2} & r_{a2a3} \\ r_{a3a1} & r_{a3a2} & r_{a3a3} \end{bmatrix} \begin{bmatrix} h_{a4a1} \\ h_{a4a2} \\ h_{a4a3} \end{bmatrix} t_{a4} \cdot s_{a4} + \begin{bmatrix} n_{a1} \\ n_{a2} \\ n_{a3} \end{bmatrix} \quad (89)$$

Proceeding as in Section C, LS estimates of $\hat{h}_{a1a2}$, $\hat{h}_{a1a3}$ and $\hat{h}_{a1a4}$ can be obtained from Equation (86). The term $\hat{h}_{a1a2}$ is the non-reciprocal (baseband) channel from antenna a1 to antenna a2, whereas $h_{a1a2}$ is the reciprocal radio channel from antenna a1 to antenna a2g. Similarly, LS estimates $\hat{h}_{a2a1}/\wedge$, $\hat{h}_{a3a1}/\wedge$ and $\hat{h}_{a4a1}/\wedge$ can be obtained from Equations 87, 88 and 89.

$$\begin{bmatrix} \hat{h}_{a1a2} \\ \hat{h}_{a1a3} \\ \hat{h}_{a1a4} \end{bmatrix} = t_{a1} \cdot \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix} \begin{bmatrix} h_{a1a2} \\ h_{a1a3} \\ h_{a1a4} \end{bmatrix} \quad (90)$$

$$\begin{bmatrix} \hat{h}_{a2a1} \\ \hat{h}_{a3a1} \\ \hat{h}_{a4a1} \end{bmatrix} = \begin{bmatrix} r_{a1a1} \cdot t_{a2} & r_{a1a3} \cdot t_{a2} & r_{a1a4} \cdot t_{a2} \\ r_{a1a1} \cdot t_{a3} & r_{a1a2} \cdot t_{a3} & r_{a1a4} \cdot t_{a3} \\ r_{a1a1} \cdot t_{a4} & r_{a1a2} \cdot t_{a4} & r_{a1a3} \cdot t_{a4} \end{bmatrix} \begin{bmatrix} h_{a2a1} \\ h_{a3a1} \\ h_{a4a1} \end{bmatrix} \quad (91)$$

From Equations 90 and 91, we can write the following $$\begin{bmatrix} \hat{h}_{a2a1} \\ \hat{h}_{a3a1} \\ \hat{h}_{a4a1} \end{bmatrix} = \underbrace{\frac{1}{t_{a1}} \cdot \begin{bmatrix} r_{a1a1} \cdot t_{a2} & r_{a1a3} \cdot t_{a2} & r_{a1a4} \cdot t_{a2} \\ r_{a1a1} \cdot t_{a3} & r_{a1a2} \cdot t_{a3} & r_{a1a4} \cdot t_{a3} \\ r_{a1a1} \cdot t_{a4} & r_{a1a2} \cdot t_{a4} & r_{a1a3} \cdot t_{a4} \end{bmatrix} \begin{bmatrix} r_{a2a2} & r_{a2a3} & r_{a2a4} \\ r_{a3a2} & r_{a3a3} & r_{a3a4} \\ r_{a4a2} & r_{a4a3} & r_{a4a4} \end{bmatrix}^{-1}}_{C} \begin{bmatrix} \hat{h}_{a1a2} \\ \hat{h}_{a1a3} \\ \hat{h}_{a1a4} \end{bmatrix} \quad (92)$$

where C is the calibration coefficient to be estimated. It is interesting to note that when the mutual coupling coefficients are set to 0, the above equation gives rise to Equation 66. Similarly $\hat{h}_{a2a3}$ $\hat{h}_{a2a4}$ and $\hat{h}_{a3a4}$ can be expressed in terms of the product of a calibration matrix and $\hat{h}_{a3a2}$, $\hat{h}_{a4a2}$ and $\hat{h}_{a4a3}$.

These calibration coefficients can be computed using Total Least Squares method (method 3).

Note that there is no mutual coupling between sides A and B. This enables embodiments to write downstream link exactly as in Equation 73. However, in this case, $K_A$ and $K_B$ will no longer be diagonal matrices.

G. Examples of Architectures for Reciprocity Calibration

FIG. 61 is a block diagram depiction of an example embodiment of an apparatus 6100. The apparatus 6100 may also be used to validate the effectiveness of reciprocity calibration making sure to leverage on the existing transmission systems. The embodiment apparatus 6100 is an example of a regularized Least Square based pre-coder design. As a first level approximation, MMSE coefficients being computed at the receiver can be thought to be the RLS estimates. Typically, $K_B^{-1}$ and $K_A^{-1}$ (refer to Equations 73, 74 and 75) are slow varying. They can be computed in software. However, the actual multiplication operation may be implemented in FPGA.

From the top left of FIG. 61, a transmitter chain of the apparatus 6100 may include an OTFS modulation function, followed by a 2D FFT transform stage. The output maybe processed through a pre-coder and corrected for reciprocity contribution from the receiving device. The corrected signal may be processed through an inverse FFT stage and transferred to a front end for transmission. The pre-coder may comprise weights (matrices) as described herein. While not shown explicitly, the transmitter chain may perform error correction coding on data prior to transmission. In some embodiments, the entire transmitter chain may be implemented in a baseband FPGA or ASIC.

The apparatus 6100 may include, in the receiver chain shown in the bottom half, from right to left, an equalizer stage that receives signals from the front end, a decision feedback equalizer and a forward error correction stage. The front end equalizer (FF-EQ) may provide an input for wait computation to the pre-coder used for transmission. As described, the weights, or filter coefficients, will change relatively slowly (several tens of millisecond, or greater than transmit time interval TTI) and therefore may be computed in software.

The apparatus 6100 may also include a calibration module 6102 which may be implemented in hardware. The calibration module may perform the various calibration functions described in the present document.

Example of a Reciprocity Calibration System Prototype Design

As described above, some example embodiments for reciprocity calibration have been disclosed. Experiments have shown that the set of calibration coefficients will change for different a) transmit powers, b) receive powers and c) frequency. The last item warrants some explanation. If the bandwidth (BW) of interest for e.g., is 10 MHz, embodiments may use a wide-band calibration signal of 10 MHz BW and obtain calibration coefficients for the full 10 MHz. Another possibility is to send sinusoids (frequency tones) at every sub-carrier individually and compute the calibration coefficient for each tone separately.

In some embodiments, the below procedure (assuming frequency-tones are used in calibration) may be implemented:

```
For ∀ TX power levels (in m discrete steps)
    For ∀ RX power levels (in n discrete steps)
        For ∀ frequency tones corresponding to each sub-carrier
            For ∀ Antenna Combinations
                perform calibration and store calibration coefficients.
            end
        end
    end
end
```

The iterative process may be managed by the calibration module 402, previously described. In some embodiments, a set of calibration coefficients may be associated with a number of combinations of the triplet of {Transmit Power, Receive Power and Frequency of operation} and stored in a look-up table (LUT). The wireless device may then select the appropriate set of calibration coefficient for use based on the observed transmit power, received power and/or frequency band of operation. While this may result in a large number of entries in the LUT, certain optimizations can be done to reduce this overhead.

In some embodiments, a set of calibration coefficient may be calculated as an initial set at the beginning of communication between a transmitter and a receiver, e.g., a base station and a UE. The set may be stored as a working set in a look-up table and used until the set is updated. The updating of the set may be based on one or more of many operational criteria. For example, some embodiments may update the working set at a given interval, e.g., once every 30 minutes. Some embodiments may track received SNR to decide whether calibration coefficient updating is warranted. When the set of calibration coefficients is updated, the updating wireless device may then communicate the changes to the other side at the next available opportunity.

8. Second-Order Statistics for FDD Reciprocity

This section covers using second order statistics of a wireless channel to achieve reciprocity in frequency division duplexing (FDD) systems. FDD systems may have the following challenges in implementing such a precoded system:

The downlink channel response is different from the uplink channel response, due to the different carrier frequencies. On top of that, there is a different response of the transmit and receive RF components in the base-station and user equipment.

For non-static channels, the base-station needs to predict the channel for the time of the transmission.

In some embodiments, the base-station may send, before every precoded downlink transmission, reference signals (pilots) to the user equipment. The users will receive them and send them back to the base-station as uplink data. Then, the base-station will estimate the downlink channel and use it for precoding. However, this solution is very inefficient because it takes a large portion of the uplink capacity for sending back the received reference signals. When the number of users and/or base-station antennas grow, the system might not even be implementable. Also, the round-trip latency, in non-static channels, may degrade the quality of the channel prediction.

Second-Order Statistics Training

Figure 62:
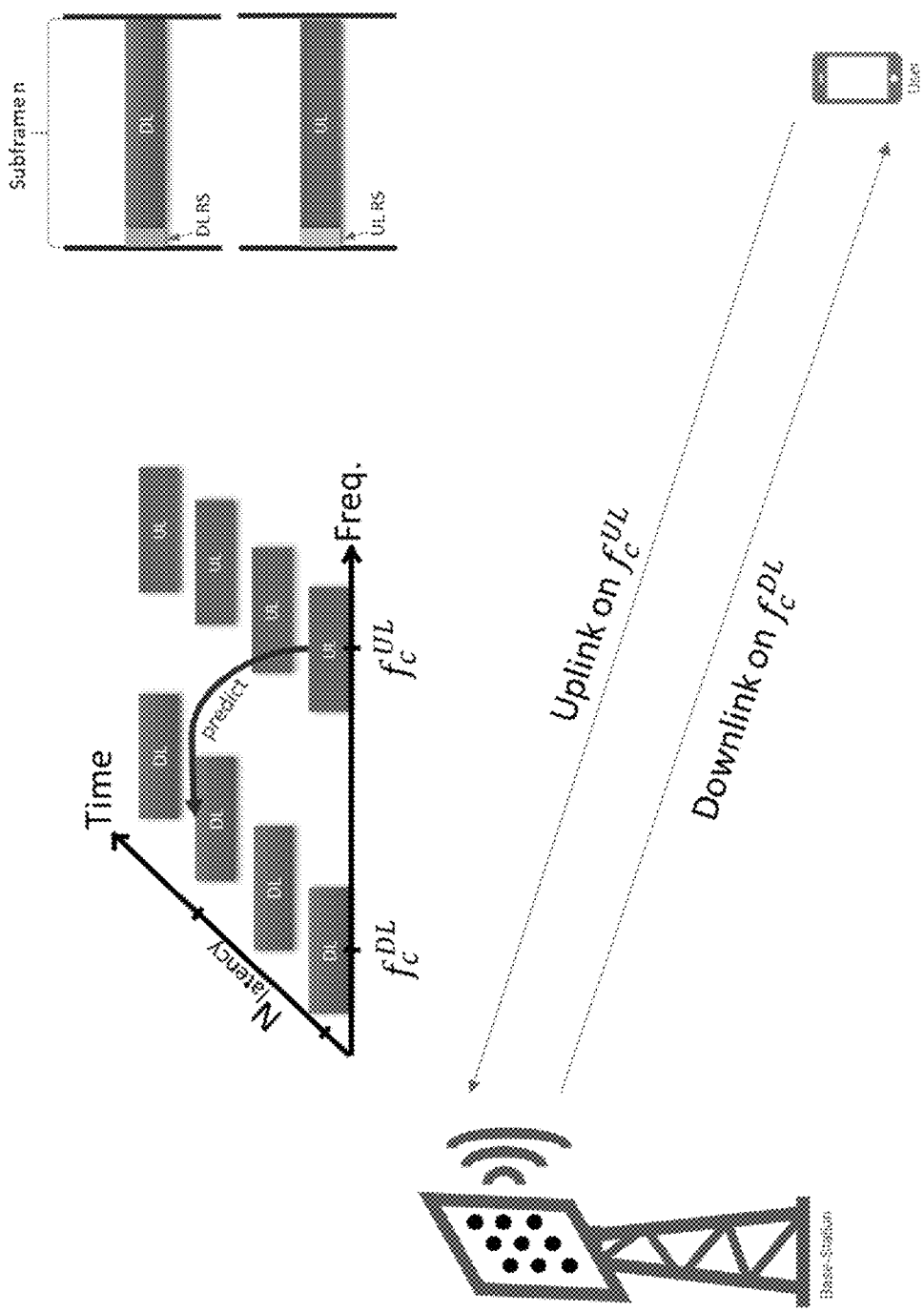
FIG. 62 is a block diagram of an example of the prediction setup in an FDD system.

For simplicity, the case with a single user antenna and the L base-station antennas is considered, but can be easily extended to any number of users. The setup of the system is shown in FIG. 62. The base-station predicts from the uplink channel response, the downlink channel response in a different frequency band and $N_{latency}$ subframes later.

To achieve this, the system preforms a preliminary training phase, consisting of multiple sessions, where in each session i=1, 2, . . . , $N_{training}$, the following steps are taken:

At subframe n, the user equipment transmits reference signals (RS) in the uplink. The base-station receives them and estimate the uplink channel $H_{UL}^{(i)}$ over the L base-station antennas.

At subframe n+$N_{latency}$, the base-station transmits reference signals in the downlink from all its antennas. The user equipment receives it and sends it back as uplink data in a later subframe. The base-station computes the downlink channel estimation for it, $H_{DL}^{(i)}$. In a different implementation, it is possible that the UE will compute the channel estimation and send it to the base-station as uplink data.

The base-station computes the second-order statistics $$R_{UL}^{(i)} = H_{UL}^{(i)} \cdot (H_{UL}^{(i)})^H$$

$$R_{DL,UL}^{(i)} = H_{DL}^{(i)} \cdot (H_{UL}^{(i)})^H$$

$$R_{DL}^{(i)} = H_{DL}^{(i)} \cdot (H_{DL}^{(i)})^H$$

Herein, $(\bullet)^H$ is the Hermitian operator. For the case that the channel has non-zero-mean, both the mean and the covariance matrix should be determined. When the training sessions are completed, the base-station averages out the second order statistics:

$$R_{UL} = \frac{1}{N_{training}} \sum_{i=1}^{N_{training}} R_{UL}^{(i)}$$

$$R_{DL,UL} = \frac{1}{N_{training}} \sum_{i=1}^{N_{training}} R_{DL,UL}^{(i)}$$

$$R_{DL} = \frac{1}{N_{training}} \sum_{i=1}^{N_{training}} R_{DL}^{(i)}$$

Then, it computes the prediction filter and the covariance of the estimation error:

$$C_{prediction} = R_{DL,UL} \cdot (R_{UL})^{-1}$$

$$R_E = R_{DL} - C_{prediction} \cdot (R_{DL,UL})^H$$

The inversion of $R_{UL}$ may be approximated using principal component analysis techniques. We compute $\{\lambda\}$, the K most dominant eigenvalues of $R_{UL}$, arranged in a diagonal matrix D=diag ($\lambda_1, \lambda_2, \ldots, \lambda_K$) and their corresponding eigenvectors matrix V. Typically, K will be in the order of the number of reflectors along the wireless path. The covariance matrix can then be approximated by $R_{UL} \approx V \cdot D \cdot (V)^H$ and the inverse as $R_{UL}^{-1} \approx V \cdot D^{-1} \cdot (V)^H$.

Note, that there is a limited number of training sessions and that they may be done at a very low rate (such as one every second) and therefore will not overload the system too much.

To accommodate for possible future changes in the channel response, the second-order statistics may be updated later, after the training phase is completed. It may be recomputed from scratch by initializing again new $N_{training}$ sessions, or by gradually updating the existing statistics.

The interval at which the training step is to be repeated depends on the stationarity time of the channel, e.g., the time during which the second-order statistics stay approximately constant. This time can be chosen either to be a system-determined constant, or can be adapted to the environment. Either the base-station or the users can detect changes in the second-order statistics of the channel and initiate a new training phase. In another embodiment, the base-station may use the frequency of retransmission requests from the users to detect changes in the channel, and restart the process of computing the second-order statistics of the channel.

Scheduling a Downlink Precoded Transmission

For each subframe with a precoded downlink transmission, the base-station should schedule all the users of that transmission to send uplink reference signals $N_{latency}$ subframes before. The base-station will estimate the uplink channel responses and use it to predict the desired downlink channel responses $$H_{DL} = C_{prediction} \cdot H_{UL}$$

Then, the downlink channel response $H_{DL}$ and the prediction error covariance $R_E$ will be used for the computation of the precoder.

9. Second-Order Statistics for Channel Estimation

This section covers using second order statistics of a wireless channel to achieve efficient channel estimation. Channel knowledge is a critical component in wireless communication, whether it is for a receiver to equalize and decode the received signal, or for a multi-antenna transmitter to generate a more efficient precoded transmission.

Channel knowledge is typically acquired by transmitting known reference signals (pilots) and interpolating them at the receiver over the entire bandwidth and time of interest. Typically, the density of the pilots depends on characteristics of the channel. Higher delay spreads require more dense pilots along frequency and higher Doppler spreads require more dense pilots along time. However, the pilots are typically required to cover the entire bandwidth of interest and, in some cases, also the entire time interval of interest.

Embodiments of the disclosed technology include a method based on the computation of the second-order statistics of the channel, where after a training phase, the channel can be estimated over a large bandwidth from reference signals in a much smaller bandwidth. Even more, the channel can also be predicted over a future time interval.

Second-Order Statistics Training for Channel Estimation

Figure 63:
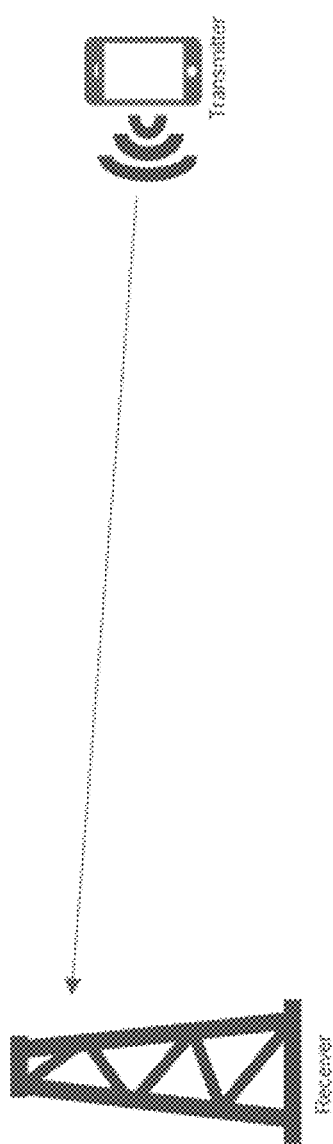
FIG. 63 is an example of a transmitter and receiver.

FIG. 63 shows a typical setup of a transmitter and a receiver. Each one may have multiple antennas, but for simplicity we will only describe the method for a single antenna to a single antenna link. This could be easily extended to any number of antennas in both receiver and transmitter.

Figure 64A:
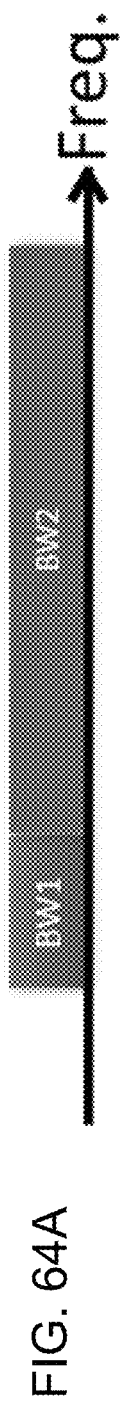
FIGS. 64A, 64B and 64C show examples of different bandwidth partitions.
Figure 64B:
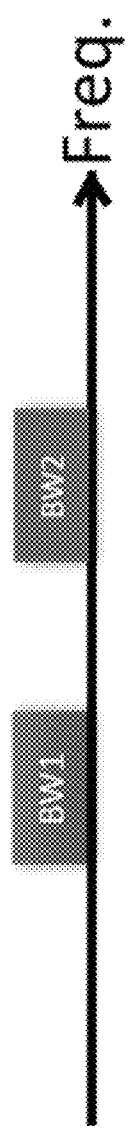
Figure 64C:
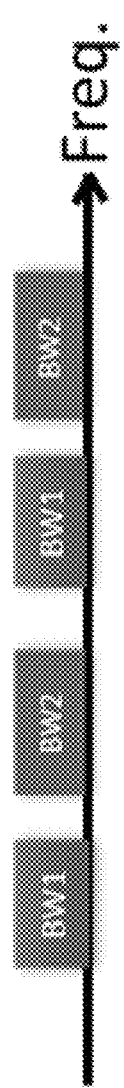
Figure 65:
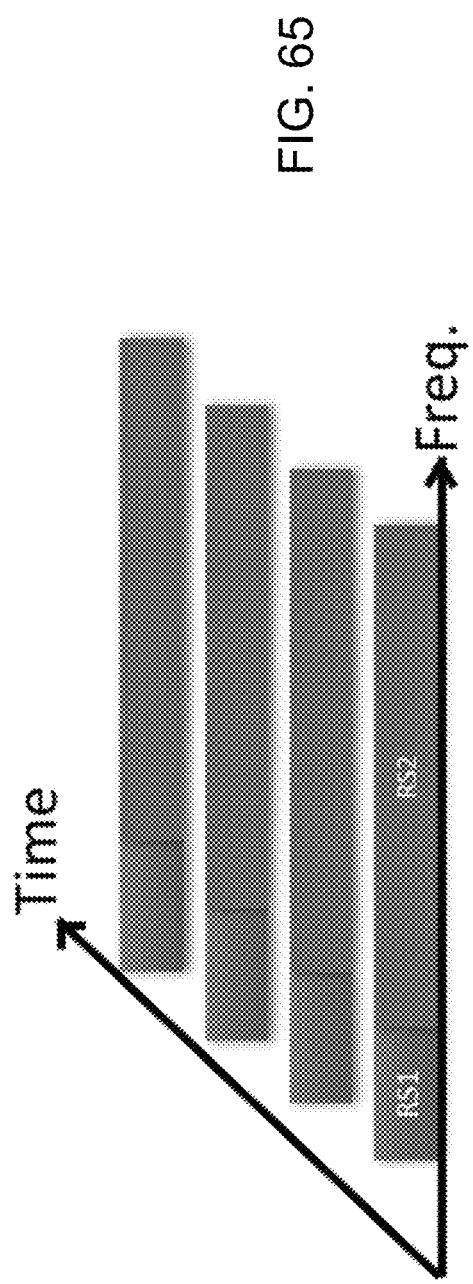
FIG. 65 shows an example of a bandwidth partition with the same time interval.
Figure 66:
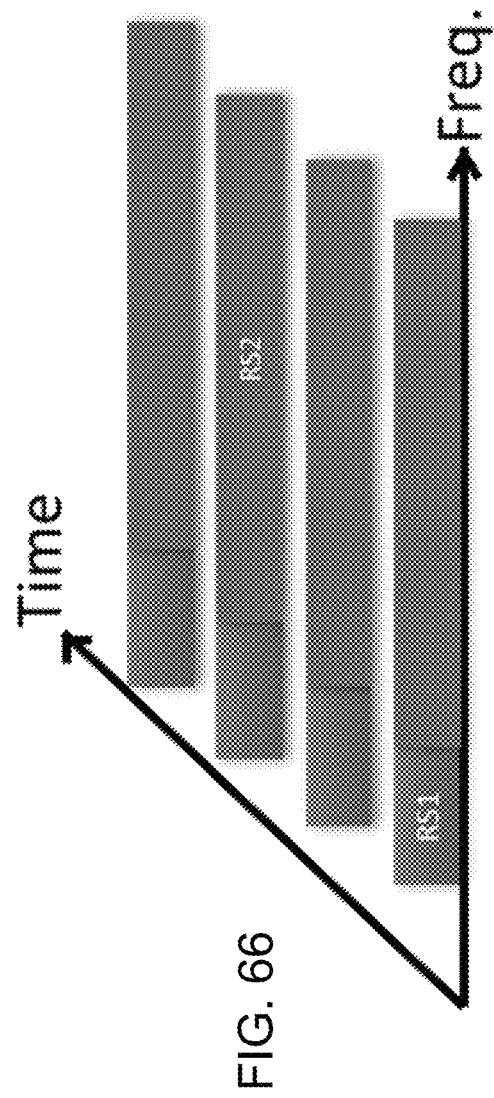
FIG. 66 shows an example of a bandwidth partition with a different time interval.

The system preforms a preliminary training phase, consisting of multiple sessions, where in each session i=1, 2, . . . , $N_{training}$, the following steps are taken:

The transmitter sends reference signals to the receiver. We partition the entire bandwidth of interest into two parts $BW_1$ and $BW_2$, as shown in FIGS. 64A-64C, where typically the size of $BW_1$ will be smaller or equal to $BW_2$. Note, that these two parts do not have to from a continuous bandwidth. The transmitter may send reference signals at both parts at the same time interval (e.g., FIG. 65) or at different time intervals (e.g., FIG. 66).

The receiver receives the reference signals and estimates the channel over their associated bandwidth, resulting in channel responses $H_1^{(i)}$ and $H_2^{(i)}$.

The receiver computes the second-order statistics of these two parts:

$$R_1^{(i)} = H_1^{(i)} \cdot (H_1^{(i)})^H$$

$$R_{2,1}^{(i)} = H_2^{(i)} \cdot (H_1^{(i)})^H$$

$$R_2^{(i)} = H_2^{(i)} \cdot (H_2^{(i)})^H$$

Herein, $(\bullet)^H$ is the Hermitian operator. For the case that the channel has non-zero-mean, both the mean and the covariance matrix should be determined. When the training sessions are completed, the base-station averages out the second-order statistics in a manner similar to that described in Section 6.

Efficient Channel Estimation

After the training phase is completed, the transmitter may only send reference signals corresponding to $BW_1$. The receiver, estimated the channel response $H_1$ and use it to compute (and predict) and channel response $H_2$ over $BW_2$ using the prediction filter:

$$H_2 = C_{prediction} \cdot H_1.$$

Figure 67:
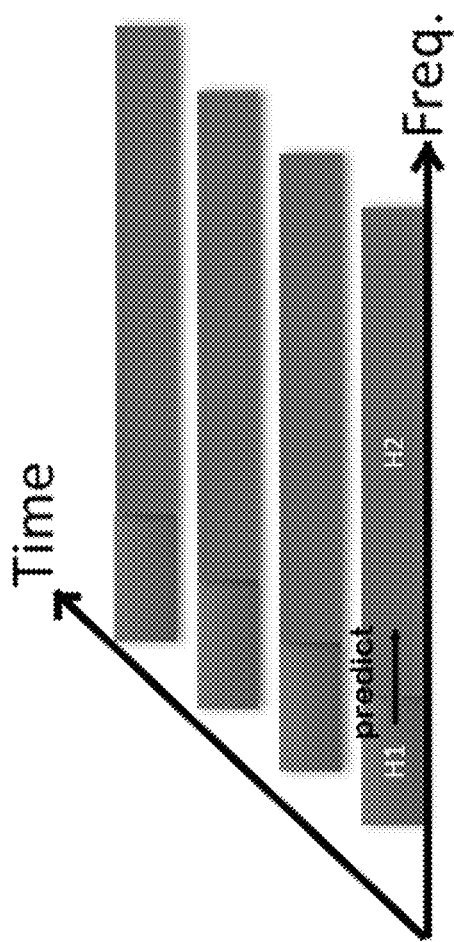
FIG. 67 shows an example of channel prediction over the same time interval.
Figure 68:
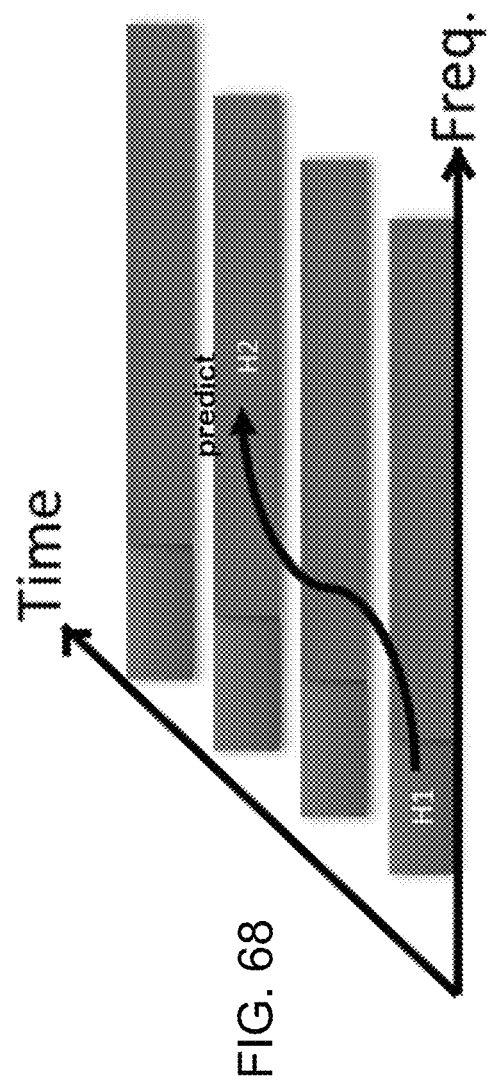
FIG. 68 shows an example of channel prediction over a different time interval.

FIGS. 67 and 68 show examples of prediction scenarios (same time interval and future time interval, respectively).

10. Embodiments for Reciprocal Geometric Precoding

Embodiments of the disclosed technology include a method for applying MU-MIMO (Multi-User Multiple-In-Multiple-Out) in a wireless system. In MU-MIMO, a transmitter with multiple antennas (typically a cellular base-station) is transmitting to multiple independent devices (also referred to as UE—User Equipment), each having one or more receiving antennas, on the same time and frequency resources. To enable a receiving device to correctly decode its own targeted data, a precoder is applied to the transmitted signal, which typically tries to maximize the desired received signal level at the receiving device and minimize the interference from transmissions targeted to other devices. In other words, maximize the SINR (Signal to Interference and Noise Ratio) at each receiving device. The transmitted signal is arranged in layers, where each layer carries data to a specific user device.

Figure 69:
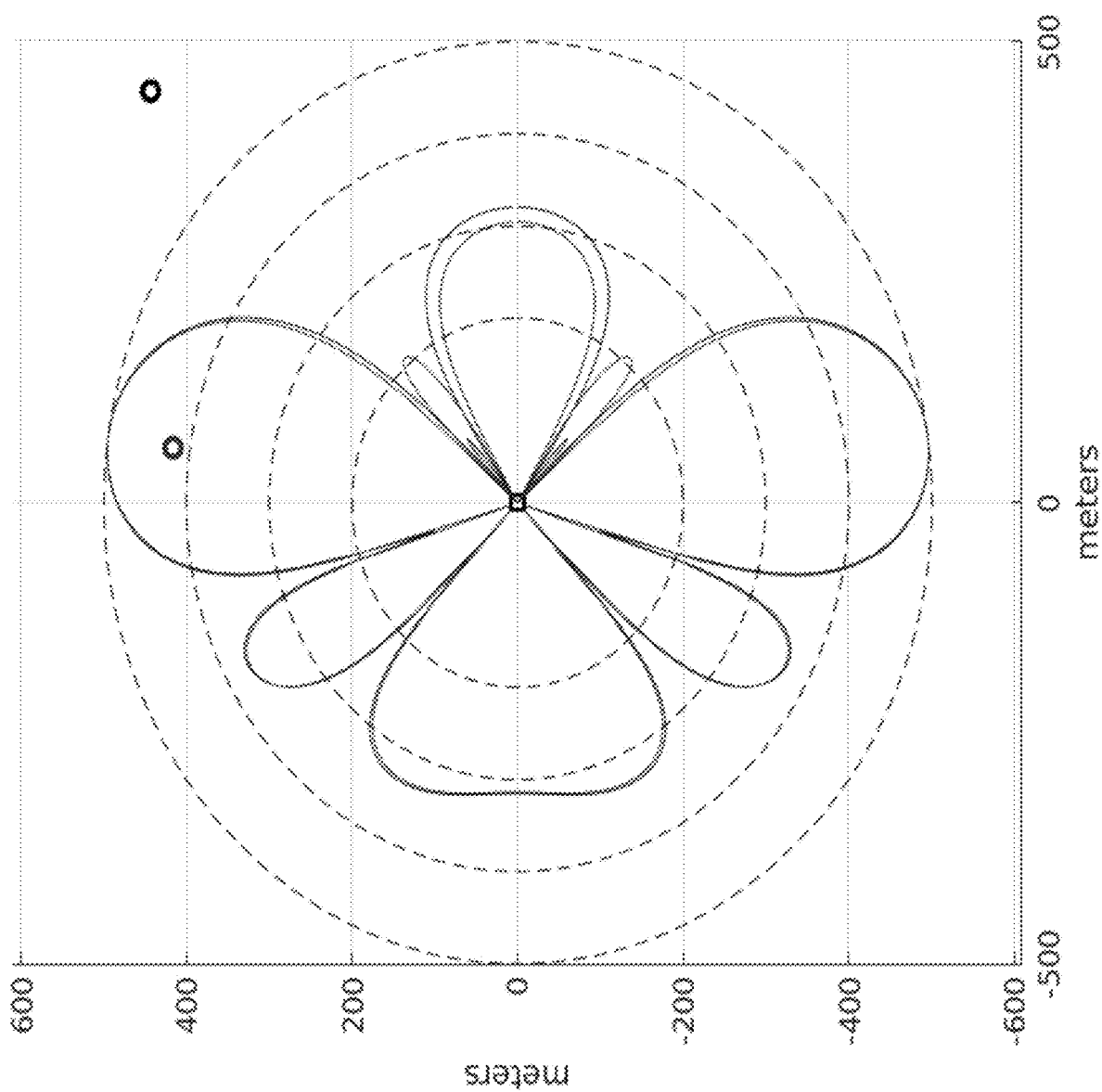
FIG. 69 shows an example transmission pattern using precoding in a communication network.

A spatial precoder is a precoder that operates in the spatial domain by applying in each layer different weights and phases to the transmission of each antenna. This shapes the wave-front of the transmitted signal and drives more of its energy towards the targeted device, while minimizing the amount of energy that is sent towards other devices. FIG. 69 shows an example of a spatial precoder.

To simplify the following description, without any loss of generality, the downlink transmitting device is referred to as the base-station (BS) and the downlink receiving device is referred to as the UE (see, for example, FIG. 1A).

Codebook-Based Precoding

In this technique there is a predefined set of known precoders, available for both BS and UE. Upon receiving a precoded transmission, a UE may blindly assume that each one of the precoders was used and try to decode the received signal accordingly. This method is not very efficient, especially when the codebook is large. Another approach is based on feedback. The UE analyzes a reception of a known reference signal by computationally applying different precoders from the codebook. The UE selects the precoder that maximizes its received SINR and sends a feedback to the BS, which one is the preferable precoder.

In some implementations, this technique has the following limitations:

(1) The codebook has a limited number of entries and therefore, may not have a good enough spatial resolution to optimally address all the cases of the targeted UE. Also, the computational complexity at the UE, grows when this codebook is large.

(2) Each UE selects the best precoder for itself, however, this precoder may not be optimal for other UEs. To address that, the BS needs to carefully selects the set of UE for each precoded transmission, in such a way, that their precoders are as orthogonal as possible. This imposes a heavy constraint on the scheduler at the BS, especially in scenarios with a large number of layers.

Precoding Based on Explicit Feedback

From the dirty paper coding theorem, we can derive that if all the channels from the BS antennas to the receiving UE antennas are known, we can optimally precode the transmission to all UE. The implementation of such a precoding scheme in a real system, is challenging and may require that the UE will send feedback to the BS on the received downlink channel. When the UE or any of the wireless channel reflectors are mobile, the feedback of the channel response may no longer represent the state of the channel, at the time the precoder is applied and prediction may also be required. Note, that this precoder, in some sense, tries to invert the channel.

Reciprocal Geometric Precoding

A wireless channel is a super-position of reflections. A geometric precoder is based on the geometry of these reflectors. This geometry tends to change relatively slow comparing to typical communication time scales. For example, considering the spatial domain, the Angle of Arrival (AoA) of the rays from the wireless reflectors (or directly from the UE) to the BS antennas, will be relatively constant in a time scale of tens of milliseconds and frequency independent. This is unlike the channel state, which is time and frequency dependent. The reciprocal property of the wireless channel allows us to use information about the channel obtained from uplink transmissions (UE to BS) for downlink precoded transmissions (BS to UE).

The geometric precoder, projects the transmission of each layer into a subspace, which is spanned by the reflectors of a specific user and orthogonal as much as possible to the reflectors of other layers. This subspace is time and frequency independent and relies solely on the geometry of the channel. The channel geometry is captured by means of a covariance matrix. The proposed technique may use uplink reference signals to compute the channel response at each one of the BS receiving antennas and the covariance matrix of these measurements.

For example, in an LTE/5G NR system, the BS may use the uplink Sounding Reference Signals (SRS) transmitted by a UE, or the uplink Demodulation Reference Signals (DMRS) to compute the channel response at different time and frequency resource elements and from them compute the spatial covariance matrix.

More formally, let $i=1, \ldots, K$ be a user (or layer) index and L represent the number of BS antennas. Let $H_i(f, t)$ be a complex column vector, representing the channel response at the L BS antennas, at time t=1, ..., $N_t$ and frequency f=1, ..., $N_f$. Note, that $N_t$ may be 1 and $N_f$ may also represent a small part of the used bandwidth. The L×L covariance matrix may be computed directly by $$R_i = \frac{1}{N_f \cdot N_t} \sum_{f,t} H_i(f,t) \cdot H_i^H(f,t)$$

Herein, $(\bullet)^H$ is the Hermitian operator, or indirectly using techniques like maximum likelihood (e.g., a Toeplitz maximum likelihood technique).

Finding the Vector Space

Let K represent the number of users for the precoded transmission and $R_i$ their uplink spatial covariance matrices. Let's also assume some normalized uplink power allocation for each user, denoted by $q_i \geq 0$ and satisfying, $\sum_{i=1}^{K} q_i = 1$.

The optimal uplink vector space, V_i^*, that spans the desired channels from the user to the BS and orthogonal to the channels from the other users, is the one that maximizes the SINR at the BS:

$$V_i^* = \underset{V_i}{\operatorname{argmax}} \left\{ \frac{q_i V_i^H R_i V_i}{\sum_{j \neq i} q_j V_i^H R_j V_i + N_0} \right\}$$

Herein, the enumerator term is the signal and the denominator terms are the interference and the additive noise variance.

Herein, $V_i^*$ can be directly computed as the maximum eigenvector of the following uplink SINR matrix:

$$SINR_i^{(UL)} = (\Sigma_{j \neq i} q_j R_j + N_0 I)^{-1} \cdot q_i R_i$$

Downlink Duality

Due to the reciprocal property of the wireless channel, the same vector space computed for the uplink can be used for downlink precoding as well. Therefore, by using just uplink reference signals, we can obtain the optimal vector space for the downlink. This is in contrasts to the explicit feedback method, which required actual channel state information of the downlink to be transmitted as data in the uplink, or the codebook-based precoding approach, which requires feedback of the selected precoder.

However, the selected uplink power allocation is not dual and therefore not optimal for the downlink. In the uplink, the BS receives, per layer, different channels and projects them all into a single vector space, whereas in the downlink the UE receives on the same channel, transmissions on different vector spaces.

In can be mathematically proven, that there exists a dual power allocation, $p_i \geq 0$ for the downlink, satisfying $\sum_{i=1}^{K} p_i = 1$, that can achieve the same SINR as the uplink:

$$SINR_i^{(UL)} = \frac{q_i V_i^{*H} R_i V_i^*}{\sum_{j \neq i} q_j V_i^{*H} R_j V_i^* + N_0} = \frac{p_i V_i^{*H} R_i V_i^*}{\sum_{j \neq i} p_j V_j^{*H} R_i V_j^* + N_0} = SINR_i^{*(DL)}$$

Downlink Power Allocation

To compute the dual downlink power allocation, we define a user cross-interference matrix, $A_{K \times K}^{(DL)}$, with entries $$A_{i,j}^{(DL)} = \begin{cases} SINR_i^{*(UL)} \cdot \frac{N_0}{V_i^{*H} R_i V_i^*} & i = j \\ SINR_i^{*(UL)} \cdot \frac{(V_j^{*H} R_i V_j^* + N_0)}{V_i^{*H} R_i V_i^*} & i \neq j \end{cases}$$

Herein, i, j=1, ..., K. Note, that a dual cross-interference matrix can be computed for the uplink as well.

It can be mathematically proven that the optimal power allocation for the downlink is derived from the normalized absolute value of the elements of the maximum eigenvector of $A^{(DL)}$, denoted by $V_{A^{(DL)}}$:

$$p_i = \frac{|V_{A^{(DL)}}(i)|}{\sum_k |V_{A^{(DL)}}(i)|}$$

Note, that this power allocation is statistically targeting equal SINR at each receiving UE. However, when scheduling users, a BS may adjust this power allocation to allow different SINRs for different UE, according to their downlink traffic requirements.

Precoder

The precoder for user i is computed as $$P_i = p_i \cdot \operatorname{conj}(V_i^*)$$

Examples of Reference Signals

This precoder, which projects the transmitted signal into different vector spaces, does not "invert" the channel and the UE must equalize the channel. Therefore, the UE must receive precoded reference signals as well along with the precoded data. The reference signals may be one of the conventional reference signals, such as a demodulation reference signal or a sounding reference signal. Alternatively, or in addition, a new reference signal may be used for facilitating the computations described herein.

Scheduling

When the number of available users for precoded downlink transmission is larger than K, the BS may want to specifically select K users that are spatially separated as much as possible. The BS may use the spatial covariance matrices, $R_i$, to determine this set of users.

Example Procedure

Figure 71:
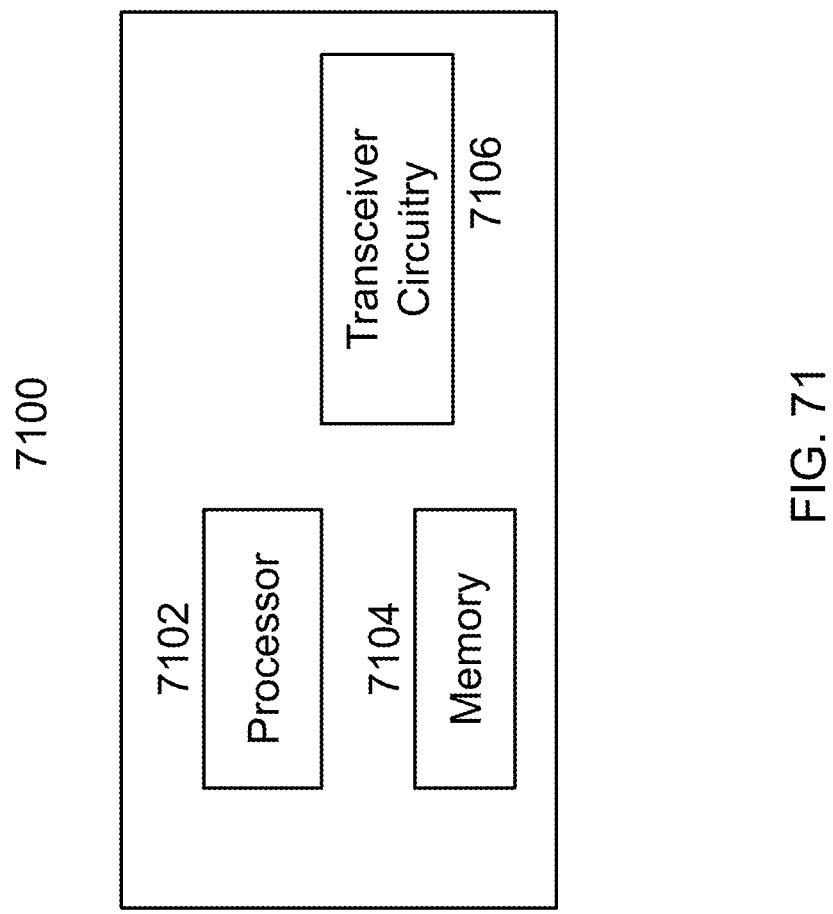
FIG. 71 shows an example of a wireless transceiver apparatus.

One example procedure for computing a reciprocal geometric precoder is as follows:

(1) Choose an uplink power allocation (may be simply a uniform allocation, $q_i = 1/K$).
(2) For each user i, receive uplink reference signals and compute channel response $H_i(f, t)$
(3) For each user i, from the received channel response, compute covariance matrix $R_i$
(4) For each user i, compute uplink SINR matrix, $SINR_i^{(UL)}$, and find its maximum eigenvector $V_i^*$
(5) Compute downlink user cross-interference matrix, $A^{(DL)}$ and find its maximum eigenvector $V_{A^{(DL)}}$
(6) For each user i, compute downlink power allocation, $p_i$ from $V_{A^{(DL)}}$
(7) For each user i, compute geometric precoder $P_i$ from $p_i$ and $V_i^*$ 11. Methods and Implementations of the Disclosed Technology The embodiments and examples described above may be incorporated in the context of the methods described below, e.g., method 7000, which may be implemented in an example wireless transceiver apparatus, as shown in FIG. 71.

Figure 70:
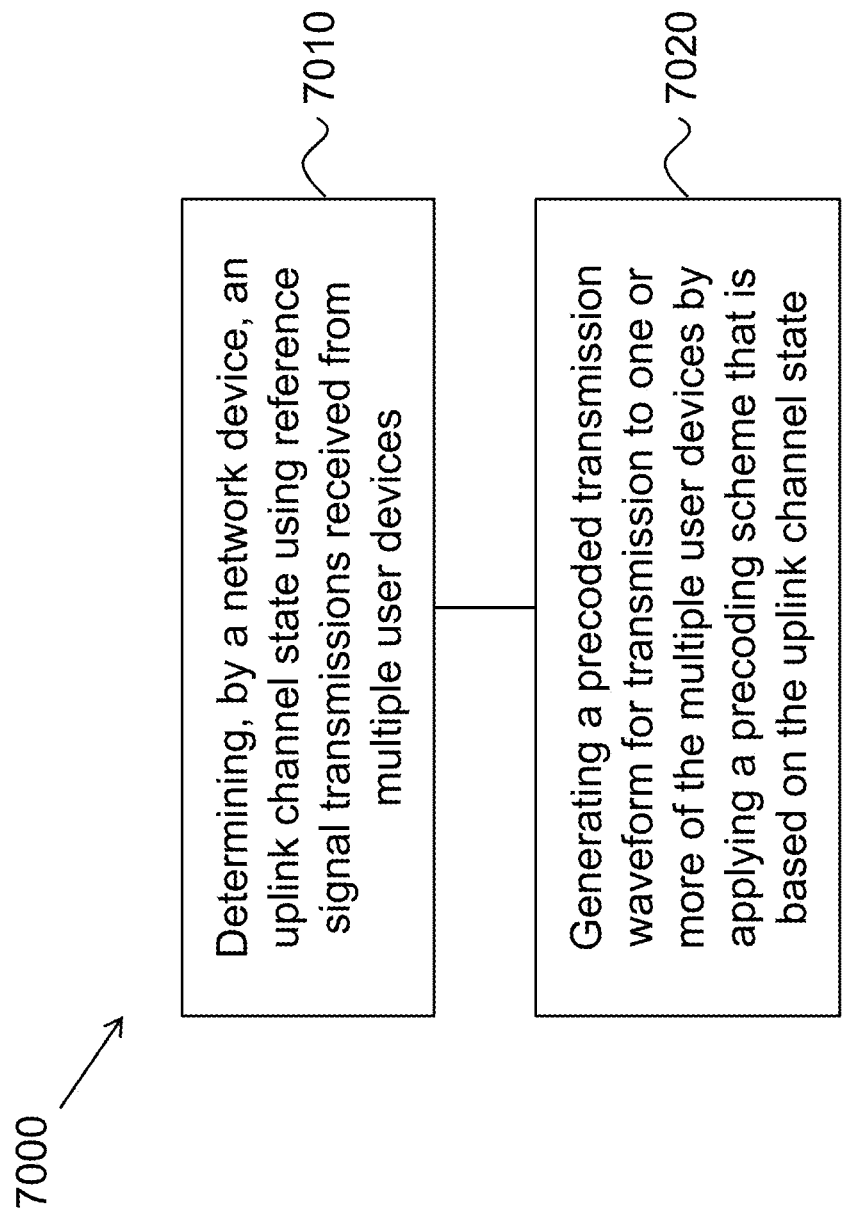
FIG. 70 is a flowchart for an example method of wireless communication.

FIG. 70 is a flowchart for an example method 7000 of wireless communication. The method 7000 includes determining, by a network device, an uplink channel state using reference signal transmissions received from multiple user devices (7010), and generating a precoded transmission waveform for transmission to one or more of the multiple user devices by applying a precoding scheme that is based on the uplink channel state (7020).

In some embodiments, the uplink channel state completely defines the precoding scheme. In other embodiments, the uplink channel state is sufficient for defining the precoding scheme. In yet other embodiments, a downlink channel state is not used to define the precoding scheme. In yet other embodiments, the precoding scheme is based only on the uplink channel state. In yet other embodiments, the precoding scheme is substantively based on the uplink channel state. In yet other embodiments, the precoding scheme is based on the uplink channel state but not on a downlink channel state.

In contrast to traditional implementations that define a downlink precoding scheme based on a downlink channel state, embodiments of the disclosed technology the definition of the downlink precoding scheme is based on the uplink channel state (and not the downlink channel state), thereby advantageously leverage channel reciprocity.

FIG. 71 shows an example of a wireless transceiver apparatus 7100. The apparatus 7100 may be used to implement the node or a UE or a network-side resource that implements channel estimation/prediction tasks. The apparatus 7100 includes a processor 7102, an optional memory (7104) and transceiver circuitry 7106. The processor 7102 may be configured to implement techniques described in the present document. For example, the processor 7102 may use the memory 7104 for storing code, data or intermediate results. The transceiver circuitry 7106 may perform tasks of transmitting or receiving signals. This may include, for example, data transmission/reception over a wireless link such as Wi-Fi, mmwave or another link, or a wired link such as a fiber optic link.

In some embodiments, and in the context of at least Section 10, the following technical solutions may be preferably implemented by some embodiments:

1. A wireless communication method, comprising determining, by a network device, an uplink channel state using reference signal transmissions received from multiple user devices; and generating a precoded transmission waveform for transmission to one or more of the multiple user devices by applying a precoding scheme that is based on the uplink channel state, wherein the uplink channel state completely defines the precoding scheme.
2. The method of solution 1, wherein the reference signal transmissions and the precoded transmission waveform are multiplexed using time division duplexing.
3. The method of solution 1, wherein the reference signal transmissions and the precoded transmission waveform are multiplexed using frequency division duplexing.
4. The method of solution 1, wherein the reference signal transmissions correspond to sounding reference signals (SRS).
5. The method of solution 1, wherein the reference signal transmissions correspond to demodulation reference signals (DMRS).
6. The method of any of solutions 1 to 5, wherein the precoding scheme is determined by estimating a channel response for each user device based on a corresponding uplink reference signal transmission received from each user device; computing, for each user device, a covariance matrix based on the channel response; selecting, for each user device, a vector that maximizes a selected criterion for each user device at the network device; determining, from the selected vectors of the multiple user devices, a downlink power allocation for each user device; and using the selected vectors and the downlink power allocations for determining the precoding scheme.
7. The method of solution 6, wherein the covariance matrix has a dimension L×L, wherein L represents a number of transmission antennas of the network device.
8. The method of solutions 6 or 7, wherein the computing the covariance matrix includes computing the covariance matrix using a maximum likelihood technique.
9. The method of solution 8, wherein the maximum likelihood (ML) technique comprises using a Toeplitz representation. In an example, the ML technique using the Toeplitz representation is further detailed in Section 3.2.
10. The method of any of solutions 6 to 9, wherein the computing the covariance matrix includes computing the covariance matrix using a direct multiplication between a channel response matrix and a Hermitian of the channel response matrix.
11. The method of solution 6, further including computing vector spaces for the multiple user devices for maximizing a received signal to interference and noise ratio at the network device.
12. The method of solution 6, further including computing vector spaces for the multiple user devices using eigenvectors of the uplink signal to interference and noise ratio matrices.
13. The method of solutions 11 or 12, wherein the downlink power allocations are computed using the vector spaces and the covariance matrices.
14. The method of solution 13, wherein the downlink power allocations are derived from a maximum eigenvector of a cross-interference matrix in a downlink direction.
15. The method of solution 13, wherein the downlink power allocations are derived from downlink traffic requirements.
16. The method of solution 13, wherein the downlink power allocations are derived by using both downlink traffic requirements and a maximum eigenvector of a cross-interference matrix in a downlink direction.
17. The method of any of solutions 6 to 16, wherein the selected vectors are maximum eigenvectors of signal to interference and noise matrices.
18. The method of any of solutions 1 to 17, wherein the precoded transmission waveform comprises a reference signal.
19. The method of solution 18, wherein the reference signal comprises a cell specific reference signal.
20. The method of solution 18, wherein the reference signal comprises a demodulation reference signal.
21. The method of any of solutions 1 to 20, wherein the multiple user devices form a subset of all user devices served by the network device.

22. The method of solution 21, wherein the subset is chosen based on covariance matrices of all user devices served by the network device.

23. The method of any of solutions 1 to 22, wherein the precoding scheme operates in a spatial dimension only, or spatial-delay dimensions, or spatial-Doppler dimensions, or spatial-delay-Doppler dimensions, or spatial-frequency dimensions, or spatial-time dimensions, or spatial-frequency-time dimensions.

24. The method of any of solutions 1 to 23, wherein the network device is operating using a long term evolution LTE protocol.

25. The method of any of solutions 1 to 23 wherein the network device is operating using a 5G new radio (NR) protocol.

26. A wireless communication apparatus comprising a processor and a wireless transceiver, wherein the processor is configured to perform a method recited in any of solutions 1 to 25 using the transceiver for transmitting or receiving signals.

27. The wireless communication apparatus of solution 26, wherein the wireless communication apparatus is a base station of a multi-user multi-input multi-output (MU-MIMO) wireless system.

In some embodiments, a wireless communication system may include a transmitter device and one or more receiver devices that are coupled to each other by a wireless channel that has a reverse channel from each of the receiver devices to the transmitter channel (e.g., uplink channel) and a forward channel from the transmitter to the one or more receivers (e.g., downlink channel). The forward channel may support broadcast transmissions and unicast transmissions to individual receivers. As described in the present document, the reverse channel and the forward channel may be duplexed in time and/or frequency and/or code and/or spatial domains. The transmitter device may implement the methods described in the solutions above and perform pre-coding on the forward channel based only on the channel state of the reverse channels, e.g., without using prior estimates of the forward channel. Similarly, the receiver devices in the system may perform the receiver-side techniques described in the present document and the solutions above.

It will be appreciated that the present document discloses may be implemented by wireless devices to reduce improve computational efficiency of channel estimation, channel prediction and pre-coding based on results of channel estimation and channel prediction. For example, using the disclosed techniques, a first device (e.g., a network device or a base station) may receive pilot or reference signal transmissions, e.g., signals with known characteristics, on a channel in one direction and compute, based on the received pilot or reference transmissions, in an opposite direction. In other words, the reference signal transmissions in one direction of the channel will be sufficient, or completely define, the pre-coding or channel prediction used in a reverse direction. In some embodiments, the technique may be implemented by a network device such as a base station. In some embodiments, the technique may be implemented by a user device such as a mobile phone or another wireless computational platform.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A wireless communication method, comprising:
   determining, by a network device, an uplink channel state using reference signal transmissions received from multiple user devices; and
   generating a precoded transmission waveform for transmission to one or more of the multiple user devices by applying a precoding scheme that is based on the uplink channel state,
   wherein the uplink channel state completely defines the precoding scheme, and
   wherein the precoding scheme is determined by:
      estimating a channel response for each user device based on a corresponding uplink reference signal transmission received from each user device,
      computing, for each user device, a covariance matrix based on the channel response,
      selecting, for each user device, a vector that maximizes a selected criterion for each user device at the network device,
      computing vector spaces for the multiple user devices using eigenvectors of the uplink signal to interference and noise ratio matrices,
      determining, from the selected vectors of and the vector spaces for the multiple user devices, a downlink power allocation for each user device, and
      using the selected vectors and the downlink power allocations for determining the precoding scheme.

2. The method of claim 1, wherein the reference signal transmissions and the precoded transmission waveform are multiplexed using time division duplexing (TDD) or frequency division duplexing (FDD).

3. The method of claim 1, wherein the reference signal transmissions correspond to sounding reference signals (SRS) or demodulation reference signals (DMRS).

4. The method of claim 1, wherein the covariance matrix has a dimension L×L, wherein L represents a number of transmission antennas of the network device.

5. The method of claim 1, wherein the computing the covariance matrix includes computing the covariance matrix using a maximum likelihood technique that comprises using a Toeplitz representation for the covariance matrix.

6. The method of claim 1, wherein the computing the covariance matrix includes computing the covariance matrix using a direct multiplication between a channel response matrix and a Hermitian of the channel response matrix.

7. The method of claim 1, wherein the downlink power allocations are computed further based on the covariance matrices.

8. The method of claim 7, wherein the downlink power allocations are derived (a) from a maximum eigenvector of a cross-interference matrix in a downlink direction, (b) downlink traffic requirements, or (c) using both the downlink traffic requirements and the maximum eigenvector of the cross-interference matrix in the downlink direction.

9. The method of claim 8, wherein the cross-interference matrix $(A_{K \times K}^{(DL)})$ in the downlink direction comprises entries given by:

$$A_{i,j}^{(DL)} = \begin{cases} SINR_i^{*(UL)} \cdot \dfrac{N_0}{V_i^{*H} R_i V_i^*} & i = j \\ SINR_i^{*(UL)} \cdot \dfrac{\left(V_j^{*H} R_i V_j^* + N_0\right)}{V_i^{*H} R_i V_i^*} & i \neq j \end{cases},$$

wherein i and j are indexes for the multiple user devices, $SINR_i^{*(UL)}$ is a signal to interference and noise ratio for the i-th user device for the uplink channel, $V_i^*$ is the vector space for the i-th user device, $R_i$ is the covariance matrix, and $N_0$ is a noise variance.

10. The method of claim 1, wherein the selected vectors are maximum eigenvectors of signal to interference and noise matrices.

11. The method of claim 10, wherein the downlink power allocation for each user device $(p_i)$ is based on a normalized absolute value of elements $(V_{A^{(DL)}}(i))$ of the corresponding maximum eigenvector $(A^{(DL)})$ that is given by:

$$p_i = \frac{|V_{A^{(DL)}}(i)|}{\sum_i |V_{A^{(DL)}}(i)|}.$$

12. The method of claim 1, wherein the precoded transmission waveform comprises a reference signal, and wherein the reference signal comprises a cell specific reference signal or a demodulation reference signal.

13. The method of claim 1, wherein the multiple user devices form a subset of all user devices served by the network device, and wherein the subset is chosen based on covariance matrices of all user devices served by the network device.

14. The method of claim 1, wherein the precoding scheme operates in:
   a. a spatial dimension only, or
   b. spatial-delay dimensions, or
   c. spatial-Doppler dimensions, or
   d. spatial-delay-Doppler dimensions, or
   e. spatial-frequency dimensions, or
   f. spatial-time dimensions, or
   g. spatial-frequency-time dimensions, and
   wherein the network device is operating using a long-term evolution (LTE) protocol or a 5G new radio (NR) protocol.

15. A wireless communication apparatus comprising:
a processor; and
a wireless transceiver,
wherein the processor is configured to:
  determine an uplink channel state using reference signal transmissions received from multiple user devices,
  generate a precoded transmission waveform for transmission to one or more of the multiple user devices by applying a precoding scheme that is based on the uplink channel state,
wherein the wireless transceiver is configured to:
  transmit the precoded transmission waveform,
wherein the uplink channel state completely defines the precoding scheme, and
wherein the processor is configured, as part of determining the precoding scheme, to:
  estimating a channel response for each user device based on a corresponding uplink reference signal transmission received from each user device,
  computing, for each user device, a covariance matrix based on the channel response,
  selecting, for each user device, a vector that maximizes a selected criterion for each user device at the network device,
  computing vector spaces for the multiple user devices using eigenvectors of the uplink signal to interference and noise ratio matrices,
  determining, from the selected vectors of and the vector spaces for the multiple user devices, a downlink power allocation for each user device, and
  using the selected vectors and the downlink power allocations for determining the precoding scheme.

16. The apparatus of claim 15, wherein the wireless communication apparatus is a base station of a multi-user multi-input multi-output (MU-MIMO) wireless system.

17. The apparatus of claim 15, wherein the covariance matrix has a dimension L×L, wherein L represents a number of transmission antennas of the network device, and wherein the computing the covariance matrix includes computing the covariance matrix using (a) a maximum likelihood technique that comprises using a Toeplitz representation for the covariance matrix or (b) a direct multiplication between a channel response matrix and a Hermitian of the channel response matrix.

18. The apparatus of claim 15, wherein the precoding scheme operates in:
  a. a spatial dimension only, or
  b. spatial-delay dimensions, or
  c. spatial-Doppler dimensions, or
  d. spatial-delay-Doppler dimensions, or
  e. spatial-frequency dimensions, or
  f. spatial-time dimensions, or
  g. spatial-frequency-time dimensions, and
  wherein the network device is operating using a long-term evolution (LTE) protocol or a 5G new radio (NR) protocol.

19. The apparatus of claim 15, wherein the selected vectors are maximum eigenvectors of signal to interference and noise matrices.

20. The apparatus of claim 19, wherein the downlink power allocation for each user device ($p_i$) is based on a normalized absolute value of elements ($V_{A^{(DL)}}(i)$) of the corresponding maximum eigenvector ($A^{(DL)}$) that is given by:

$$p_i = \frac{|V_{A^{(DL)}}(i)|}{\sum_i |V_{A^{(DL)}}(i)|}.$$

* * * * *